United States Patent

Yoshida et al.

[11] Patent Number: 5,841,489
[45] Date of Patent: Nov. 24, 1998

[54] PHASE-ONLY OPTICALLY-ADDRESSED TYPE SPATIAL LIGHT MODULATOR

[75] Inventors: Narihiro Yoshida; Naohisa Mukohzaka; Haruyoshi Toyoda, all of Hamamatsu; Terushige Hori, Osaka; Yuji Kobayashi; Tsutomu Hara, both of Hamamatsu, all of Japan

[73] Assignee: Hamamatsu Photonics K.K., Shizuoka-ken, Japan

[21] Appl. No.: 99,548

[22] Filed: Jul. 30, 1993

[30] Foreign Application Priority Data

Jul. 30, 1992 [JP] Japan ................................. 4-203505
Mar. 12, 1993 [JP] Japan ................................. 5-079078

[51] Int. Cl.$^6$ ............................ C02F 1/135; C02F 1/137; G06K 9/76
[52] U.S. Cl. ........................... 349/17; 349/25; 349/177; 359/561; 359/279; 382/211; 382/278
[58] Field of Search .................................. 359/36, 40, 41, 359/72, 561, 559, 560, 239, 279; 382/31, 41, 42, 43, 211, 278, 280; 349/17, 25, 177–201

[56] References Cited

U.S. PATENT DOCUMENTS

| | | | |
|---|---|---|---|
| 4,760,389 | 7/1988 | Aoki et al. | 359/48 |
| 4,832,447 | 5/1989 | Javidi | 359/561 |
| 5,175,775 | 12/1992 | Iwaki et al. | 382/211 |
| 5,214,534 | 5/1993 | Kallman et al. | 359/561 |
| 5,216,541 | 6/1993 | Takesue et al. | 359/561 |
| 5,257,322 | 10/1993 | Matsuoka et al. | 359/561 |
| 5,274,716 | 12/1993 | Mitsuoka et al. | 359/561 |
| 5,432,567 | 7/1995 | Matsuda | 359/72 |
| 5,528,702 | 6/1996 | Mitsuoka et al. | 382/211 |

FOREIGN PATENT DOCUMENTS

| | | |
|---|---|---|
| 0272820 | 12/1987 | European Pat. Off. . |
| 0475612 | 8/1991 | European Pat. Off. . |
| 0451681 | 10/1991 | European Pat. Off. ................. 359/63 |
| 2610735 | 2/1987 | France . |
| 32 13 277 C2 | 12/1985 | Germany . |
| 30 22 904 C3 | 10/1989 | Germany . |
| 34 90 617 C2 | 12/1990 | Germany . |
| 34 43 785 C2 | 11/1992 | Germany . |
| 4990155 | 8/1974 | Japan . |
| 0027051 | 2/1990 | Japan . |
| 4-178616 | 6/1992 | Japan . |
| 4-363617 | 12/1992 | Japan . |

OTHER PUBLICATIONS

E. Kaneko "Liquid Crystal TV Displays" KTK Scientific Publishers—1987—chapter 3—pp. 33–43.
German Search Report dated Jun. 4, 1997.
Japanese Search Report dated May 27, 1997.

(List continued on next page.)

Primary Examiner—William L. Sikes
Assistant Examiner—Tai V. Duong
Attorney, Agent, or Firm—Sughrue, Mion, Zinn, Macpeak & Seas, PLLC

[57] ABSTRACT

In a spatial light modulator of the present invention, a photoconductive layer formed of photoconductive material receives write light having a spatial distribution in its intensity and changes resistivity of the photoconductive material dependently on the spatial distribution in the intensity of the received write light. A liquid crystal layer formed of liquid crystal molecules of nematic phase receives read light and presents birefringence with respect to the received read light. An electric voltage is applied through the photoconductive layer and the liquid crystal layer to thereby produce an electric field in the liquid crystal layer. The photoconductive layer changes the electric field produced in the liquid crystal layer in accordance with the resistivity of the photoconductive material so as to electrically control the birefringence of the liquid crystal molecules. The liquid crystal layer modulates the received read light in accordance with the birefringence which is electrically controlled in accordance with the spatial distribution in the intensity of the write light received by the photoconductive layer.

31 Claims, 32 Drawing Sheets

OTHER PUBLICATIONS

D.A. Yocky et al., "Simple measurement of the phase modulation capability of liquid crystal phase–only light modulators," Optik 84, No. 4 (1990), pp. 140–144 No Date Provided.

Narihiro Yoshida et al., "High resolution spatial light modulator," pp. 357–363, reprinted from Optical Information–Processing System and Architectures II, 9–13 Jul. 1990, vol. 1347.

T.D. Beard et al., "ac liquid–crystal light valve," Appl. Phys. Lett., vol. 22, No. 3, Feb. 1, 1973, pp. 90–92.

T.H. Barnes et al., "Phase–only modulation using a twisted nematic liquid crystal television," Applied Optics, Nov. 15, 1989, vol. 28, No. 22, pp. 4845–4852.

M.M. Labes, "Molecular Crystals and Liquid Crystals Incorporating Nonlinear Optics," Mol. Cryst. Liq. Cryst., 1987, vol. 152, pp. 597–607 No Date Provided.

H. Hatoh et al., "Large–area Projection HAN–mode Multicolor TFT–addressed LCD," Molecular Crystals and Liquid Crystals incorporating Nonlinear Optics, vol. 168, Mar. 1989, New York, pp. 83–94.

F. Clerc, "Electro–optical limits of the electrically controlled birefringence effect in nematic liquid crystals," Displays, Oct. 1981, vol. 2, No. 7, Gildford, GB.

G.G. Voevodkin et al., "Optically controllable switches and deflectors based on MIS–LC structures," Soviet Physics Technical Physics, vol. 33, No. 9, Sep. 1988, New York, pp. 1086–1087.

S. Wu, "Infrared properties of nematic liquid crystals: an overview," Optical Engineering, Feb. 1987, vol. 26, No. 2, pp. 120–128.

E. Marom, "Real–time image substraction using a liquid crystal light valve," Optical Engineering, Feb. 1986, vol. 25, No. 2, pp. 274–276.

Variable Grating Mode Liquid Crystal Device for Optical Processing, Soffer et al., SPIE vol. 218, Devices and Systems for Optical Signal Processing (1980), pp. 81–87, No Date Provided.

Patent Abstracts of Japan vol. 14, No. 360 (P–1088) & JP–A–02132412 (Matsushita) May 21, 1990 Joint Transform Correlator Using a Phase Only Spatial Light Modulator, Barnes et al., Japanese Journal of Applied Physics, Jul. 29, 1990, No. 7, Part 2, pp. 1293–1296.

Effects and Correction of Magneto–Optic Spatial Light Modulator Phase Errors in An Optical Correlator, Downie et al., Applied Optics, Feb. 10, 1992, vol. 31, No. 5, pp. 636–643.

Effects of Nonlinear Parameters in Feedback Joint Transform Correlator (FJTC) (I), Kasama et al., Optical Information Processing Systems & Architectures IV, vol. 1772, pp. 51–62 No Date Provided.

Optical Substraction of Images with the Use of a Metal–Insulator–Semiconductor–(liquid crystal) Structure, Voevodkin et al., Sov. Tech. Phys. Lett. 14(6), Jun. 1988, pp. 484–486.

Fourier–plane Characteristics of a Liquid–Crystal Light Valve, Arsenault et al., Journal of Modern Optics, 1987, vol. 34, No. 11, pp. 1393–1396.

HOMOGENEOUS NEMATIC ARRANGEMENT

TWISTED NEMATIC ARRANGEMENT

NEMATIC LIQUID CRYSTAL MOLECULES

NEMATIC LIQUID CRYSTAL MOLECULES

LIQUID CRYSTAL MOLECULES

SPACER
LIQUID CRYSTAL MOLECULES

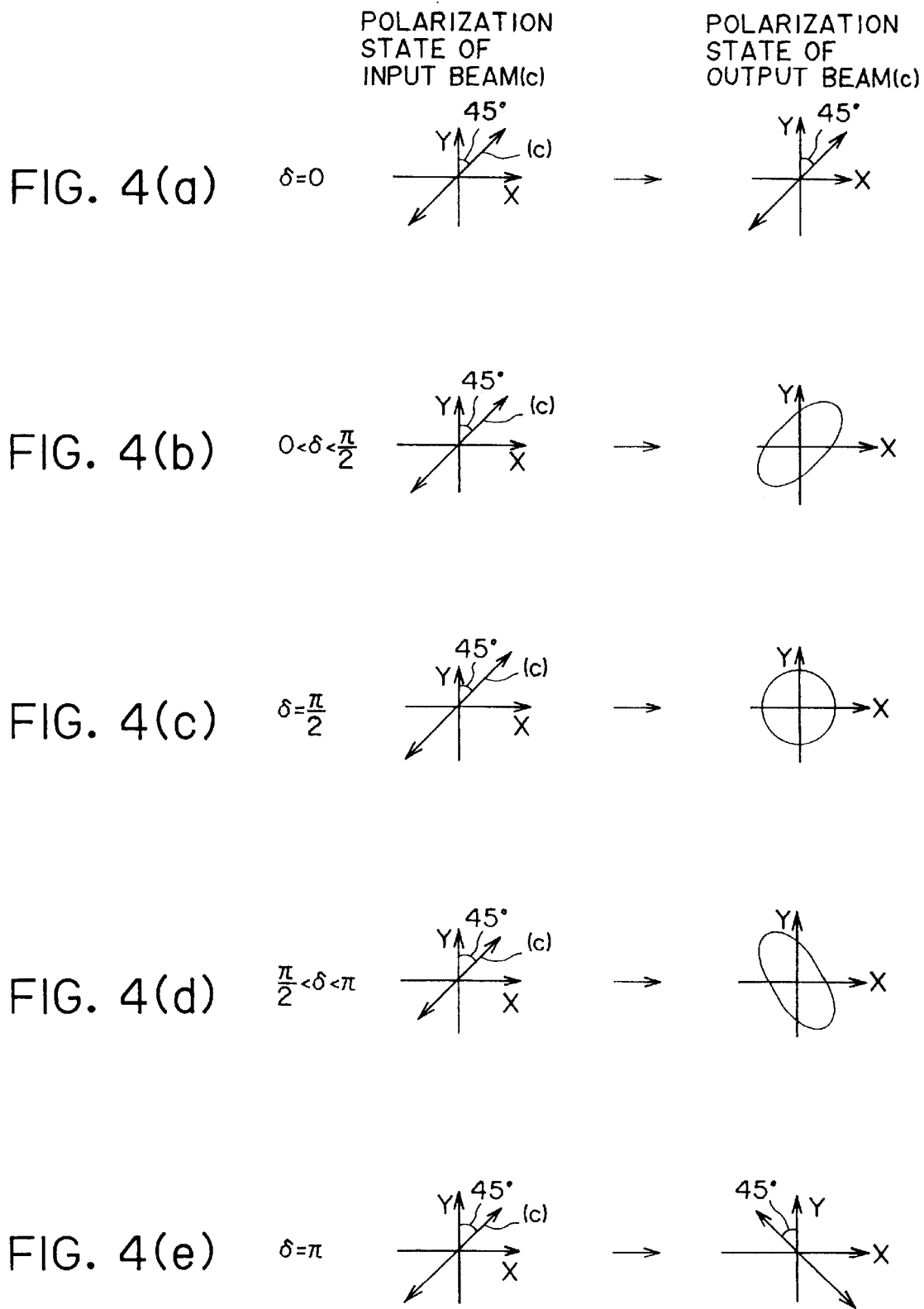

SPATIAL FREQNENCY OF GRATING PATTERN

PHASE MODULATION AMOUNT Δφ

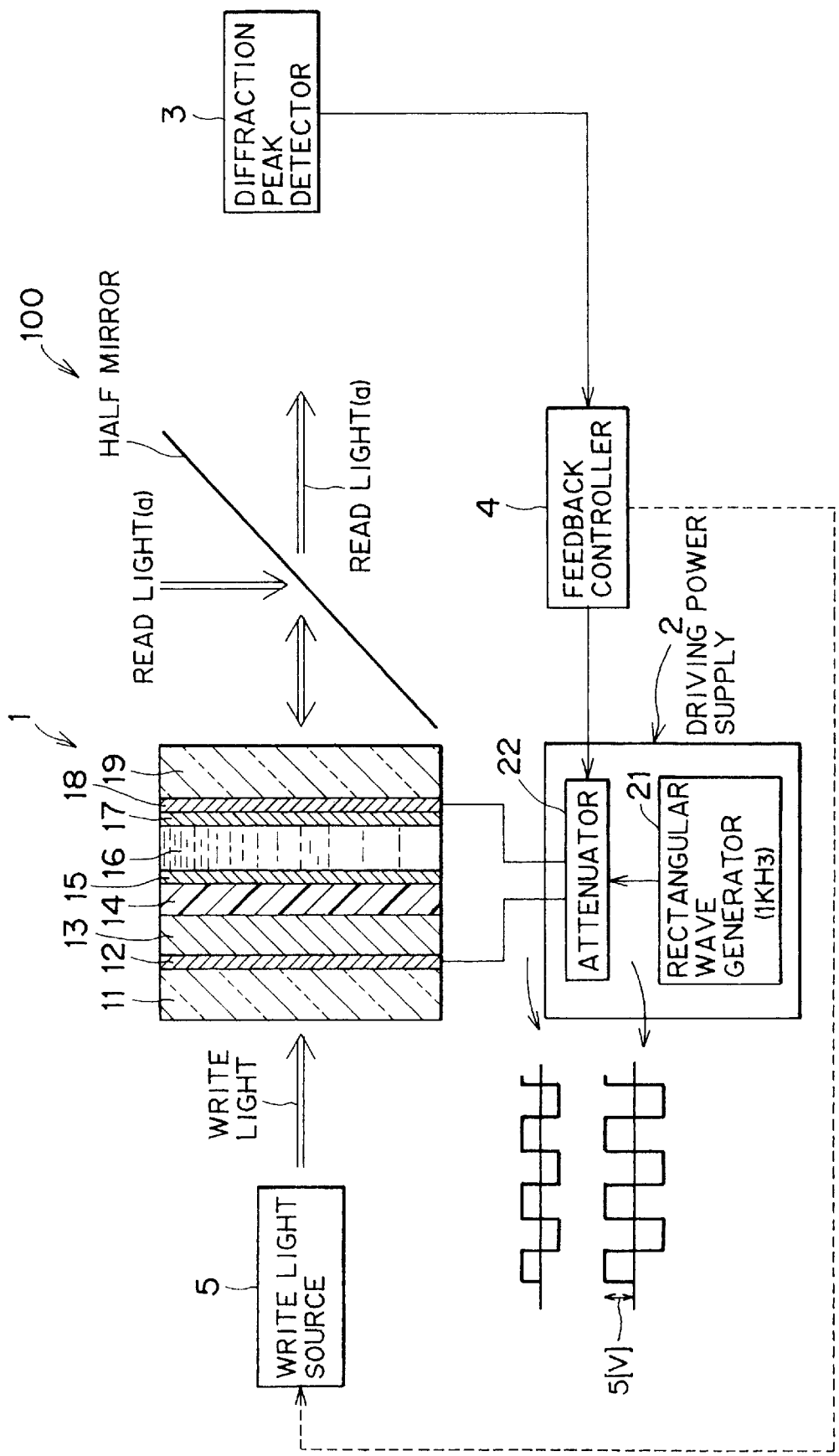

MEAN INTENSITY W' OF WRITE LIGHT

CURRENT DETECTOR 45

CURRENT DETECTOR 45

NEMATIC LIQUID CRYSTAL MOLECULES

NEMATIC LIQUID CRYSTAL MOLECULES

PHASE-ONLY OPTICALLY-ADDRESSED TYPE SPATIAL LIGHT MODULATOR

BACKGROUND OF THE INVENTION

1. Field of the Invention

The present invention relates to a spatial light modulator (SLM), and more particularly to an optically-addressed type SLM.

2. Description of the Related Art

Conventionally, SLMs have been used as display devices. SLMs have been recently used as parallel logic gates, memories, etc. in optical information processings. SLMs play an important role in the field of optical information processing.

An SLM mainly includes a combination of an address part and a modulation part. The address part receives a pattern or image signal and alters optical characteristic of the modulation part. The modulation part receives and modulates read light in accordance with the changed optical characteristic. Thus, the SLM can modulate read light in accordance with the pattern signal.

There are two main types of SLM: electrically-addressed types in which the addressed part receives an electric pattern signal; and optically-addressed types in which the addressed part receives an optical pattern signal (which will be referred to as a "write light," hereinafter).

There have been proposed various kinds of optically-addressed type SLMS such as microchannel spatial light modulators (MSLM), liquid crystal light valves (LCLV), Pockels readout optical modulators (PROM), etc. The address part of MSLM is formed from a photocathode and the modulation part is formed from a $LiNbO_3$ crystal. The address part of LCLV is formed from a photoconductive element and the modulation part is formed from twisted nematic (TN) crystal. The PROM uses a $Bi_{12}SiO_{20}$ single crystal for the modulation part.

A ferroelectric liquid crystal spatial light modulator (FLC-SLM) has been recently proposed in an article "Bistable spatial light modulator using a ferroelectric liquid crystal" (OPTICS LETTERS, Vol. 15, No. 5, pp. 285–287) published on Mar. 1, 1990. The FLC-SLM uses ferroelectric liquid crystal for the modulation part.

In MSLMs and PROMs using the electro-optic crystal, when linearly-polarized read light having a polarization plane aligned with the crystal axis of the electro-optic crystal is projected to the electro-optic crystal, the electro-optic crystal can modulate the read light only in phase. However, the electro-optic crystal may not modulate the read light more than by $\pi$ radians. In other words, the dynamic range of those SLMs is limited in the range of 0 to lower than $\pi$ radians. In addition, a high voltage must be applied to the electro-optic crystal.

It is noted that when linearly-polarized read light having a polarization plane shifted from the crystal axis by 45 degrees is projected onto the electro-optic crystal, the electro-optic crystal rotates the polarization plane of the read light so as to modulate the read light in intensity.

In the LCLV, when the twisted-nematic liquid crystal layer modulates read light in phase, the polarization plane of the read light is inevitably rotated. As a result, the read light is modulated also in intensity. Accordingly, the LCLV may not perform a phase-only modulation. In addition, due to transfer characteristic of the twisted nematic crystal, the LCLV may not modulate intensity of read light continuously. In other words, the LCLV may not achieve a grey level. The LCLV can attain only a binary intensity modulation.

The FLC-SLM is basically operated in binary mode. Accordingly, it is difficult for the FLC-SLM to stably obtain a grey level both in phase and in intensity.

SUMMARY OF THE INVENTION

It is therefore, an object of the present invention to overcome the above-described drawbacks, and to provide an optically-addressed type SLM which has a simple structure and which can attain a continuous phase-only modulation of a large dynamic range and also attain a continuous intensity modulation.

In order to solve the above object, the present invention applies a liquid crystal layer of an ECB mode type to a modulation part of an optically-addressed type SLM. The ECB mode type liquid crystal layer is capable of presenting a so-called electrically controlled birefringence. When an electric field is produced in the ECB mode type liquid crystal layer, the arrangement of the liquid crystal molecules is varied due to dielectric anisotropy of the liquid crystal. As a result, birefringence of the liquid crystal is changed. This phenomenon is called as an electrically controlled birefringence effect (ECB effect.)

In the ECB mode type liquid crystal layer, liquid crystal molecules are arranged to extend parallel to a single plane.

The SLM of the present invention formed with the ECB type liquid crystal layer can attain a continuous phase-only modulation with respect to a linearly-polarized read light having a polarization plane parallel to the single plane.

In addition, combining an analyzer with the SLM of the present invention attains a continuous intensity modulation with respect to a linearly-polarized read light having a polarization plane shifted by 45 degrees from the single plane.

In other words, in order to attain the above-described object, the present invention provides a spatial light modulator for receiving write light having a spatial distribution in its intensity and for receiving read light to spatially modulate the read light in accordance with the spatial distribution in the intensity of the write light, comprising: a photoconductive layer formed of photoconductive material, the photoconductive layer receiving write light having a spatial distribution in its intensity and changing resistivity of the photoconductive material dependently on the spatial distribution in the intensity of the received write light; a liquid crystal layer formed of liquid crystal molecules of nematic phase, the liquid crystal layer receiving read light and presenting birefringence with respect to the received read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules, the liquid crystal layer modulating the received read light in accordance with the birefringence which is electrically controlled in accordance with the spatial distribution in the intensity of the write light received by the photoconductive layer.

Preferably, the spatial light modulator further comprises a pair of alignment layers provided to sandwich the liquid crystal layer therebetween for aligning liquid crystal molecules in the liquid crystal layer so that the liquid crystal molecules are arranged to extend along a plane parallel to a first plane. The liquid crystal molecules are arranged to form no spiral structure whose axis extends in a first direction which extends along the first plane. The photoconductive layer changes the electric field produced in the liquid crystal layer in accordance with the resistivity of the photoconductive material so as to allow the liquid crystal molecules to be moved along the plane parallel to the first plane to thereby electrically control the birefringence of the liquid crystal molecules.

The liquid crystal molecules move along the plane parallel to the first plane in accordance with the spatial distribution in the intensity of the write light received by the photoconductive layer so as to change a first refractive index which the liquid crystal molecules present with respect to a component of the read light having its plane of vibration parallel to the first plane without changing a second refractive index which the liquid crystal molecules present with respect to the other component of the read light having its plane of vibration perpendicular to the first plane.

The electric voltage applying means applies an electric voltage through the photoconductive layer and the liquid crystal layer to thereby produce in the liquid crystal layer an electric field extending in the first direction, the photoconductive layer changing the electric field produced in the liquid crystal layer in accordance with the resistivity of the photoconductive material so as to allow the liquid crystal molecules to be moved along the plane parallel to the first plane to thereby electrically control the birefringence of the liquid crystal molecules.

The liquid crystal molecules are preferably arranged in the liquid crystal layer in a homogeneous arrangement manner, a homeotropic arrangement manner, or a hybrid arrangement manner.

The voltage applying means includes a pair of transparent electrodes provided to sandwich therebetween the photoconductive layer and the liquid crystal layer.

The liquid crystal layer may receive read light which is linearly polarized with its polarization plane parallel to the first plane and which is coherent light, to thereby modulate phase of the read light, without changing a polarization state of the read light, in accordance with the spatial distribution in the intensity of the write light received by the photoconductive layer. In this case, the liquid crystal layer diffracts the linearly-polarized read light with its polarization plane parallel to the first plane, in accordance with the spatial distribution in the intensity of the write light, to thereby form a diffraction peak. The spatial light modulator may further comprise: diffraction peak detecting means for detecting intensity of the diffraction peak and for outputting a signal indicative of the diffraction peak intensity; and feedback control means for receiving the signal outputted from the diffraction peak detecting means and for feedback controlling at least one of a value of the voltage applied by the voltage applying means and a mean value of the spatially distributed intensity of the write light so that the liquid crystal layer may diffract the read light with substantially the maximum diffraction efficiency.

The liquid crystal layer may receive read light which is linearly polarized with a polarization plane shifted by 45 degrees from the first plane in a first rotational direction and which is coherent light, and modulate a polarization state of the read light in accordance with the spatial distribution in the intensity of the write light received by the photoconductive layer. The spatial light modulator may be combined with an analyzer for receiving the read light modulated in the liquid crystal layer. The intensity of a part of the read light having passed the analyzer represents the spatial distribution in the intensity of the write light incident on the photoconductive layer.

In this case, the read light incident to the liquid crystal layer is separated into an ordinary ray having a plane of vibration perpendicular to the first plane and an extraordinary ray having a plane of vibration parallel to the first plane. The liquid crystal molecules move along the plane parallel to the first plane in accordance with the spatial distribution in the intensity of the write light received by the photoconductive layer to thereby change the first refractive index which the liquid crystal molecules present with respect to the extraordinary ray without changing the second refractive index which the liquid crystal molecules present with respect to the ordinary ray. A phase difference obtained between the extraordinary ray and the ordinary ray while they propagate in the liquid crystal layer changes the polarization state of the read light, The spatial light modulator may further comprise polarization state compensating means for compensating for a polarization state of the read light so that the read light modulated in a portion of the liquid crystal layer which corresponds to a portion of the photoconductive layer where no write light is incident may have a polarization plane shifted by 45 degrees from the first plane in the first rotational direction when the read light reaches the analyzer.

According to another aspect, the present invention provides a joint transform correlating apparatus for measuring correlation of a plurality of optical images, comprising: a first spatial light modulator for receiving a joint optical image of a plurality of optical images and for receiving first read light to spatially modulate the first read light in accordance with the joint image; a first fourier transform lens for receiving the first read light modulated in the first spatial light modulator and spatially fourier transforming the first read light to thereby allow the first read light to bear a joint fourier transform image of the plurality of optical images; a second spatial light modulator for receiving the first read light bearing the joint fourier transform image and for receiving second read light to spatially modulate the read light in accordance with the joint fourier transform image; a second fourier transform lens for receiving the second read light modulated in the second spatial light modulator and spatially fourier transforming the second read light to thereby allow the second read light to bear a pair of correlation peaks representative of correlation of the plurality of optical images; and correlation detecting means for detecting intensity of one of the pair of correlation peaks. At least one of the first and second light modulators includes: a photoconductive layer formed of photoconductive material for receiving an optical image and changing resistivity of the photoconductive material dependently on the optical image; a liquid crystal layer formed of liquid crystal molecules of nematic phase for receiving read light and presenting birefringence with respect to the received first read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules to thereby modulate the read light in accordance with the electrically controlled birefringence.

BRIEF DESCRIPTION OF THE DRAWINGS

The above and other objects, features and advantages of the invention will become more apparent from reading the following description of the preferred embodiment taken in connection with the accompanying drawings in which:

FIGS. 4(a) through 4(e) shows the manner how the polarization state of the read light outputted from the liquid crystal layer changes in accordance with the phase difference amount occurred between ordinary ray and extraordinary ray of the read light;

FIG. 18(a) schematically shows a light modulator employed with the SLM of the embodiment;

DETAILED DESCRIPTION OF THE PREFERRED EMBODIMENT

Figure 1:
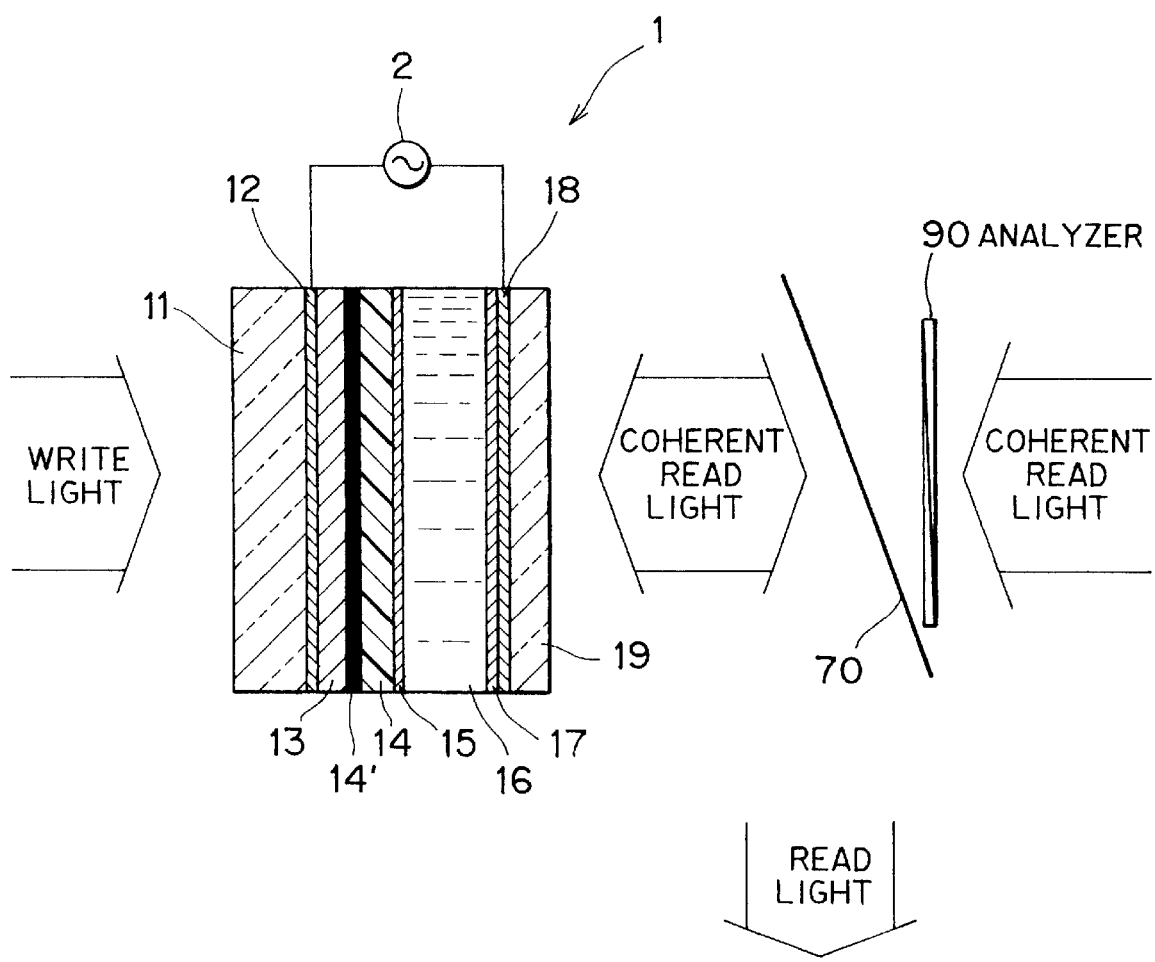
FIG. 1 is a sectional view schematically showing a SLM of an embodiment of the present invention.

Referring to the accompanying drawings, a preferred embodiment of the invention will be described wherein like parts and components are designated by the same reference numerals to avoid duplicating description.

FIG. 1 schematically shows a structure of an optically-addressed type SLM 1 according to an embodiment of the present invention. The SLM has a sandwich structure in which a transparent electrode film 12, a photoconductive layer 13, a dielectric mirror layer 14, an alignment layer 15, a liquid crystal layer 16, the other alignment layer 17 and the other transparent electrode film 18 are sandwiched between a write side glass plate 11 and a readout side glass plate 19.

A light blocking layer 14' may be formed between the photoconductive layer 13 and the dielectric mirror 14 for blocking any residual read light leaking through the dielectric mirror 14. It is noted, however, that the light blocking layer 14' may be omitted from the SLM 1 of the present invention, as will be described later.

Figure 2A:
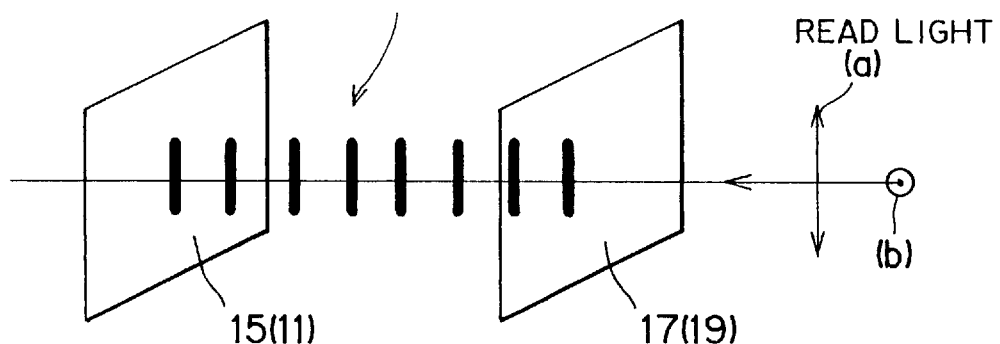
FIG. 2(a) schematically shows the state how nematic liquid crystal molecules are homogeneously arranged in a liquid crystal layer of the SLM of the embodiment.

The photoconductive layer 13 serves as an address part of the SLM. Write light bearing a two-dimensional light intensity distribution (pattern or image) is projected onto the photoconductive layer 13 through the glass plate 11 and the electrode film 12. The liquid crystal layer 16 serves as a modulating part. Coherent read light having a uniform intensity distribution is projected onto the liquid crystal layer 16 through the glass plate 19 and the electrode film 18. According to the present embodiment, in the liquid crystal layer 16, liquid crystal molecules of nematic phase are arranged to extend in parallel with the glass plates 11 and 19 as shown in FIG. 2(a). More specifically, the molecules are arranged to stack directly on top of one another, i.e., with no spiral structure. Such a liquid crystal molecule arrangement is called a "homogeneous" arrangement.

Figure 2B:
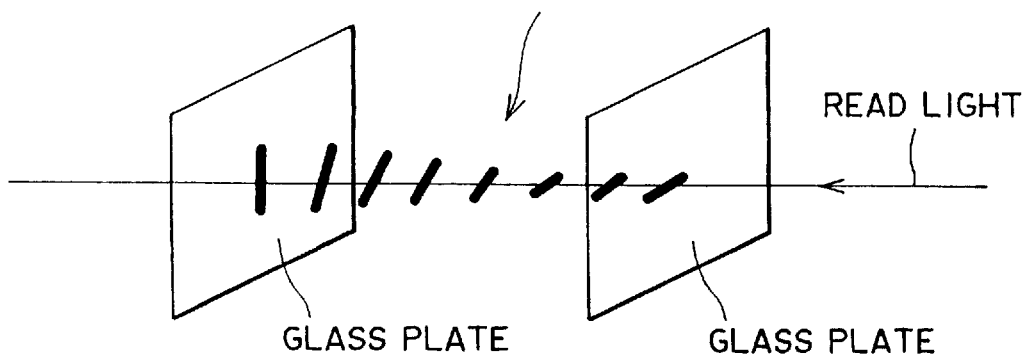
FIG. 2(b) schematically shows the state how nematic liquid crystal molecules are twisted in a twisted-nematic liquid crystal layer.

FIG. 2(a) shows the homogeneous arrangement of the nematic liquid crystal molecules of the liquid crystal layer 16 of the present invention. As a comparative example, FIG. 2(b) shows a so-called twisted nematic arrangement in which the nematic liquid crystal molecules are arranged in a twisted arrangement. In the twisted nematic arrangement, with no applied electric field, the liquid crystal molecules are arranged in spirals whose axes are perpendicular to the glass plate surfaces. When an electric field is occurred through the liquid crystal layer, the spirals distort. The distorted spirals affect the polarization state of read light incident to the liquid crystal layer so as to modulate the read light.

Contrarily, in the liquid crystal layer 16 of the present invention, the molecules are arranged to stack directly on top of one another, i.e., with no spiral structure. This arrangement can be also stated as a zero degree twisted arrangement. Accordingly, with no applied electric field, the molecules extend in the same direction parallel to the glass plates 11 and 19. When an electric field is occurred through the liquid crystal layer, due to dielectric anisotropy of the nematic liquid crystal, the arrangement of the liquid crystal molecules is changed. Since the birefringence which the liquid crystal molecules present is determined dependently on the arrangement of the liquid crystal molecules, the birefringence is changed. The changed birefringence affects the phase of read light incident to the liquid crystal layer so as to modulate the read light.

The transparent electrode films 12 and 18 are preferably formed of indium-tin-oxide (ITO). The photoconductive layer 13 is preferably formed of hydrogenated amorphous silicon (a-Si:H). The layer 13 may also be formed of amorphous silicon (a-Si), cadmium sulfide (CdS), $Bi_{12}SiO_{20}$, organic photoconductive material such as PVK (Poly-N-vinylcarbazol), or the like. The dielectric mirror 14 is, for example, a multilayered dielectric mirror in which $SiO_2$ and $TiO_2$ layers are alternately stacked on each other.

A power supply 2 applies an ac electric voltage between the transparent electrode films 12 and 18.

The fabrication of the SLM 1 is described hereinafter.

Indium-Tin-Oxide is sputter deposited on one surface of a 5 mm thick glass plate 11 to form an approximately 2000 Å thick ITO film 12 over the glass plate 11. Then, hydrogenated amorphous silicon (a-Si:H) is deposited on the ITO film 12 by chemical vapor deposition, so that a hydrogenated amorphous silicon layer 13 having a thickness in the range of 3 to 5 $\mu$m is formed on the ITO film 12. $SiO_2$ and $TiO_2$ layers are alternately deposited on the hydrogenated amorphous silicon layer 13 through a sputtering method or a vapor deposition method, so that a multilayered $SiO_2$ and $TiO_2$ dielectric layer 14 having a total number of about nineteen $SiO_2$ and $TiO_2$ layers and having a total thickness of about 1 $\mu$m is formed on the layer 13. The light blocking layer 14' may be formed of CdTe at a position between the layers 13 and 14.

The alignment layer 15 is formed from a polyvinyl alcohol (PVA) or polyimide layer which is coated on the dielectric mirror 14 and is subjected to rubbing techniques. It is noted that the alignment layer 15 may be formed from a SiO layer coated on the dielectric mirror 14 through oblique evaporation techniques. Or otherwise, the alignment layer may be formed from a LB (Langumuir-Blodgett) film coated on the dielectric mirror 14.

Similarly to the ITO film 12, an ITO film layer 18 is formed on one surface of the glass plate 19. Also similarly to the alignment layer 15, an alignment layer 17 is formed on the ITO film layer 18.

Then, the glass plate 11 formed with the layers 12, 13, (14',) 14 and 15 and the glass plate 19 formed with the layers 18 and 17 are positioned so that the alignment layers 15 and 17 confront each other with a gap of approximately 8 $\mu$m being formed therebetween. The alignment layers 15 and 17 are arranged in such a state that the rubbing direction thereof are aligned in parallel with each other. A spacer is provided between the alignment layers 15 and 17 to form a cell gap. The thus-formed cell is filled with a nematic liquid crystal ("E44" produced by Merck in this example), as a result of which a liquid crystal layer 16 is produced. Aligning the rubbing directions of the alignment layers 15 and 17 in parallel with each other ensures that the nematic liquid crystal molecules line up in the "homogeneous arrangement," described above, as shown in FIG. 2(a).

The SLM 1 having the above-described structure operates as described hereinafter.

The power supply 2 applies an ac electric voltage of several volts amplitude between the ITO film layers 12 and 18. Since impedance is high at regions of the photoconductive layer 13 where no write light is projected, a low voltage is applied across corresponding regions of the liquid crystal layer 16 due to the ratio of impedance of the liquid crystal layer 16 relative to impedance of the photoconductive layer 13. On the other hand, impedance of the photoconductive material lowers in regions where the write light is projected, and the voltage across corresponding regions of the liquid crystal layer 16 increases. As a result, the arrangement of the liquid crystal molecules changes due to dielectric anisotropy of liquid crystal, which in turn alters birefringence of the liquid crystal. In other words, the birefringence of the liquid crystal is changed in accordance with intensity of the write light incident on the photoconductive layer 13. Coherent read light having a uniform intensity distribution passes through a half mirror 70 and is projected onto the glass plate 19 perpendicularly to the surface thereof. The read light propagates in the liquid crystal layer 16 as modulated by the varied birefringence of the liquid crystal, i.e., by the intensity of the write light incident on the photoconductive layer 13. The read light then reflects off the mirror layer 14 and again propagates in the liquid crystal layer 16 where the read light is further modulated. The read light thus modulated in the liquid crystal layer 16 then outputs through the glass plate 19 in the direction perpendicular to the surface thereof. The read light then reflects off the half mirror 70 before being subjected to a next processing or detection.

As described above, where no write light is incident on the photoconductive layer 13, applying the electric voltage between the electrodes 12 and 18 still produces a low voltage across the liquid crystal layer 16. Accordingly, the arrangement of the liquid crystal molecules is slightly changed. However, since this slight change of the liquid crystal molecule arrangement is uniformly obtained over an entire area of the liquid crystal layer 16, this arrangement change is negligible as a bias component.

The birefringence which the liquid crystal layer 16 presents to the incident read light will be described in greater detail hereinafter.

Figure 3A:
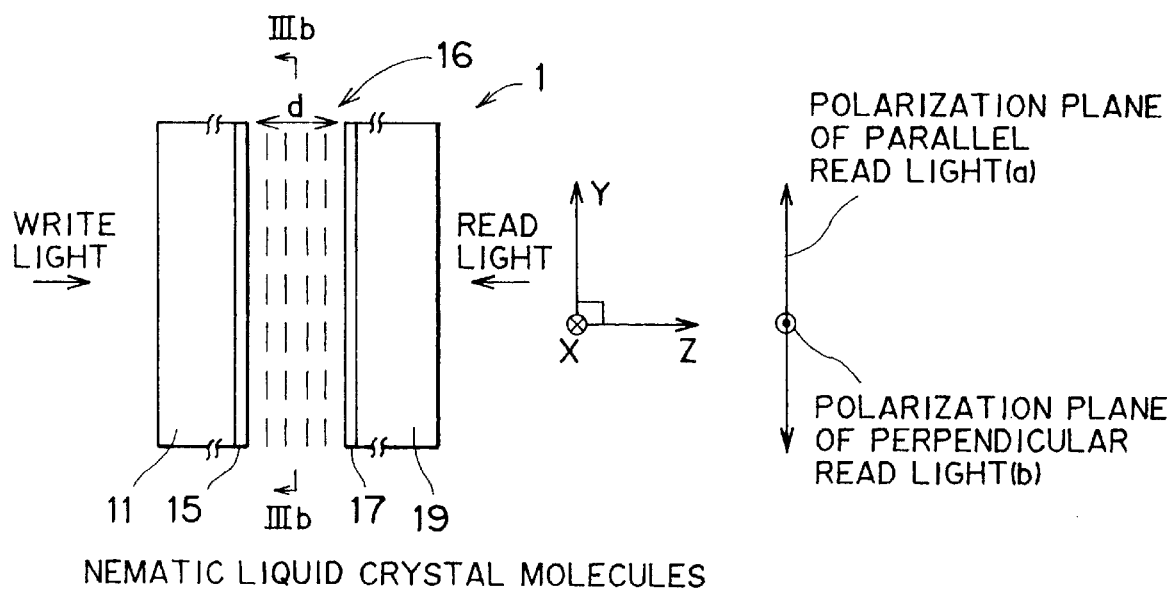
FIG. 3(a) schematically shows the relationship between the arrangement of the nematic liquid crystal molecules in the liquid crystal layer of the SLM of the embodiment and the polarization plane of the read light.
Figure 3B:
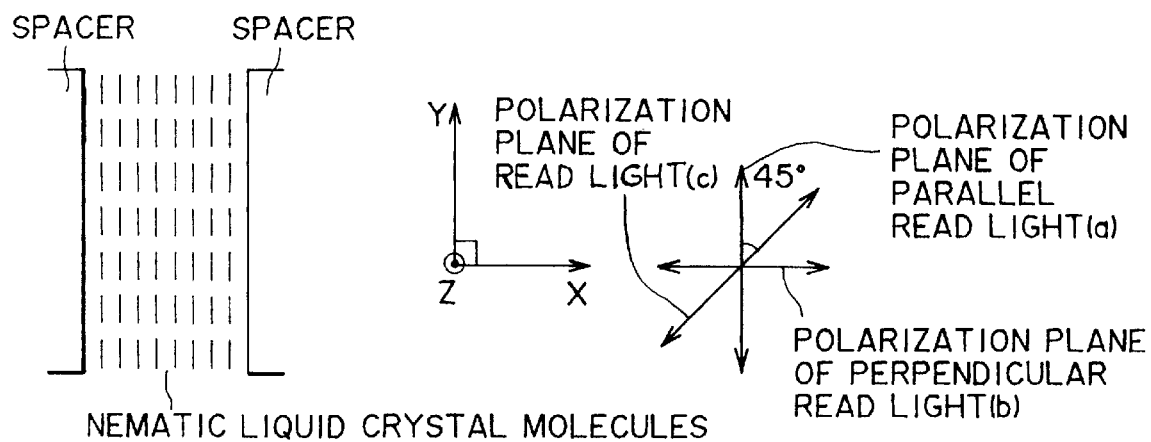
FIG. 3(b) is a section taken along a line IIIb—IIIb in FIG. 3(a)
Figure 3C:
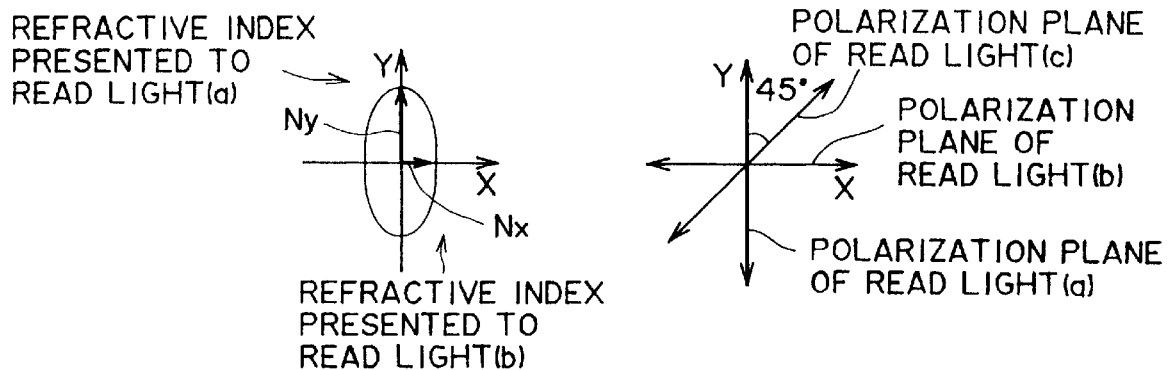
FIG. 3(c) schematically shows the refractive indexes which the liquid crystal molecules present to the read light.

As shown in FIGS. 3(a) and 3(b), assume three dimensional directions X, Y and Z with respect to the homogeneously arranged liquid crystal molecules of the liquid crystal layer 16. More specifically, with no applied electric field, liquid crystal molecules are assumed to extend in direction Y which extends parallel to surfaces of the glass plates 11 and 19. Direction X extends perpendicularly to the direction Y but also parallel to the surfaces of the glass plates 11 and 19. Direction Z extends perpendicularly both to directions X and Y. Direction Z is therefore perpendicular to the surfaces of the glass plates 11 and 19. It is noted that read light propagates in the direction of Z in the liquid crystal layer 16. As shown in FIG. 3(c), the liquid crystal molecules present a refractive index $n_y$ with respect to a read light with its plane of vibration (polarization plane) extending along a Y-Z plane. The Y-Z plane is defined to include both the Y and Z directions and therefore extending parallel to the liquid crystal molecules. (This read light serves as an extraordinary ray with respect to the liquid crystal layer, and will be referred to as "parallel read light (a)," hereinafter). The liquid crystal molecules also present a refractive index $n_x$ with respect to another read light with its plane of vibration (polarization plane) extending along a X-Z plane. The X-Z plane is defined to include directions X and Z and therefore extend perpendicular to the Y-Z plane. The X-Z plane therefore extends perpendicular to the liquid crystal molecules. (This read light serves as an ordinary ray with respect to the liquid crystal layer, and will be referred to as "perpendicular read light (b)," hereinafter).

Figure 3D:
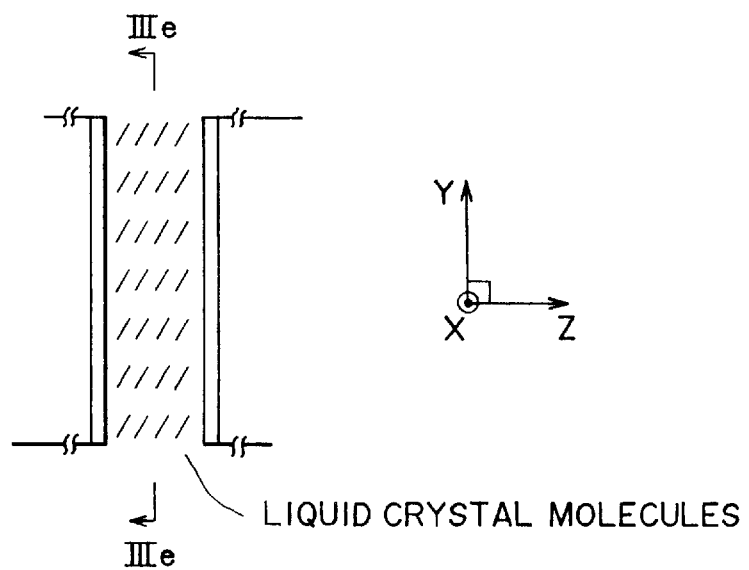
FIG. 3(d) schematically shows how the liquid crystal molecules move in accordance with electric field occurred through the liquid crystal layer of the SLM of the embodiment.
Figure 3E:
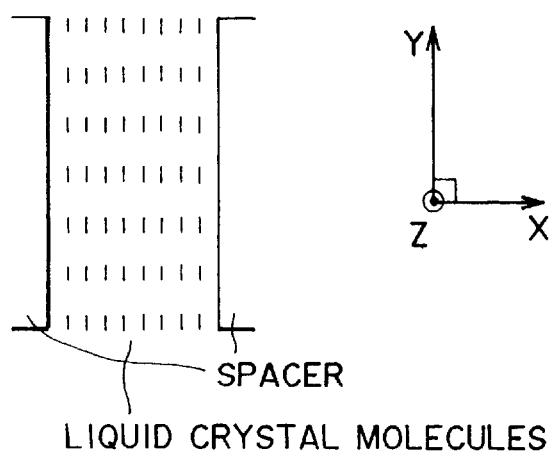
FIG. 3(e) is a section taken along a line IIIe—IIIe in FIG. 3(d)

When an electric field is generated in the liquid crystal layer 16, as shown in FIGS. 3(d) and 3(e), the liquid crystal molecules rotate along the Y-Z plane with a rotation amount corresponding to the electric field occurred to the liquid crystal molecules. As a result, the refractive index $n_y$ for the parallel read light (a) having the polarization plane along the Y-Z plane is changed, while the refractive index $n_x$ for the perpendicular read light (b) having the polarization plane perpendicular to the Y-Z plane being unchanged.

In the SLM of the present invention, since the electric field occurred in the liquid crystal layer changes in accordance with intensity (more specifically, intensity per unit area) W of the write light incident on the photoconductive layer 13, the refractive index $n_y$ changes in accordance with the write light intensity W while the refractive index $n_x$ remains unchanged. (The refractive index $n_y$ which the liquid crystal layer presents with respect to the extraordinary light (a) will therefore be referred to as a "refractive index $n_y$ (W), hereinafter, where W represents an intensity of the write light per unit area of a surface of the photoconductive layer 13 onto which the write light is incident.)

Accordingly, when a linearly polarized light (a) having its polarization plane along the Y-Z plane is projected onto the glass plate 19, the phase of the linearly polarized light (a) is modulated according to the change in the refractive index $n_y(W)$, and therefore according to the change in the intensity W of the write light.

Contrarily, when a linearly polarized light (b) with its polarization plane extending perpendicularly to the Y-Z plane is projected onto the glass plate 19, the phase of the light (b) is not modulated according to the change in the intensity of the write light, since the refractive index $n_x$ is not changed.

It is apparent from the above description that while the linearly polarized light (a) propagates in the liquid crystal layer 16, the polarization state is not changed at all. Accordingly, intensity of the read light (a) will not be changed. Thus, the homogeneously arranged liquid crystal molecules can attain phase-only modulation with respect to the linearly polarized parallel light (a).

In order to use the SLM 1 of the present invention as a spatial phase-only modulator, as shown in FIG. 1, a polarizer 90 may be preferably located in front of a half mirror 70 in such a manner that the orientation of the polarizer 90 may be aligned parallel to the Y-Z plane of the liquid crystal layer 16. The polarizer 90 can therefore project on the glass plate 19 the linearly-polarized beam (a) having a polarization plane parallel to the liquid crystal molecules.

When a linearly polarized light (c) having a polarization plane shifted by 45 degrees from the Y-Z plane is projected onto the liquid crystal layer 16 through the glass plate 19, the light (c) is separated into the ordinary ray (b) and the extraordinary ray (a) in the liquid crystal layer 16. The ordinary ray and the extraordinary ray have the same amplitudes. The phase difference δ attained between the ordinary ray and the extraordinary ray while they propagate in the liquid crystal layer 16 from the glass plate 19 toward the mirror layer 14 and from the mirror layer 14 toward the glass plate 19 to output therefrom can be represented by the following expression, $$\delta = 2\pi(n_x - n_y(W))(2d)/\lambda$$

where d represents a thickness of the liquid crystal layer 16 along the direction Z and $\lambda$ represents a wavelength of the read light (c) in vacuum. The refractive index $n_x$ has a constant value. When the intensity W of the write light is changed, the refractive index $n_y(W)$ is changed, and accordingly the phase difference $\delta$ is changed. Accordingly, the polarization state of the write light outputted from the liquid crystal layer changes dependently on the change in the write light intensity. More specifically, as shown in FIG. 4(a), when the phase difference $\delta$ has a value of zero (0), a linearly polarized beam the same as that of the inputted linearly polarized beam (c) is outputted. When the phase difference $\delta$ becomes higher than zero (0), as shown in FIG. 4(b), an almost elliptically polarized beam is obtained. When the phase difference $\delta$ becomes equal to $\pi/2$, as shown in FIG. 4(c), a circularly polarized beam is obtained. When the phase difference $\delta$ becomes higher than $\pi/2$, another almost elliptically polarized beam is obtained. When the phase difference $\delta$ becomes equal to $\pi$, as shown in FIG. 4(e), a linearly polarized beam with its polarization plane shifted by 90 degrees from that of the inputted beam (c) is obtained.

Figure 5:
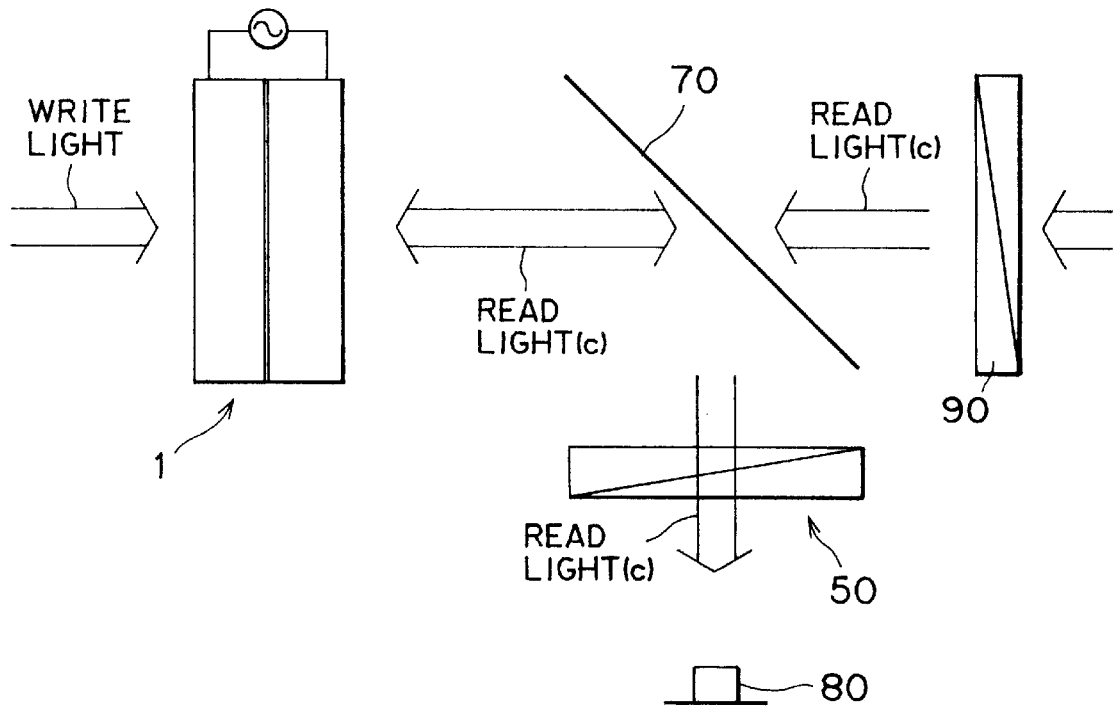
FIG. 5 schematically shows an optical system employed for using the SLM of the present invention as an intensity modulator.

It is apparent from the above analysis that combining an analyzer 50 with the SLM1 of the present invention as shown in FIG. 5 will attain a spatial light intensity modulation with respect to the linearly polarized light (c). As shown in FIG. 5, a polarizer 90 is preferably provided with its orientation being shifted by 45 degrees from the Y-Z plane of the liquid crystal layer 16 so as to project the read light (c) onto the glass plate 19. An analyzer 50 is provided in such a state that the orientation of the analyzer 50 may extend perpendicularly to that of the polarizer 90. A light intensity detector 80 is further located to detect the intensity of the read light having passed through the analyzer 50.

When the SLM 1 is thus cooperated with the analyzer 50 to attain the intensity modulation, it is desirable that the output intensity obtained by the detector 80 should become zero (0) when no write light is incident on the write side of the SLM. However, the impedance ratio between the photoconductor layer 13 and the liquid crystal layer 16, a thickness d of the liquid crystal layer 16, and the like may slightly modulate the read light and prevent the SLM from attaining zero output when no write light is incident. More specifically, the refractive index $n_y(W)$ may not have such a value as allows the phase difference $\delta$ ($=2\pi(n_x-n_y(W))$) $(2d)/\lambda$) to have a value of 0 when the incident light intensity W is equal to 0. In this case, the polarization state of the read light (c) is not maintained at the original state, but is modulated into an elliptically polarized beam, etc. When the analyzer 50 receives the elliptically polarized beam, etc., the intensity detected at the light intensity detector 80 will not be zero.

Figure 6:
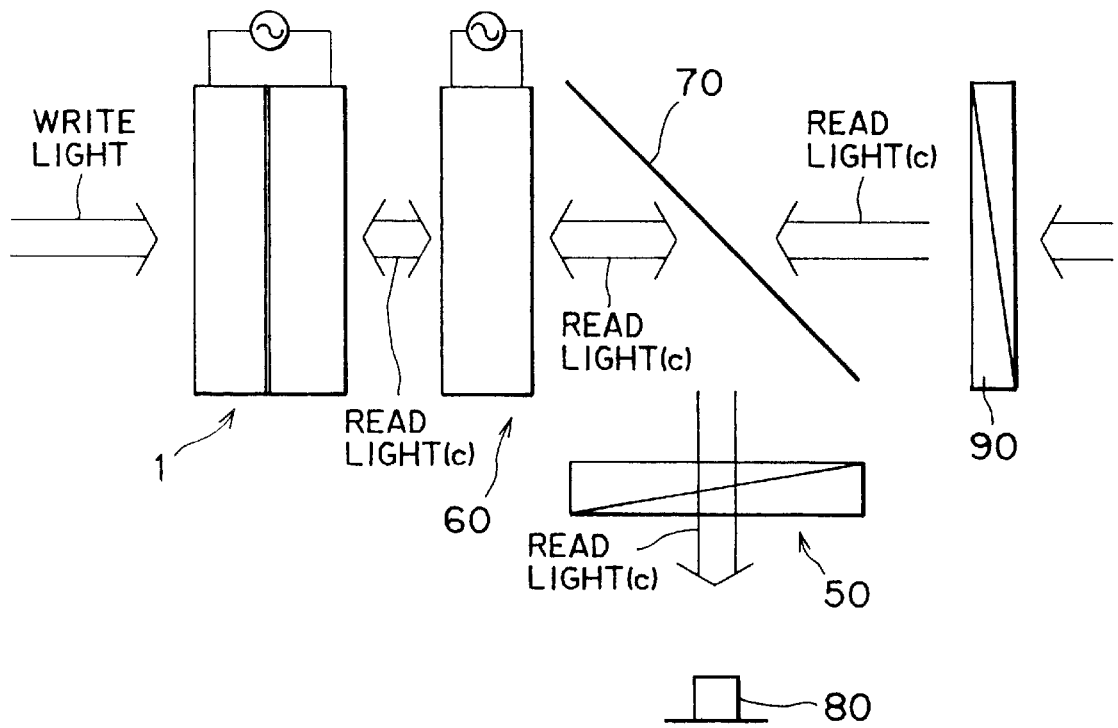
FIG. 6 schematically shows another optical system employed for using the SLM of the present invention as an intensity modulator.

According to the present invention, therefore, in order to modulate intensity of read light (c), the SLM 1 of the present invention may preferably be combined not only with the analyzer 50 but also a compensating device 60, as shown in FIG. 6.

Figure 7:
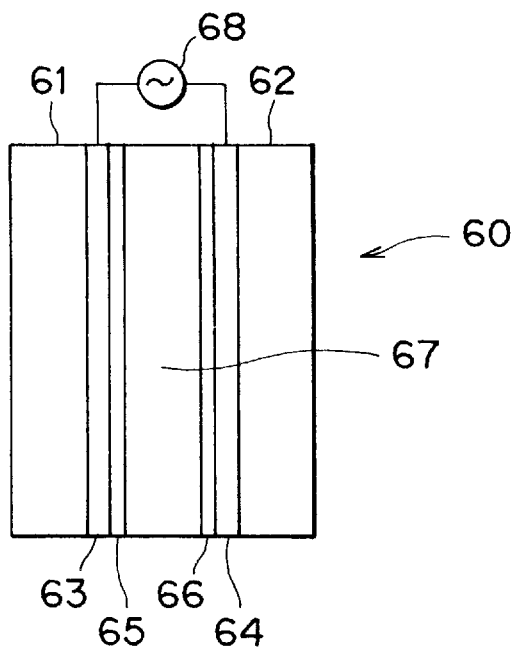
FIG. 7 is a sectional view schematically showing a compensating device of FIG. 6.

FIG. 7 schematically shows the structure of the compensating device 60. The compensating device is of a sandwich structure in which an ITO film 63, an alignment layer 65, a liquid crystal layer 67, the other alignment layer 66 and the other ITO film 64 are sandwiched between a glass plate 61 and the other glass plate 62. The liquid crystal layer 67 is formed of nematic liquid crystal. The alignment layers 65 and 66 are prepared by rubbing techniques for ensuring that the liquid crystal molecules line up in the homogeneous arrangement similar to the SLM 1 of the present invention. Accordingly, similarly to the liquid crystal layer 16 of the present invention, the liquid crystal molecules are arranged to extend along the Y-Z plane as shown in FIGS. 3(a) through 3(e). A power supply 68 is provided for applying an ac electric voltage of an amplitude v' between the ITO films 63 and 64. The electric voltage V' is directly applied through the liquid crystal layer 67.

The compensating device 60 having the above-described structure may be combined with the SLM 1 and the analyzer 50 as shown in FIG. 6. It is noted that the compensating device 60 should be placed relative to the SLM in such a state that the liquid crystal molecules in the compensating device are aligned with the liquid crystal molecules in the SLM. In other words, the Y-Z plane of the liquid crystal layer 67 of the compensating device 60 and the Y-Z plane of the layer 16 of the SLM 1 should be aligned parallel to each other. The linearly polarized beam (c) with its polarization direction shifted by 45 degrees from those Y-Z planes should be utilized as the read light.

The read light (c) passes through a half mirror 70 and is projected onto the glass plate 62. The read light (c) propagates through the liquid crystal layer 67 and outputs from the compensating device 60 through the glass plate 61. The read light (c) is then incident on the glass plate 19 of the SLM 1 and propagates through the liquid crystal layer 16. The read light (c) reflects off the mirror layer 14 and again propagates through the liquid crystal layer 16. The read light then outputs from the SLM 1 through the glass plate 19 and is incident on the compensating device 60 through the glass plate 61. The read light again propagates through the liquid crystal layer 67 and outputs through the glass plate 62 from the compensating device 60. The read light is then reflected by the half mirror 70 before being projected on the analyzer 50.

Similarly as in the liquid crystal layer 16 of the SLM, in the liquid crystal layer 67 of the compensating device 60, the read light is separated into the ordinary ray (b) and the extraordinary ray (a). The phase difference $\delta'$ attained between the ordinary ray and the extraordinary ray while they propagate in the liquid crystal layer 67 can be represented by the following expression, $$\delta' = 2\pi(n_x' - n_y'(V'))d'/\lambda$$

where d' represents a thickness of the liquid crystal layer 67, $n_x'$ represents a refractive index which the liquid crystal layer 67 presents with respect to the ordinary ray (b) and which has the same constant value as that of the refractive index $n_x$ of the liquid crystal layer 16 of the SLM, $n_y'(V')$ represents a refractive index which the liquid crystal layer 67 presents with respect to the extraordinary ray and which is changed in accordance with the amplitude V' of a driving voltage applied through the liquid crystal layer 67, and $\lambda$ represents a wavelength of the read light (c) in vacuum.

Accordingly, a total phase difference $\delta_{total}$ attained between the ordinary ray and the extraordinary ray while they travel through the compensating device 60 and the SLM 1 to reach the analyzer 50 is represented by the following expression, $$\delta_{total}(W) = 2\pi(n_x - n_y(W))(2d)/\lambda + 2\pi(n_x' - n_y'(V'))(2d')/\lambda.$$

The total phase difference $\delta_{total}$ should have a value of a multiple of $2\pi$ radians (i.e., a product of $2\pi$ radians by an integer) when the intensity W of the write light incident to the SLM 1 has a value of zero (0). In other words, $\delta_{total}$ (W=0) should have a value of a multiple of $2\pi$ radians. Accordingly, the amplitude V' of the driving voltage applied to the compensating device 60 is selected to such a value V'$_0$ as may allow the total phase difference $\delta_{total}$(W=0) to have a value of a multiple of $2\pi$. When the total phase difference $\delta_{total}$(W=0) is a multiple of $2\pi$, a linearly polarized beam which has a polarization plane the same as that of the inputted beam (c) is obtained where W=0. Since the orientation of the analyzer 50 is perpendicular to the polarization plane of the beam (c), the beam may not pass through the analyzer 50 at all, and the light intensity detected by the detector 80 will become zero (0). In other words, the selected amplitude V'$_0$ can control the combination of the SLM 1 and the compensating device 60 to modulate the intensity of the read light (c) into a value of zero (0) when no write light is incident to the SLM 1.

In order to operate the optical system of FIG. 6, the amplitude V' of the driving voltage applied to the compensating device 60 should be fixed at the selected value V'$_0$. Accordingly, it becomes possible to modulate intensity of read light (c) exactly in accordance with the intensity W of write light.

The present inventors produced an example of the SLM 1 through the already-described fabrication method, and prepared an optical set up shown in FIG. 6. The present inventors projected the read light (c) to the half mirror 70. Where no write light was incident to the photoconductive layer 13, the inventors controlled the power supply 68 to adjust the amplitude V' until the intensity of the read light outputted through the analyzer 50 darkened to the minimum value. The inventors then adjusted the amplitude v' to be fixed at the value V'$_0$ which was applied when the output intensity became minimized. Then, the inventors projected write light onto the photoconductive layer 13. The intensity W of the write light was uniform over the entire surface of the photoconductive layer 13. The present inventors changed the intensity W, and monitored how the intensity of the output read light detected by the detector 80 was changed.

Figure 8:
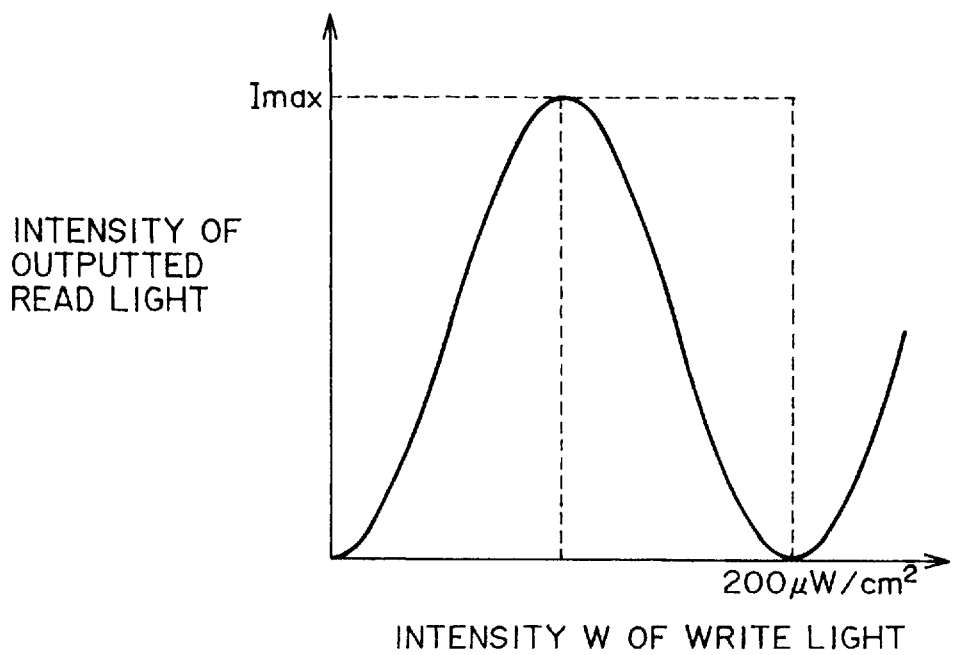
FIG. 8 is a graph showing a test result showing the intensity modulation characteristic obtained by the optical system of FIG. 6.

A graph of FIG. 8 shows how the output intensity was varied in accordance with the intensity of the write light W. This graph shows that the output intensity changes in a sine curve with respect to the write light intensity W. This graph therefore shows that the read light can be modulated continuously from 0 to Imax and therefore a grey level can be stably obtained.

In the above description, in order to allow the total phase difference $\delta_{total}$(W=0) to have a value of a multiple of $2\pi$ radians, the amplitude V' of the driving voltage is selected to such a value V'$_0$ as attains the total phase difference $\delta_{total}$(W=0) of a multiple of $2\pi$. However, the compensating device 60 may be rotated about an optical axis of the read light (i.e., the direction Z) which extends perpendicular to the surface of the glass plate 62. Thus rotating the compensating device 60 also changes the phase difference amount $\delta$'. Accordingly, the compensating device may be rotated by such a degree as allows the total phase difference $\delta_{total}$(W=0) to have a multiple of $2\pi$ radians, and may be fixed at the thus selected rotational position. With this arrangement, intensity of the read light (c) can be modulated exactly in accordance with the intensity W of the write light.

The present inventors further conducted the following measurement in order to measure the phase modulation characteristics of the example of the SLM 1 with respect to the parallel read light (a) and the perpendicular read light (b). The present inventors prepared an optical set up of a Twyman-Green interferometer shown in FIG. 9. The SLM 1 was supplied with ac electric voltage having an amplitude of 5 volts. The write light having a uniform intensity distribution was projected over an entire surface of the write side glass plate 11 of the SLM 1. In the Twyman-Green interferometer, a linearly-polarized coherent light ray having a uniform intensity distribution from a laser diode (LD) 81 was converted into a parallel beam through a collimating lens system 82. The light beam outputted from the collimating lens system 82 was projected onto a half mirror 83 where the light beam was divided into two light beams. One of the two light beams was projected onto the glass plate 19 of the SLM 1 as read light. The other one of the two light beams was projected onto a mirror 84 as a reference light. Since the light from the LD 81 was thus used as the read light for the SLM 1, the LD 81 was located with respect to the SLM 1 so that the polarization plane of the light beam outputted from the LD 81 was parallel to the molecules arranged in the liquid crystal layer 16 of the SLM 1. The read light modulated by and outputted from the SLM 1 and the reference light reflected at the mirror 84 was superposed at the half mirror 83 to undergo interference. The intensity of the thus superposed light beams was detected by a light intensity detector 85. The intensity D thus detected by the detector 85 can be represented by the equation D=$\sin^2 \Delta\phi$, where $\Delta\phi$ is a phase modulation amount with which the SLM 1 modulates the read light. Based on the detected result D, the present inventors calculated the equation to determine the phase modulation amount.

The above measurement was repeatedly conducted while the intensity W (per unit area) of the write light incident on the surface of the photoconductive layer 13 was changed.

In the above measurement, the LD 81 was located so that the parallel read light (a) was projected onto the SLM 1. The same measurement was then conducted where the LD 81 was located so that the perpendicular read light (b) was projected onto the SLM 1.

Figure 10:
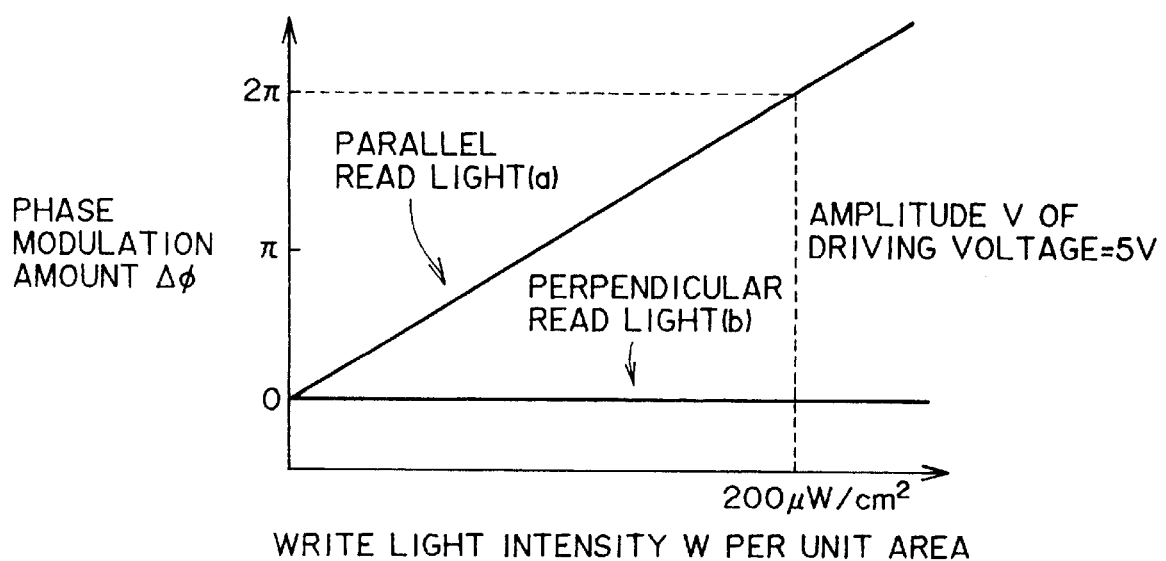
FIG. 10 is a graph showing a test result showing the phase modulation characteristic obtained by the optical system of FIG. 9.

FIG. 10 roughly shows test results obtained through the above-described measurements and therefore shows the phase modulation characteristics of the SLM 1. This graph shows that the SLM 1 of the present invention can modulate phase of the parallel read light (a) by $2\pi$ radians where the write light having an intensity per unit area of 200 $\mu$W/cm$^2$ is incident to the glass plate 11. Thus, the SLM of the present invention can attain a phase modulation having a dynamic range from 0 toward higher than $2\pi$ radians which is far broader than the dynamic range attained by conventional SLMs. This graph also shows that the SLM 1 of the present invention can attain a continuous phase modulation with respect to the read light (a).

FIG. 10 also shows that the SLM 1 of the present invention does not modulate phase of the perpendicular read light (b) at all. It is therefore confirmed that the SLM 1 of the present invention can perform a phase-only modulation with respect to the light (a) having a polarization plane aligned with the Y-Z plane along which the liquid crystal molecules are arranged to extend.

Figure 11:
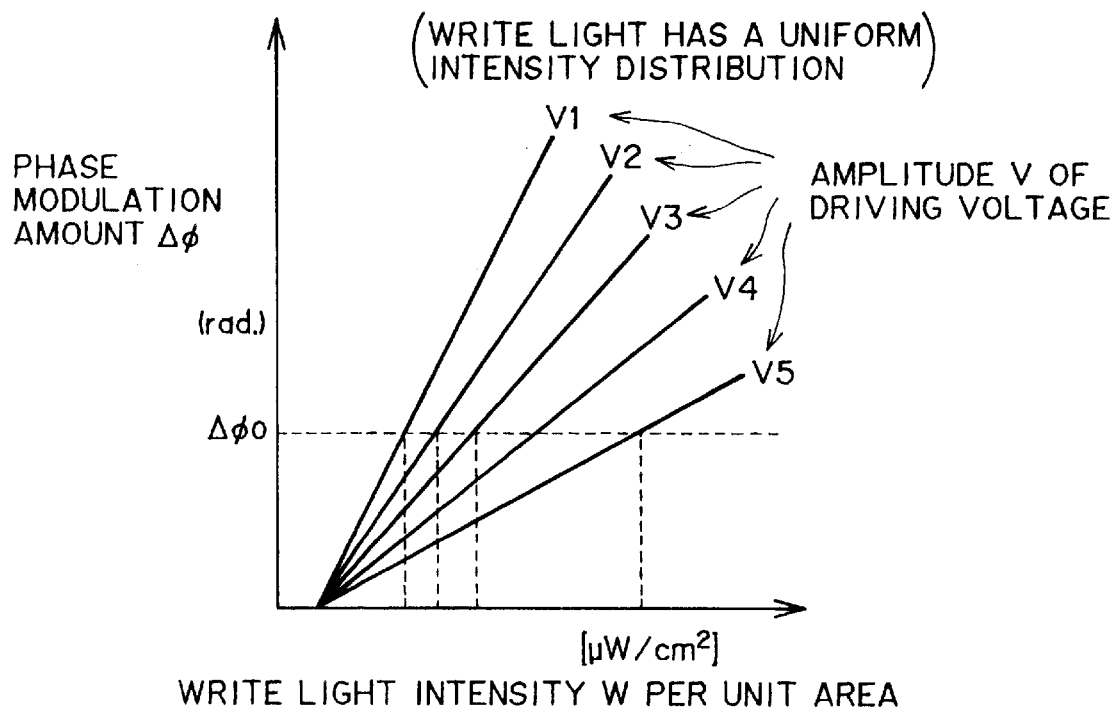
FIG. 11 is a graph showing a theoretical phase modulation characteristic of the SLM of the present invention indicating a relationship between the phase modulation amount and the write light intensity per unit area and the applied voltage amplitude.
Figure 12:
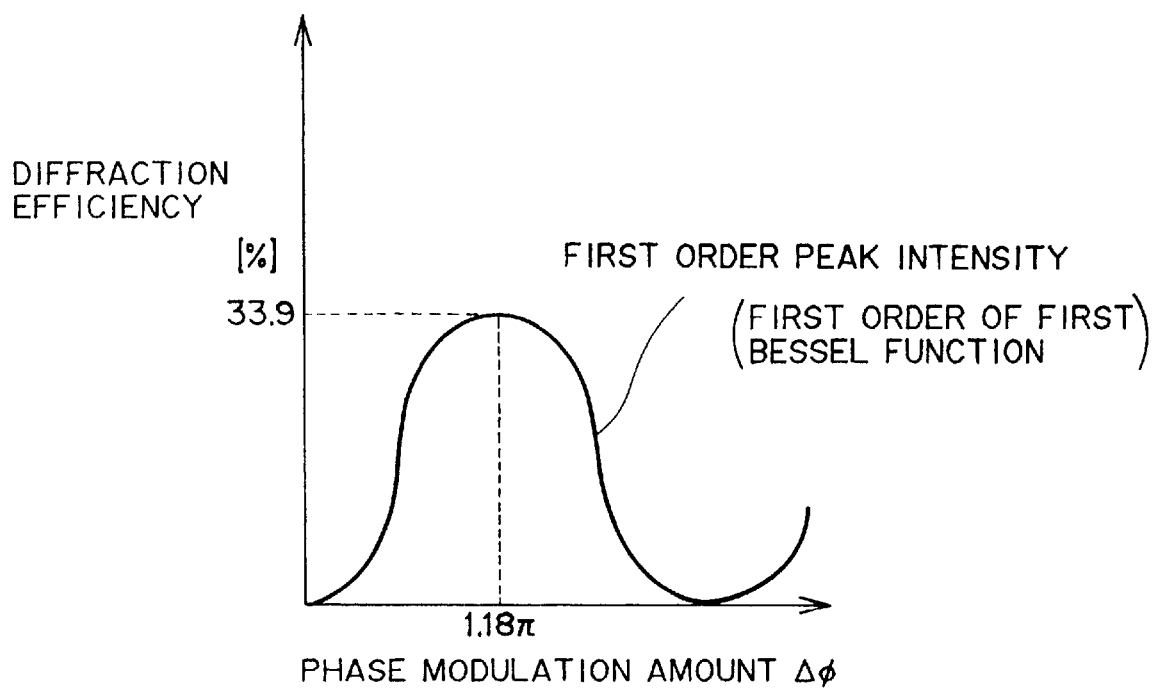
FIG. 12 is a graph showing a theoretical phase modulation characteristic of the SLM of the present invention indicating a relationship between the diffraction efficiency and the phase modulation amount.

The present inventors have further researched the SLM 1 of the present invention and discovered that the SLM 1 of the present invention generally has theoretical phase modulation characteristics as shown in FIGS. 11 and 12.

FIG. 11 shows the modulation characteristics of the SLM where write light having a uniform intensity distribution is incident on the photoconductive layer 13. As shown in the graph, a phase modulation amount $\Delta\Phi$ with which the liquid crystal layer 16 modulates the parallel read light (a) varies dependently on the light intensity W of the write light per unit area of the surface of the photoconductive layer. This graph also shows that changing the amplitude V of the driving voltage changes the intensity of the write light W required to allow the liquid crystal layer 16 to modulate the read light (a) with a desired phase modulation amount $\Delta\Phi_0$. It is therefore apparent that the phase modulation amount $\Delta\Phi$ varies also dependently on the amplitude V of the ac driving voltage applied to the SLM. Accordingly, adjusting at least one of the driving voltage amplitude V and the write light intensity W controls the SLM 1 to attain the desired phase modulation amount $\Delta\Phi_0$.

FIG. 12 shows the modulation characteristics of the SLM where the write light bearing intensity distribution of a grating pattern having a predetermined spatial frequency is incident to the photoconductive layer 13. The intensity distribution of the write light has a mean intensity per unit area of the surface of the photoconductive layer 13 (which will be referred to as a "mean intensity W'," hereinafter). In this case, a grating pattern having two levels of phase modulation amount is recorded in the liquid crystal layer 16. (A difference between the two levels corresponds to a phase modulation depth of the grating pattern.) Accordingly, the liquid crystal layer 16 acts as a diffraction grating with respect to the parallel read light (a). As shown in FIG. 12, diffraction efficiency with which the liquid crystal layer diffracts the read light (a) to produce a first order diffraction peak varies dependently on a phase modulation amount or depth $\Delta\Phi$ of the grating pattern which is changed according to at least one of the driving voltage amplitude V and the write light mean intensity W'. FIG. 12 shows that where a grating pattern having the predetermined value of spatial frequency is incident to the photoconductive layer 13, adjusting at least one of the amplitude V and the mean intensity W' to control the SLM 1 to attain a phase modulation depth $\Delta\Phi$ of $1.18\pi$ can diffract the read light (a) to produce a first order diffraction peak with a maximum diffraction efficiency of about 33.9%.

FIG. 12 therefore shows that in order to diffract the read light (a) with a maximum diffraction efficiency, the SLM should be controlled at a phase modulation amount $\Delta\Phi$ which is determined dependently on the spatial frequency of the pattern born on the write light. Accordingly, it is apparent from FIGS. 11 and 12 that in order to diffract the read light (a) with the maximum diffraction efficiency according to a write light pattern having any spatial frequency, it is preferable to adjust at least one of the driving voltage amplitude V and the write light mean intensity W' to control the SLM to attain a phase modulation amount $\Delta\Phi$ proper to the spatial frequency of the write light pattern.

The present inventors conducted the following various types of measurements with respect to the example of the SLM 1 produced through the already-described fabrication method.

Figure 9:
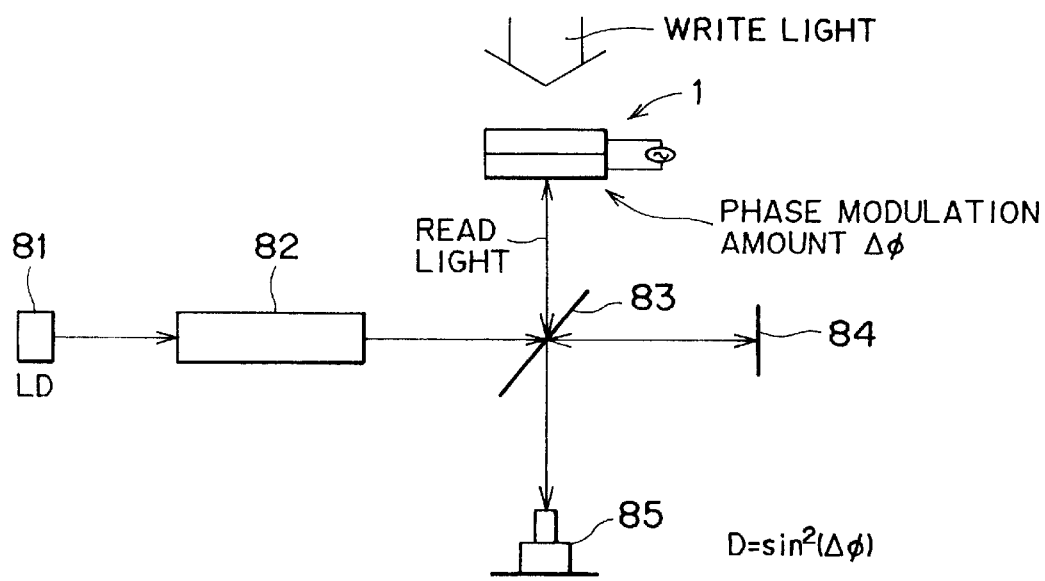
FIG. 9 is an optical set up employed for measuring a phase modulation characteristic of the SLM of the present invention.

First, the present inventors again prepared the optical set up of FIG. 9 to construct the Twyman-Green interferometer. In the present measurement, the experiment described already with reference to FIG. 9 was repeatedly conducted while the amplitude V was changed. Accordingly, this experiment was conducted to measure how the phase amount with which the SLM modulates the parallel read light (a) was affected by changes in the write light intensity W and also in the amplitude V. This experiment was conducted also with respect to the perpendicular read light (b).

Figure 13:
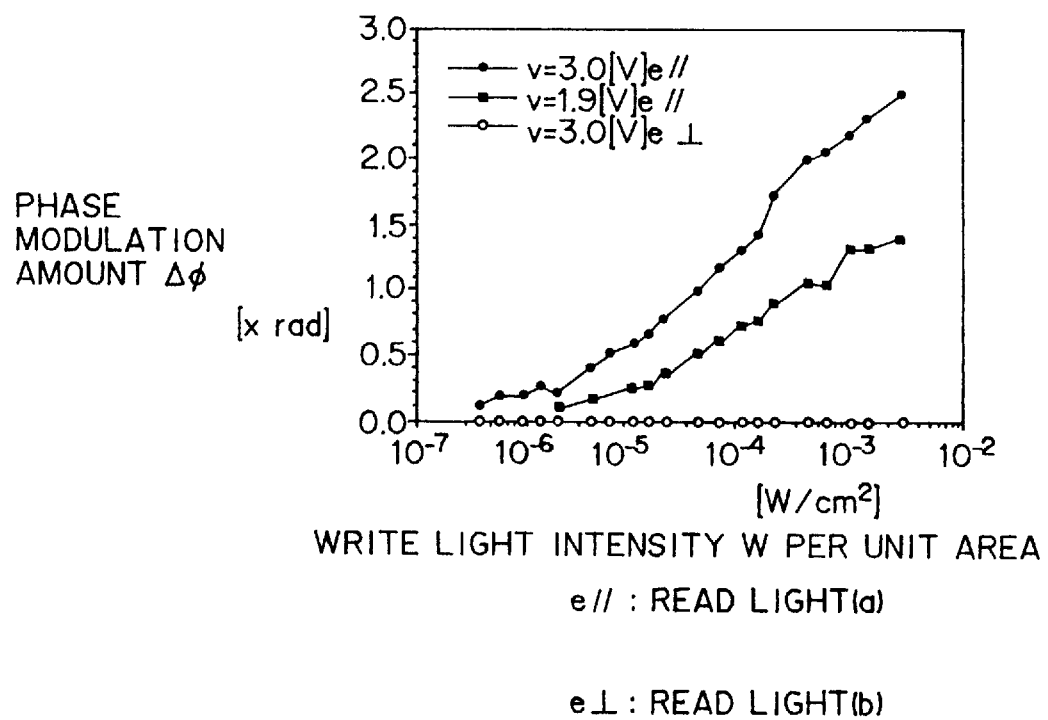
FIG. 13 is a graph showing a measured phase modulation characteristic of the SLM of the present invention indicating a relationship between the phase modulation amount and the write light intensity.

FIG. 13 shows the result detected through the present experiment. The experimental result of FIG. 13 corresponds to the theoretical graph shown in FIG. 11. FIG. 13 therefore confirms that the SLM of this example modulates phase of the read light (a) with a phase modulation amount which varies dependently both on the amplitude V and the write light intensity W. FIG. 13 also confirms that the SLM of this example does not modulate phase of the read light (b).

Figure 14:
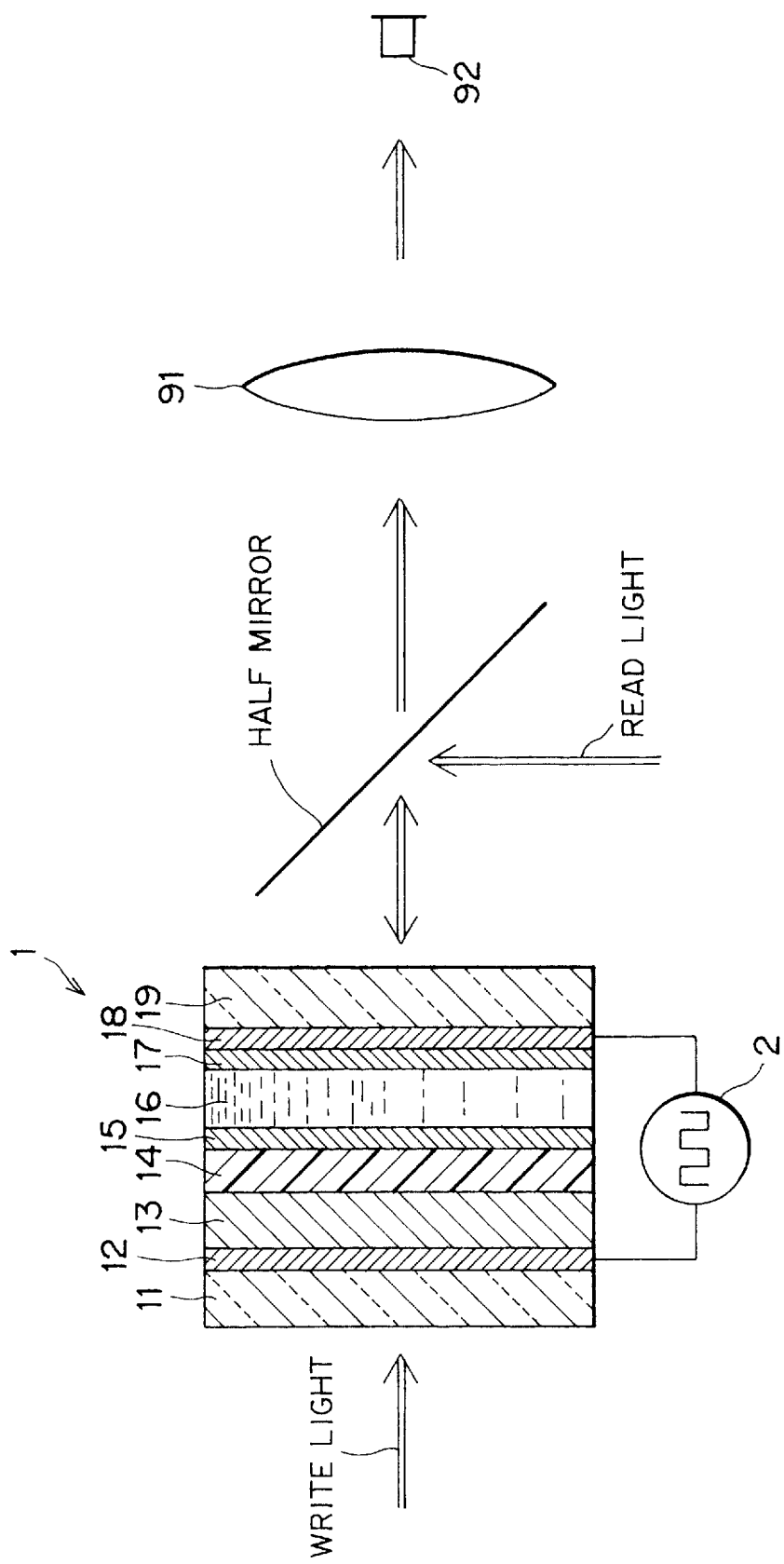
FIG. 14 is an optical set up employed for measuring a phase modulation characteristic of the SLM of the present invention.

Then, the present inventors prepared an optical set up shown in FIG. 14. In this experiment, write light having a grating pattern of a rectangular wave shape was projected onto the hydrogenated amorphous silicon layer 13. The grating pattern had a predetermined spatial frequency. A grating pattern of refractive index $n_y(W)$ was therefore formed in the liquid crystal layer 16. Parallel read light (a) having uniform intensity distribution was projected onto the liquid crystal layer 16. The grating pattern formed in the liquid crystal layer 6 modulated the read light (a) in phase to thereby diffract it. The diffracted read light (a) was Fourier transformed by a Fourier transform lens 91 to form a first order diffraction peak on a focal plane of the lens 91. Intensity of the thus formed first order diffraction peak was detected by a light intensity detector 92 such as a photo-diode. Based on the detected intensity of the first order peak, diffraction efficiency with which the SLM 1 diffracted the read light (a) and formed the first order diffraction was calculated. (The diffraction efficiency E is defined by an equation E=I/L where I is intensity of the diffraction peak and L is intensity of the read light (a) projected on the liquid crystal layer 16.) The above measurement and calculation was repeatedly conducted while the spatial frequency of the grating pattern of the write light was changed.

Figure 15:
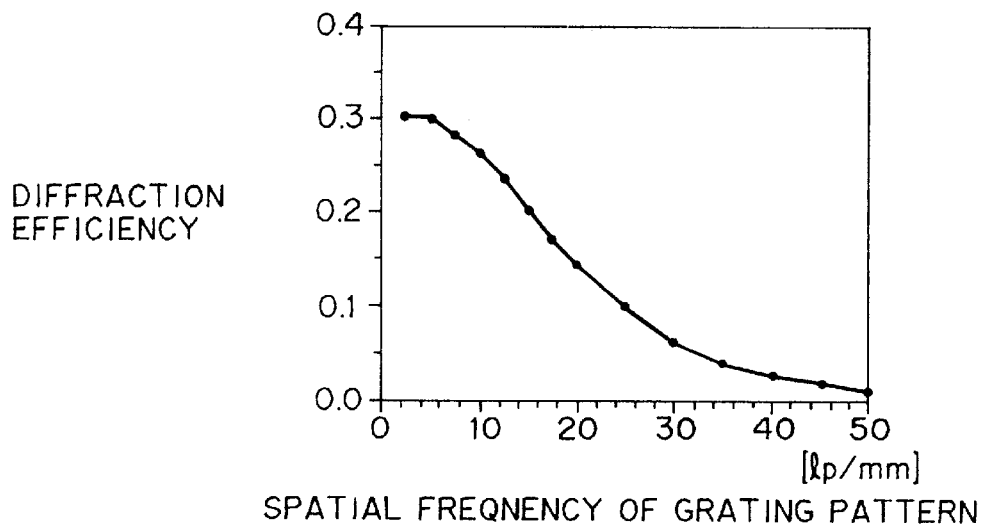
FIG. 15 is a graph showing a measured phase modulation characteristic of the SLM of the present invention indicating a relationship between the diffraction efficiency and the spatial frequency of a grating pattern of the write light.

Detected results in FIG. 15 show that the SLM 1 of this example attained the diffraction efficiency of 31% at maximum which is close to the theoretical maximum diffraction efficiency of 33.9%.

The present inventors further conducted the following measurement with the use of the optical set up of FIG. 14. Similarly to the above measurement, write light bearing a grating pattern of a predetermined spatial frequency was projected onto the hydrogenated amorphous silicon layer 13. Parallel read light (a) having uniform intensity distribution was projected onto the liquid crystal layer 16. The liquid crystal layer modulated phase of the read light (a) to thereby diffract it and produce a zero order diffraction peak, a first order diffraction peak, a second order diffraction peak, and a third order diffraction peak. In this measurement, intensities of the thus obtained diffraction peaks were detected and their diffraction efficiencies were calculated. This measurement was repeatedly conducted where either the driving voltage amplitude V, a mean intensity W' of the grating pattern, or both were adjusted to change the phase modulation amount with which the liquid crystal layer 16 modulated the read light (a). In other words, the measurement was repeated where a phase modulation depth of the grating pattern recorded in the liquid crystal layer 16 was changed into various values.

Figure 16:
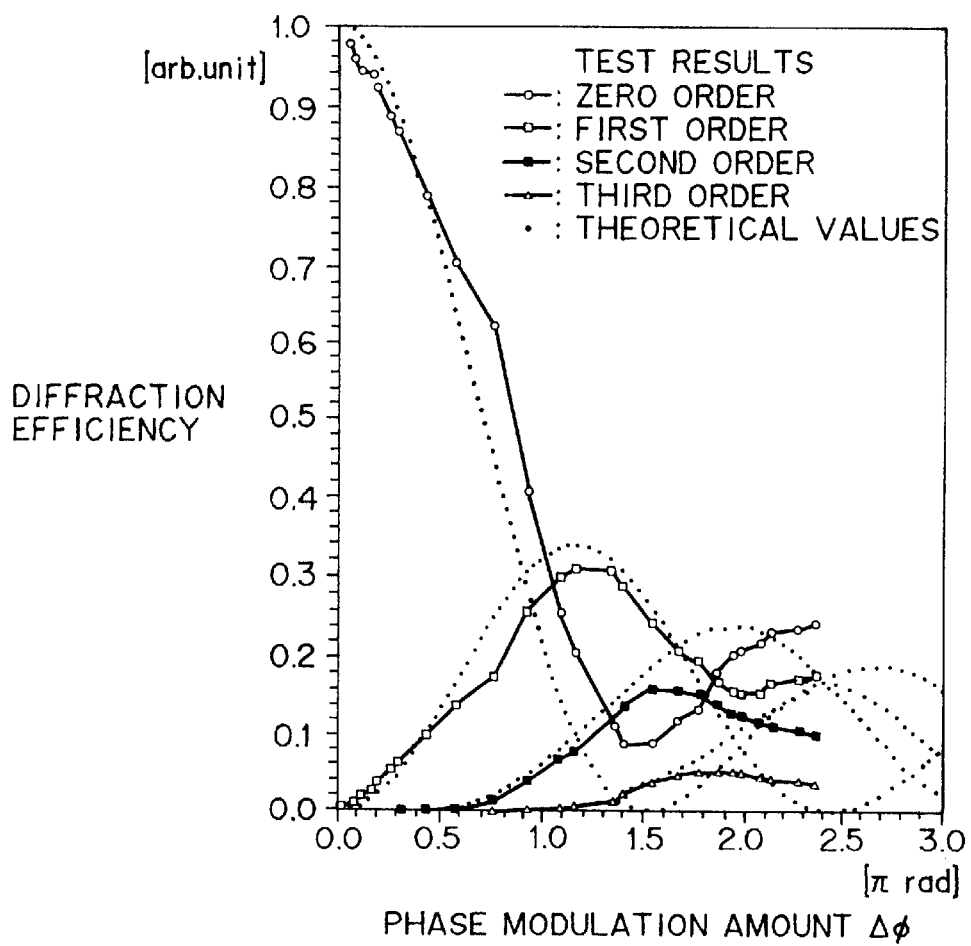
FIG. 16 is a graph showing a measured phase modulation characteristic of the SLM of the present invention indicating a relationship between the diffraction efficiency and the phase modulation amount.

In FIG. 16, results detected through the above experiment are shown together with data theoretically calculated on the assumption that the SLM would have attained a Raman-Nath diffraction. This graph shows that the detected results certainly followed the theoretical data of FIG. 12.

The detected results of FIGS. 13, 15 and 16 confirm that adjusting either the driving voltage amplitude V, the write light mean intensity W', or both controls the SLM of this example to diffract the read light (a) with the maximum diffraction efficiency.

The present inventors further performed the following experiment with using the optical set up of FIG. 14. Ac electric voltage having a predetermined amplitude V was applied to the SLM. Write light bearing a grating pattern with a predetermined mean intensity W' and a predetermined spatial frequency was projected onto the hydrogenerated amorphous silicon layer 13. As a result, a grating pattern of a refractive index $n_y$ was recorded in the liquid crystal layer 16. Parallel read light (a) having a uniform intensity distribution was projected onto the liquid crystal layer 16. The liquid crystal layer 16 diffracted the read light (a) and produced a first order diffraction peak. The intensity of the first order diffraction peak was detected, and diffraction efficiency was calculated. The measurement was repeatedly conducted while intensity of the read light (a) projected on the liquid crystal layer 16 was varied.

The present inventors also performed this measurement with a twisted nematic liquid crystal spatial light modulator (which will be referred to as a "TNLC-SLM," hereinafter). The structure of the TNLC-SLM was the same as that of the SLM of this example, except for the liquid crystal layer 16. In the TNLC-SLM, nematic liquid crystal molecules were arranged in a twisted form as shown in FIG. 2(b).

Figure 17A:
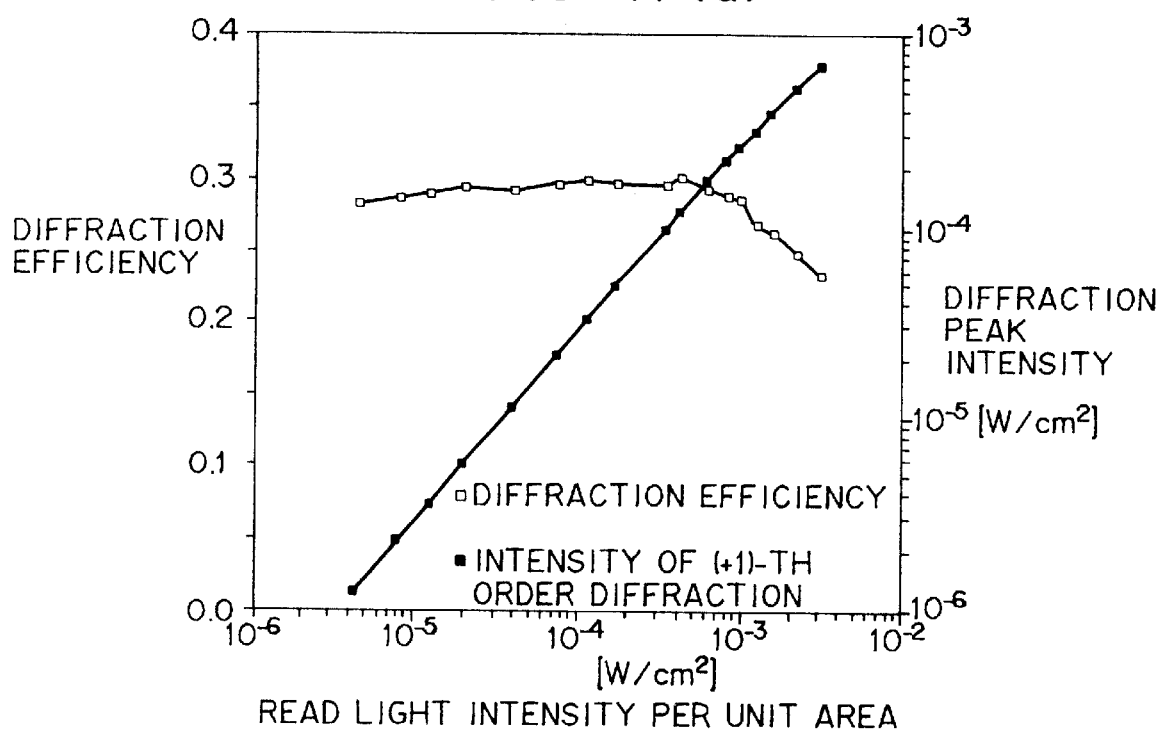
FIG. 17(a) is a graph showing a measured phase modulation characteristic of the SLM of the present invention indicating a relationship between the diffraction efficiency and the read light intensity.
Figure 17B:
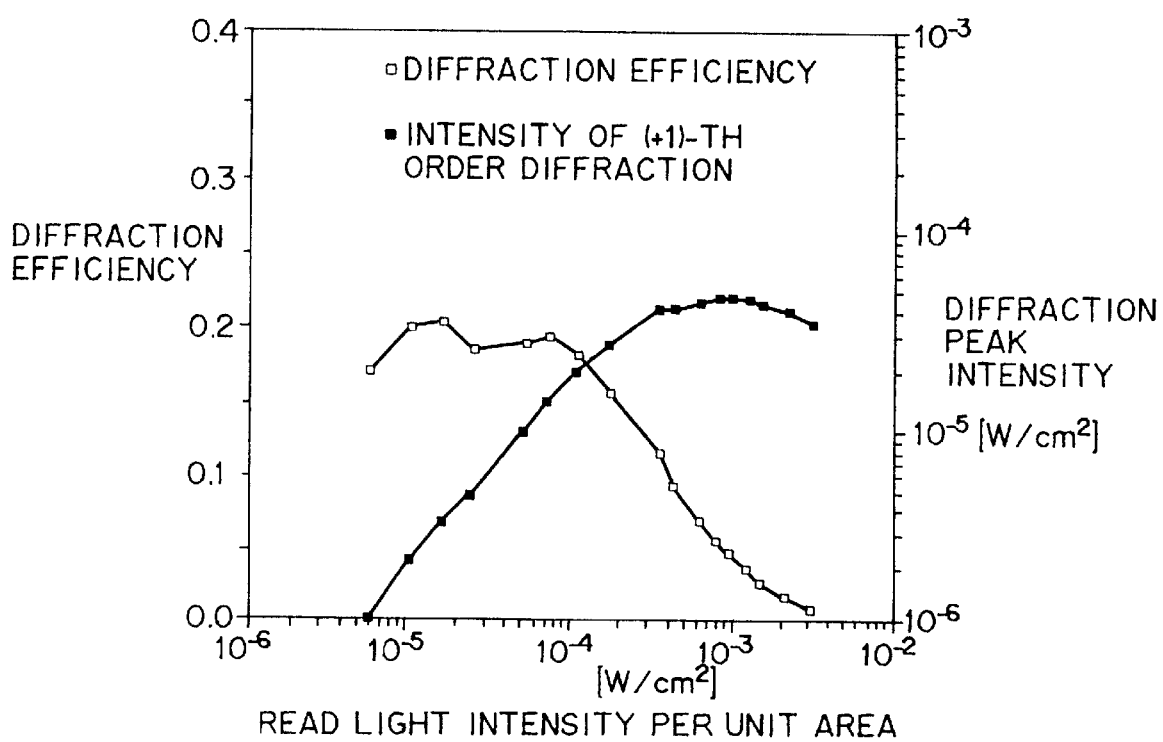
FIG. 17(b) is a graph showing a measured phase modulation characteristic of a TN-SLM of a comparative example indicating a relationship between the diffraction efficiency and the read light intensity.

FIG. 17(a) shows the intensity of the first order diffraction peak obtained by the SLM of this example and the diffraction efficiency calculated therefor. FIG. 17(b) shows the intensity of the first order diffraction peak obtained by the TNLC-SLM and the diffraction efficiency calculated therefor. FIG. 17(b) shows that as the intensity of the read light (a) increases, the diffraction efficiency attained by the TNLC-SLM lowers. Contrarily, as shown in FIG. 17(a), the diffraction efficiency of the SLM of this example lowers very little as the read light intensity increases. In other words, contrary to the TNLC-SLM, the SLM of this example has a great advantage in that it is affected very little by the read light partly leaking from the liquid crystal layer 16 through the mirror layer 14 into the photoconductive layer 13.

Generally, the mirror layer 14 has a reflectivity of 99.9% or more. Accordingly, as the intensity of read light projected onto the liquid crystal layer 16 increases, amount of light leaking through the mirror layer 14 from the liquid crystal layer 16 to the photoconductive layer 13 may not be neglected with respect to the write light intensity. Accordingly, in the TNLC-SLM, a light blocking layer formed, for example, of CdTe is provided between the mirror layer 14 and the photoconductive layer 13. Contrarily, the SLM of the present invention is affected by the read light very little, and therefore does not necessitate providing such a light blocking layer. Accordingly, the SLM of the present invention has various advantages in which it is easy to fabricate, it is stable in its operation, it can attain a high resolution, etc.

It is noted that there is a FLC-SLM of a type with no light blocking layer. In order to operate this type FLC-SLM, however, the read light can only be projected onto the FLC-SLM when the write light is not projected onto the FLC-SLM. Contrarily, the SLM of the present invention does not necessitate such a complicated read light control operation.

The above-described various test results confirm that adjusting at least one of the driving voltage amplitude V and the mean intensity W' of the write light controls the SLM of the present invention to attain the maximum diffraction efficiency. The present invention therefore can be used to construct a light modulator 100 as shown in FIG. 18(a).

The light modulator 100 includes the SLM 1 of the present invention, the driving power source 2 for applying the ac electric voltage to the SLM 1, a diffraction peak detector 3 and a feedback controller 4. The driving power source 2 provided in the light modulator 100 preferably includes a rectangular wave generator 21 and an attenuator 22. The rectangular wave generator 21 is provided for generating a rectangular wave-shaped electric voltage (ac electric voltage) having a frequency of 1 kHz and having an amplitude of 5 V. The attenuator 22 is connected to the rectangular wave generator 21 for attenuating the amplitude of the rectangular wave-shaped voltage at an attenuation rate controlled by the feedback controller 4. The diffraction peak detector 3 is provided for detecting intensity of a diffraction peak produced by diffraction of the read light (a) in the SLM 1. The diffraction peak detector 3 is located at such a position as detects intensity of a first order diffraction peak, i.e., (+1)-th or (−1)-th order diffraction peak. The diffraction peak detector 3 outputs a signal representing the intensity of the first order peak. The diffraction peak detector 3 preferably includes a photodiode.

Figure 18B:
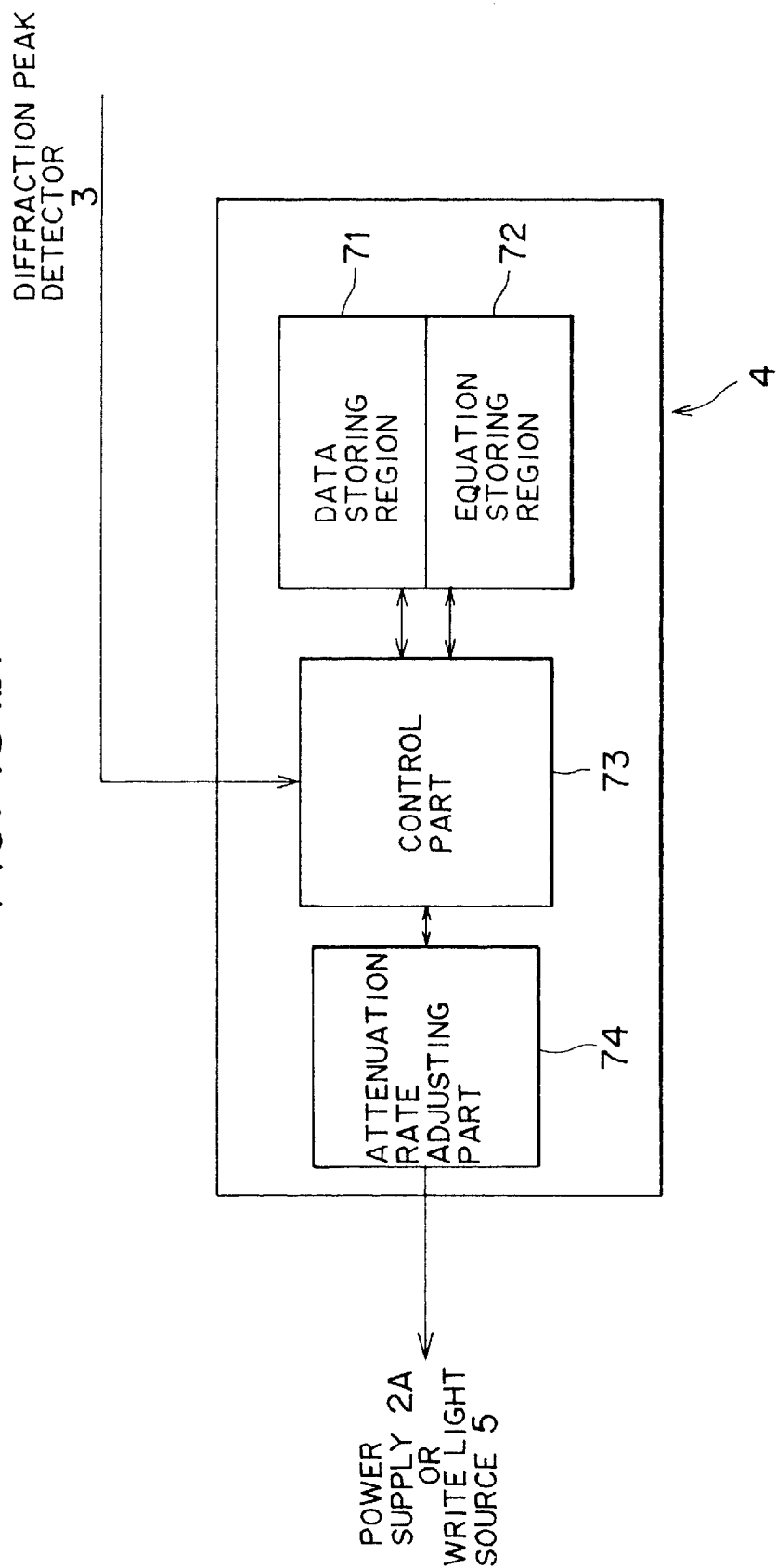
FIG. 18(b) schematically shows a structure of a feedback controller of FIG. 18(a)

The feedback controller 4 is connected between the diffraction peak detector 3 and the attenuator 22 for feedback controlling the attenuator 22 in response to the intensity of the first order peak as detected by the detector 3. The feedback controller 4 receives the signal representing the first order diffraction peak intensity and changes the attenuation rate set in the attenuator 22 accordingly to adjust the amplitude of the rectangular wave-shaped voltage applied to the SLM 1. The feedback controller 4 feedback controls the SLM 1 in a hill-climbing manner to attain the first order diffraction peak intensity I near its maximum value. The feedback controller 4 is formed from, for example, a microcomputer. As shown in FIG. 18(b), the feedback controller 4 includes: a data storing region 71 for storing data of the first order peak intensity I represented by the signal supplied from the detector 3; an equation storing region 72 for storing an equation $\Delta V_i = (-1)^m (\Delta V_{i-1})$ and $V_i = V_{i-1} + \Delta V_{i-1}$ (to be described later); a control part 73 for performing the hill-climbing feedback operation to calculate a proper voltage amplitude value $V_i$ and a proper voltage adjusting value $\Delta V_i$ (to be described later); and an attenuation rate adjusting part 74 for adjusting the attenuation rate of the attenuator 22 so that an ac electric voltage having a desired amplitude $V_i$ may be applied to the SLM 1.

Figure 19:
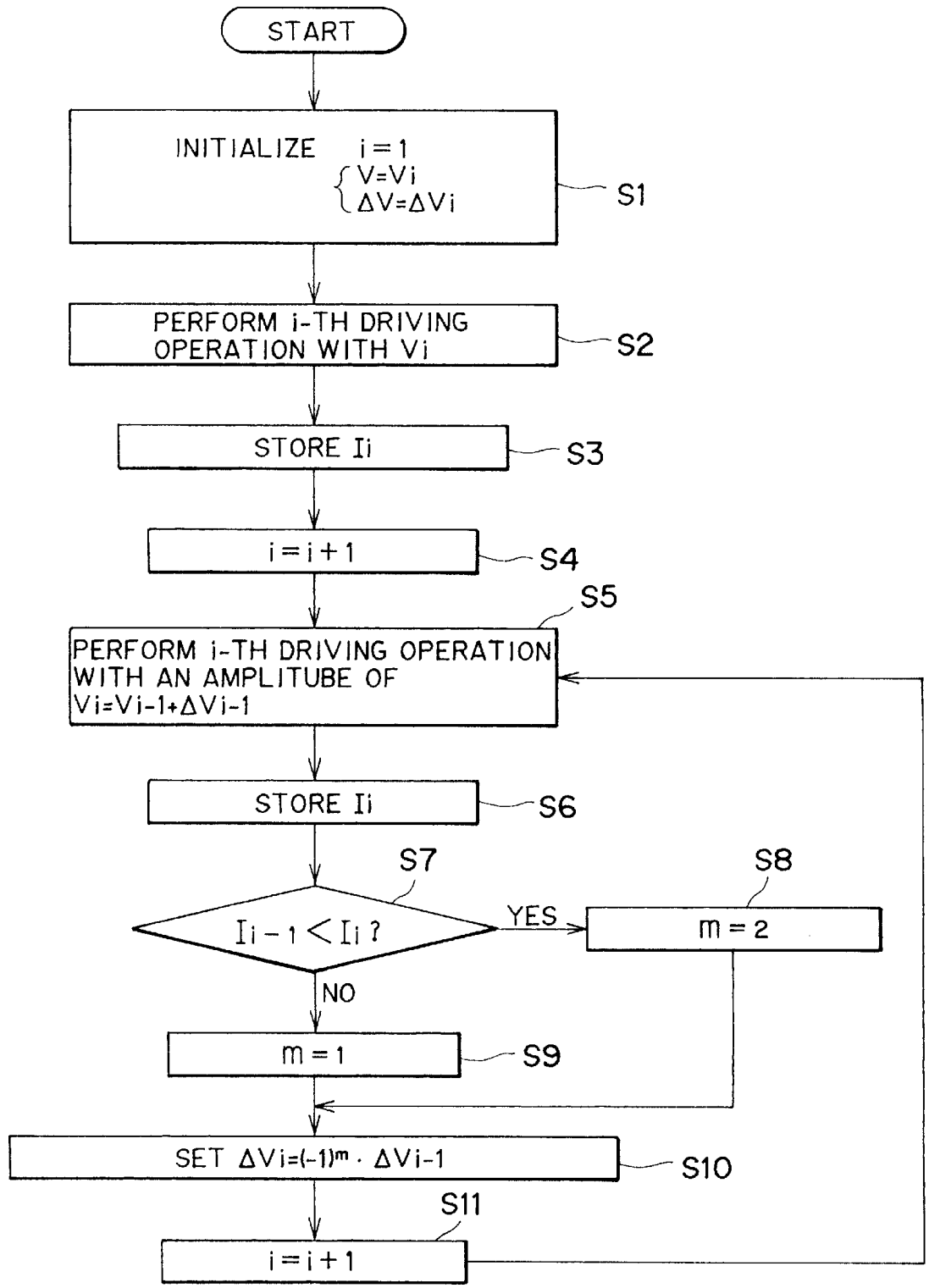
FIG. 19 is a flow chart showing a hill-climbing manner-used feedback operation so as to maximize the formed first order diffraction peak.

The feedback operation achieved by the feedback controller 4 will be described hereinafter with reference to a flow chart shown in FIG. 19.

Write light bearing an arbitrary pattern is projected onto the photoconductive layer 13 through the glass plate 11. Parallel read light (a) having a uniform intensity distribution is projected onto the liquid crystal layer 16 through the glass plate 19. As described already, the read light (a) is a linearly polarized beam having its polarization plane extending along the Y-Z plane along which the liquid crystal molecules are arranged to extend in the liquid crystal layer 16. The read light (a) is a coherent light beam.

In this state, when the light modulator 100 is energized, the control part 73 of the feedback controller 4 initializes in a step S1 to set a value V (for example, 5 volts) to a first amplitude $V_1$ to be used in a first driving operation (to be described later) and to set a value $\Delta V$ (for example, 0.1 voltage) to a first adjusting amount $\Delta V_1$ to be used in a second driving operation (to be also described later).

The attenuation rate adjusting part 74 then controls the attenuator 22 so as to supply the SLM 1 with a rectangular wave-shaped voltage having the first amplitude $V_1$ which is now set to the value of V. As a result, the SLM 1 is driven with the driving voltage having the amplitude of V to thereby achieve a first driving operation in step S2. According to the first driving operation, the liquid crystal molecules in the liquid crystal layer 16 tilt at an angle in accordance with the write light pattern incident on the photoconductive layer 13, to thereby record the write light pattern in the liquid crystal layer 16. The read light (a) projected in the liquid crystal layer 16 is modulated in phase in accordance with the write light pattern. In other words, the read light is diffracted in accordance with the write light pattern. The read light (a) thus modulated in and outputted from the SLM 1 forms a first order diffraction peak corresponding to the input pattern.

The diffraction peak detector 3 detects intensity I of the first order peak thus obtained by the first driving operation (which will be referred to as a "first driving operation intensity $I_1$," hereinafter.) The diffraction peak detector 3 outputs to the feedback controller 4 the signal representative of the first driving operation intensity $I_1$. In step S3, the feedback controller 4 stores in the data storing region 71 the value of the first driving operation intensity $I_1$.

In steps S4 and S5, the control part 73 of the feedback controller 4 then performs its second driving operation. In the second driving operation, the control part 73 first calculates the equation $V_i = V_{i-1} + \Delta V_{i-1}$ (where i=2) stored in the storing region 72. In other words, the control part 73 calculates a second amplitude $V_2$ which is equal to the sum of the first amplitude $V_1$ (now set to V) and the first adjusting amount $\Delta V_1$ (now set to the value $\Delta V$), that is, the value $V + \Delta V$. Then, the attenuation rate adjusting part 74 adjusts the attenuation rate set in the attenuator 22 so that the attenuator may supply the SLM 1 with a rectangular wave voltage having the second amplitude $V_2$. Accordingly, the SLM 1 is driven by the driving voltage with amplitude equaling $V + \Delta V$ to achieve a second driving operation. Similarly as in the first driving operation, a first order diffraction peak is obtained, and the diffraction peak detector 3 detects its intensity (which will be referred to as a "second driving operation intensity $I_2$," hereinafter). The detector 3 outputs the signal indicative of the intensity $I_2$, and the feedback controller 4 stores in the storing region 71 the value of the intensity $I_2$ in step S6.

Then, in step S7, the control part 73 of the feedback controller 4 compares the values of the first and second driving operation intensities $I_1$ and $I_2$ stored in the data storing region 71. If the value $I_2$ is larger than the value $I_1$, the control goes to step S8 where the control part 73 sets a value of two (2) to a sign setting value m of the equation $\Delta V_i = (-1)^m (\Delta V_{i-1})$ (where i=2) stored in the equation storing region 72. Then, in steps S10 and S11, the control part 73 calculates the expression $\Delta V_i = (-1)^m (\Delta V_{i-1})$ (where i=2), to determine a second adjusting amount $\Delta V_2$ to be used in a third driving operation. In other words, the control part calculates the expression $\Delta V_2 = (-1)^m (\Delta V_1)$. Since the sign setting value m is now set to two, the value $\Delta V_2$ is equal to a value of $(-1)^2 (\Delta V_1)$ and accordingly to $\Delta V_1$. In other words, the control part sets the second adjusting amount $\Delta V_2$ equal to the first adjusting amount $\Delta V_1$ (now set to $\Delta V$), that is, $\Delta V$.

Then, in step S5, the control part 73 performs the third driving operation. That is, the control part first calculates a third amplitude $V_3$ to be used in a third driving operation based on the equation $V_i = V_{i-1} + \Delta V_{i-1}$ (where i=3). In other words, the third amplitude $V_3$ is calculated to have a value equal to the sum of the second amplitude $V_2$ (= $V + \Delta V$) and the second adjusting amount $\Delta V_2$ (= $\Delta V$). The third amplitude $V_3$ is therefore equal to $V + 2(\Delta V)$. The adjusting part 74 then adjusts the attenuation rate set in the attenuator 22 for supplying the SLM 1 with a rectangular wave-shaped voltage having a third amplitude $V_3$ equal to $V + 2(\Delta V)$.

Contrarily, if it is judged in the step S7 that the value $I_2$ is equal to or smaller than the value $I_1$, the control part 73 sets a value of one (1) to the sign setting value m in step S9. Then, in steps S10 and S11, the feedback controller 4 calculates the expression $\Delta V_2 = (-1)^m (\Delta V_1)$ to determine the second adjusting amount $\Delta V_2$. Since the sign setting value m is now set to one, the value $\Delta V_2$ is equal to a value of $(-1)^1 (\Delta V_1) = -\Delta V_1$. In other words, the control part sets the second adjusting amount $\Delta V_2$ to a value which has the same absolute value but which has an inverse sign with respect to the first adjusting amount $\Delta V_1$. Since the first adjusting amount $\Delta V_1$ is set to the value of $\Delta V$, the second adjusting amount $\Delta V_2$ becomes equal to a value of $-\Delta V$.

Then, in step S5, the control part 73 performs the third driving operation. That is, the control part first calculates a third amplitude $V_3$. The third amplitude $V_3$ is now calculated to have a value equal to the sum of the second amplitude $V_2$ (= $V + \Delta V$) and the second adjusting amount $\Delta V_2$ (= $-\Delta V$). The third amplitude $V_3$ is therefore equal to V. The adjusting part 74 then adjusts the attenuation rate set in the attenuator 22 for supplying the SLM 1 with a rectangular wave-shaped voltage having a third amplitude $V_3$ equal to V.

The above-described feedback operation is repeatedly conducted.

To summarize, an (i–1)-th driving operation, conducted with a driving amplitude of $V_{i-1}$, obtains an (i–1)-th driving operation intensity $I_{i-1}$, where i is an integer equal to or higher than 2. An i-th driving operation, conducted with a driving amplitude of $V_i$ (= $V_{i-1} + \Delta V_{i-1}$), obtains an i-th driving operation intensity $I_i$. The feedback controller 4 compares the intensities $I_{i-1}$ and $I_i$, in step S7. If $I_i > I_{i-1}$, in the steps S8, S10 and S11, the feedback controller 4 determines, using an equation of $\Delta V_i = (-1)^m (\Delta V_{i-1})$. an i-th adjusting amount $\Delta V_i$ used for defining the (i+1)-th amplitude $V_{i+1}$ as a value having the same sign as the (i–1)-th adjusting amount $\Delta V_{i-1}$. On the other hand, if $I_i \leq I_{i-1}$, in the steps S9, S10 and S11, the feedback controller 4 determines the i-th adjusting amount $\Delta V_i$ as a value having the inverse sign of the (i–1)-th adjusting amount $\Delta V_{i-1}$.

Repeating the above-described hill-climbing feedback 30 operation controls the first order peak intensity I to be oscillated about its maximum value, to thereby control the SLM 1 to diffract the read light (a) approximately with a maximum diffraction efficiency.

The absolute value $\Delta V$ of the adjusting amount $\Delta V_i$ should be selected to a value as small as possible, in order to oscillate the first order peak intensity I in a smaller range about the maximum value.

In order to oscillate the first order peak intensity I in a further smaller range about the maximum value, the absolute value $|\Delta V_i|$ should not be fixed at the value of $\Delta V$, but should be changed, in the following manner. In the step S7, an absolute value of a difference between the detected first order diffraction peak intensities $I_i$ and $I_{i-1}$ may be calculated, and the i-th adjusting amount $\Delta V_i$ may be defined as a value proportional to the absolute value of the difference. In other words, the i-th adjusting amount may be defined by the following equation, $$\Delta V_i = (-1)^m \alpha |I_i - I_{i-1}|$$

where $\alpha$ is a factor of proportionality.

In the above-described example, the diffraction peak detector 3 is located to detect intensity of a first order diffraction peak. However, the detector 3 may be located to detect intensity of a zero order diffraction peak (which will be referred to as a "zero order diffraction peak I',"

hereinafter.) In this case, the feedback controller 4 should feedback control the power supply 2 in the hill-climbing manner so as to oscillate the zero order diffraction peak I about its minimum value.

Figure 20:
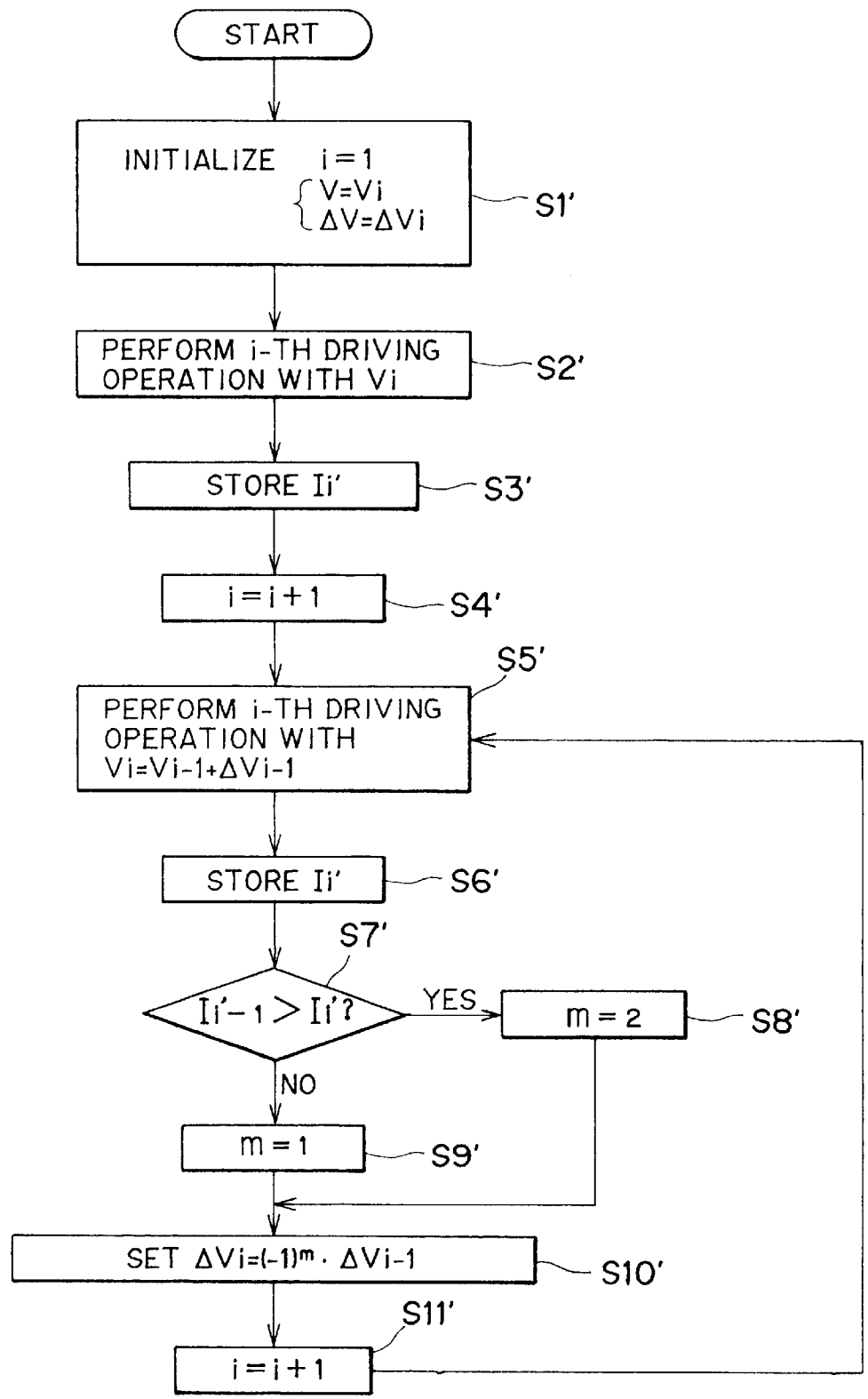
FIG. 20 is a flow chart showing another hill-climbing manner-used feedback operation so as to minimize the formed zero order diffraction peak.

FIG. 20 is a flow chart of the feedback operation for oscillating the intensity value I' about its minimum value. As apparent from FIG. 20, similarly in the feedback operation of FIG. 19, an (i–1)-th driving operation, conducted with a driving amplitude of $V_{i-1}$, obtains an (i–1)-th driving operation intensity $I'_{i-1}$ of the zero order diffraction peak, where i is an integer equal to or higher than 2. An i-th driving operation, conducted with a driving amplitude of $V_i$ (=$V_{i-1}+\Delta V_i$), obtains an i-th driving operation intensity $I'_i$ of the zero order peak. The feedback controller 4 compares the intensities $I'_{i-1}$ and $I'_i$, in step S7'. In this operation, contrary to the operation of FIG. 19, If $I'_i < I'_{i-1}$, in the steps S8', S10' and S11', the feedback controller 4 determines, using an equation of $\Delta V_i = (-1)^m (\Delta V_{i-1})$, an i-th adjusting amount $\Delta V_i$ used for defining the (i+1)-th amplitude $V_{i+1}$ as a value having the same sign as the (i–1)-th adjusting amount $\Delta V_{i-1}$. On the other hand, if $I'_i \geqq I'_{i-1}$, in the steps S9', S10' and S11', the feedback controller 4 determines the i-th adjusting amount $\Delta V_i$ as a value having the inverse sign of the (i–1)-th adjusting amount $\Delta V_{i-1}$.

Repeating the above-described hill-climbing feedback operation controls the zero order peak intensity I' to be oscillated about its minimum value, to thereby control the SLM 1 to diffract the read light (a) approximately with a maximum diffraction efficiency.

In the above description, the feedback controller 4 feedback controls the amplitude of the ac driving voltage applied to the SLM 1. However, as depicted by dotted lines in FIG. 18(a), the feedback controller 4 may be connected to a write light source 5. The write light source 5 is employed for radiating the write light to the SLM 1. The feedback controller thus connected to the write light source 5 feedback controls the mean intensity W' of the write light. Preferably, the feedback controller 4 may feedback control the write light intensity W' in the hill-climbing manner as shown in FIGS. 19 and 20.

Furthermore, the feedback controller 4 may feedback control both the amplitude of the driving voltage and the mean intensity of the write light. The feedback operation may control the SLM 1 to modulate the read light (a) with approximately the maximum diffraction efficiency.

The light modulator 100 of the present invention can be applied to a Joint Transform Correlator (which will be referred to as a "JTC," hereinafter) for recognizing correlation of multiple input pattern images. A JTC 200 to which applied is the light modulator 100 of the present invention will be described hereinafter with reference to FIG. 21.

The JTC 200 is employed with two light modulators 100 in its both first and second stages. The light modulator 100 used in the first stage will be referred to as a "first light modulator 100A", and the light modulator 100 used in the second stage will be referred to as a "second light modulator 100B," hereinafter. The first light modulator 100A includes the SLM 1(1A) of the present invention, the driving power source 2 (2A), the diffraction peak detector 3 (3A), and the feedback controller 4 (4A). The detector 3A is located to detect intensity I' of the zero order diffraction peak obtained by the modulation by the SLM 1A, and the feedback controller 4A feedback controls the power source 2A so that the zero order peak intensity I' may oscillate about its minimum value. The second light modulator 100B also includes the SLM 1(1B) of the present invention, the driving power source 2 (2B), the diffraction peak detector 3 (3B), and the feedback controller 4 (4B). The detector 3B is located to detect intensity I of the first order peak obtained by the modulation by the SLM 1B, and the feedback controller 4B feedback controls the power source 2B so that the first order diffraction peak intensity I may oscillate about its maximum value.

The JTC 200 will be described in greater detail, hereinafter.

A write light source 5 projects two input image patterns $P_1$ and $P_2$ onto the photoconductive layer 13 of the SLM 1A. As a result, intensity distribution of a joint image of the two input image patterns $P_1$ and $P_2$ are recorded in the liquid crystal layer 16 of the SLM 1A.

A half mirror 201 introduces coherent parallel read light (a) to the liquid crystal layer 16 where the read light (a) is diffracted according to the joint image. The thus modulated read light (a) outputs from the SLM 1A and passes through the half mirror 201. The read light is then Fourier transformed by a Fourier transform lens 202. As a result, a joint Fourier transform image of the two input image patterns is formed on a focal plane (joint Fourier transform plane) of the lens 202. The SLM 1B is located on the Joint Fourier Transform plane, and therefore the Joint Fourier transform image is incident on the photoconductive layer 13 of the SLM 1B. As a result, the joint Fourier transform image is recorded in the liquid crystal layer 16 of the SLM 1B.

A half mirror 203 is provided between the Fourier Transform lens 202 and the SLM 1B for splitting off a part of the read light leaving the Fourier transform lens 202 to the diffraction peak detector 3A. The detector 3A is located at such a position as is capable of detecting a zero order diffraction peak born on the part of the read light split off by the half mirror 203. The feedback controller 4A feedback controls the power supply 2A in accordance with the intensity I' of the zero order diffraction peak detected by the detector 3A so that the intensity I' may oscillate about its minimum value. In other words, the feedback controller 4A feedback controls the power supply 2A so as to allow the SLM 1A to diffract the read light with approximately the maximum diffraction efficiency.

A half mirror 204 is provided for introducing another coherent parallel read light (a) into the liquid crystal layer 16 of the SLM 1B where the parallel read light (a) is diffracted by the Joint Fourier Transform image recorded therein. The read light (a) thus diffracted in the SLM 1B outputs therefrom and passes through the half mirror 204. The read right is then Fourier transformed by another Fourier Transform lens 205 to produce an output correlation image on a focal plane of the Fourier Transform lens 205.

The output correlation image includes a zero order diffraction peak and a pair of first ((+1)-th and (−1)-th) order diffraction peaks located symmetrically on the opposite sides of the zero order diffraction peak. Each of the first order diffraction peaks has intensity indicating the correlation between the two image input patterns $P_1$ and $P_2$. Accordingly the first order diffraction peaks are called correlation peaks.

The diffraction peak detector 3B is located at such a position as is capable of detecting intensity I of the (−1)-th order diffraction peak. The feedback controller 4B feedback controls the power supply 2B in accordance with the intensity I detected by the detector 3B so that the intensity I may oscillate about its maximum value. In other words, the feedback controller 4B feedback controls the power supply 2B so as to diffract the read light with approximately the maximum diffraction efficiency.

Another diffraction peak detector 206 is located at such a position as is capable of detecting the intensity I of the (+1)-th order peak. The detector 206 includes a photodiode, for example. The detector 206 detects the intensity I of the (+1)-th order peak and outputs a correlation signal representative of the intensity I, i.e., the correlation between the input image patterns $P_1$ and $P_2$.

According to the JTC having the above-described structure, the SLMs 1A and 1B are controlled to diffract read light approximately with the maximum diffraction efficiency. Accordingly, a high correlation peak can be obtained. The diffraction peak detector 206 can therefore detect a correlation signal indicative of the correlation with a high signal-to-noise ratio. The JTC 200 can highly accurately recognize correlation of arbitrary input image patterns $P_1$ and $P_2$.

In the above description, the feedback controllers 4A and 4B control the driving voltages applied to the SLMs 1A and 1B. However, as depicted by dotted line in FIG. 21, the feedback controllers may control the light source 5 to adjust the mean intensity W' of the Joint image of the input image patterns $P_1$ and $P_2$.

Figure 22:
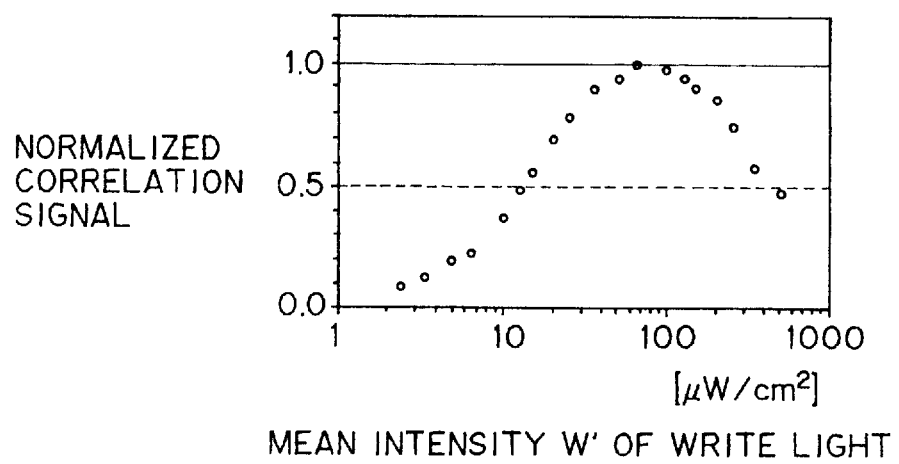
FIG. 22 is a graph showing a measured relationship between the correlation signals and the write light intensity.

The present inventors produced the JTC 200 with the use of the example of the SLM 1 produced through the already-described fabrication method. The present inventors changed the mean intensity W' of the input image patterns $P_1$ and $P_2$, and monitored how the intensity detected by the detector 206 was changed. The test result is shown in FIG. 22 in which the intensity detected by the detector 206 is normalized so that the detected maximum value should have a value of 1.0. This graph confirms that changing the mean intensity W' changes the intensity of the correlation signal. Accordingly, it is apparent that feedback controlling the mean intensity of the input image patterns is very effective to control the SLMs to attain high diffraction efficiencies.

In the above-described JTC 200, the diffraction peak detector 3A is provided separately from the SLM 1B. However, such means for detecting the diffraction peak may be integrally combined with the SLM 1B.

Figure 23:
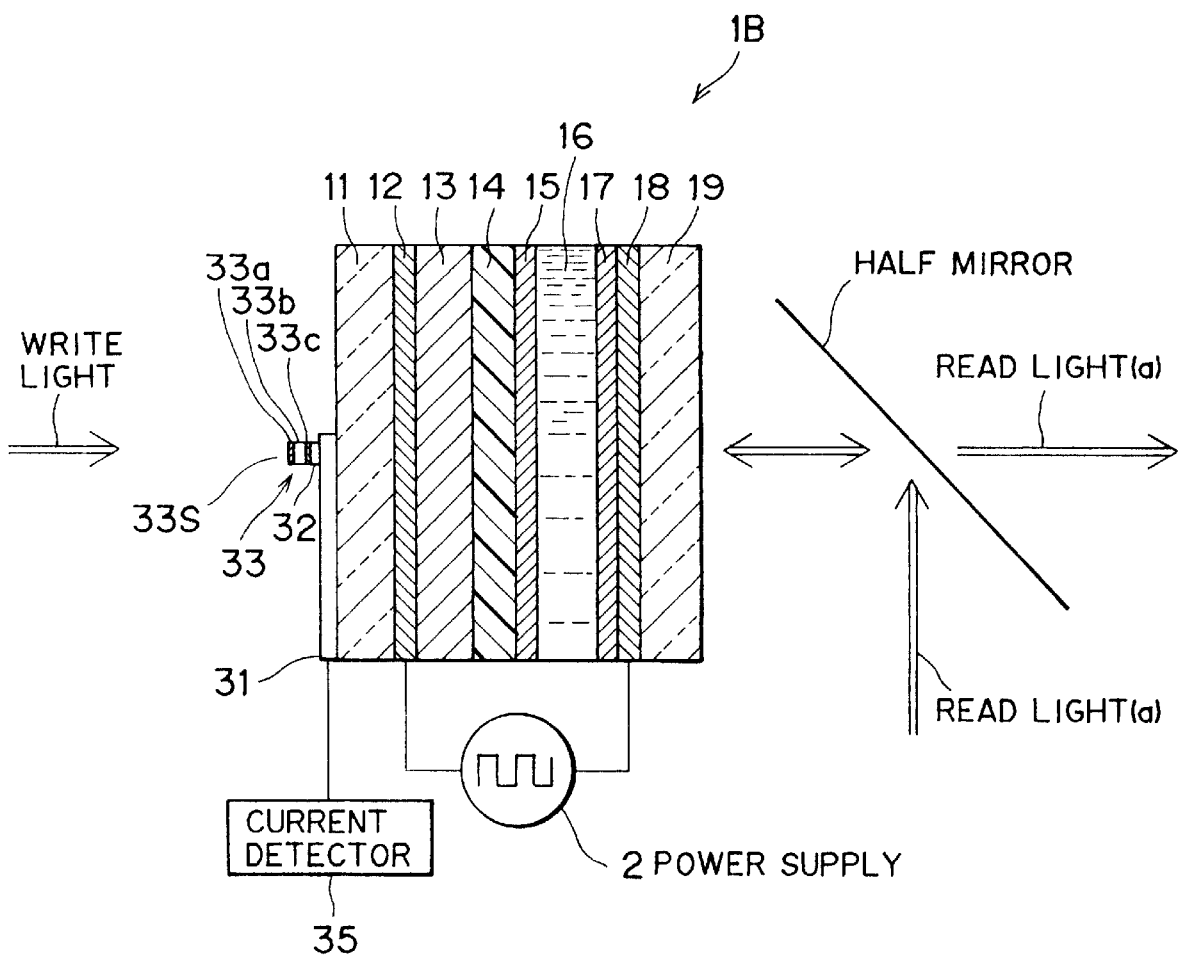
FIG. 23 is a sectional view schematically showing a structure of a first example of a second SLM of the joint transfer correlator of FIG. 21 which is integrally formed with a diffraction peak detector.
Figure 24:
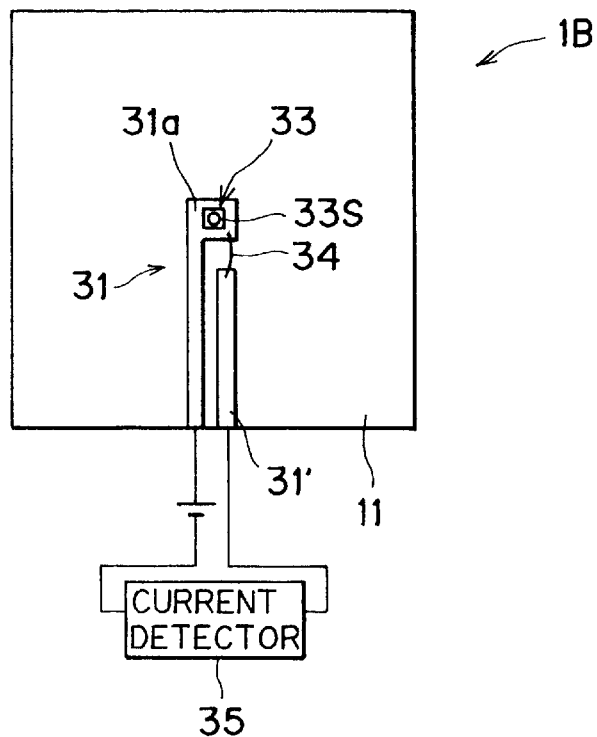
FIG. 24 is a front view of the second SLM of FIG. 23 viewed along the direction in which the write light is incident on the glass plate 11.
Figure 25:
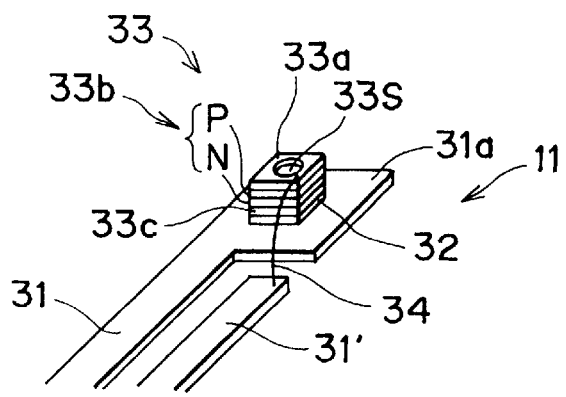
FIG. 25 is a perspective view of the second SLM of FIG. 23 for schematically showing a photodiode chip attached to the glass plate 11.

In order to integrally combine the diffraction peak detecting means with the SLM 1B, according to a first example, as shown in FIGS. 23 through 25, a pair of transparent electrodes 31 and 31' are formed on a surface of the glass substrate 11. The electrodes 31 and 31' are insulated from each other. The transparent electrodes 31 and 31' are, for example, formed of indium-tin-oxide (ITO). The electrode 31 has an approximately square-shaped area 31a. The electrode 31 is located on the glass substrate 11 in such a manner that its square-shaped area 31a may be positioned substantially at the central portion of the surface of the glass substrate 11. A photodiode chip 33 is fixed to the surface of the square-shaped area 31a. Accordingly, the photodiode chip 33 is located substantially at the central portion of the surface of the glass substrate 11.

The photodiode chip 33 has a sandwich structure in which a pn junction semiconductor 33b is sandwiched between a pair of electrodes 33a and 33c. The electrode 33a is formed with a through-hole at its approximately central position for exposing the p-region of the semiconductor 33b and defining a light receiving area 33S of the photodiode chip 33. The electrode 33c is attached to the surface of the square-shaped area 31a via conductive adhesive 32 so that the electrode 33c is electrically connected to the electrode 31. The electrode 33a and the electrode 31' are electrically connected via a wire bonding 34.

A DC electric power supply is connected between the electrodes 31 and 31' so as to apply a DC electric voltage between the electrodes 33a and 33c to bring the pn junction semiconductor 33b into a reverse biased state. An electric current detector 35 is also connected between the electrodes 31 and 31'.

With this structure, when light is incident on the light receiving area 33S, photovoltaic effect is occurred in the semiconductor pn junction 33b. As a result, electric current flows between the electrodes 33a and 33c. The amount of the current corresponds to the intensity of the incident light. The current detector 35 detects the amount of the current and outputs a signal indicative thereof.

Figure 21:
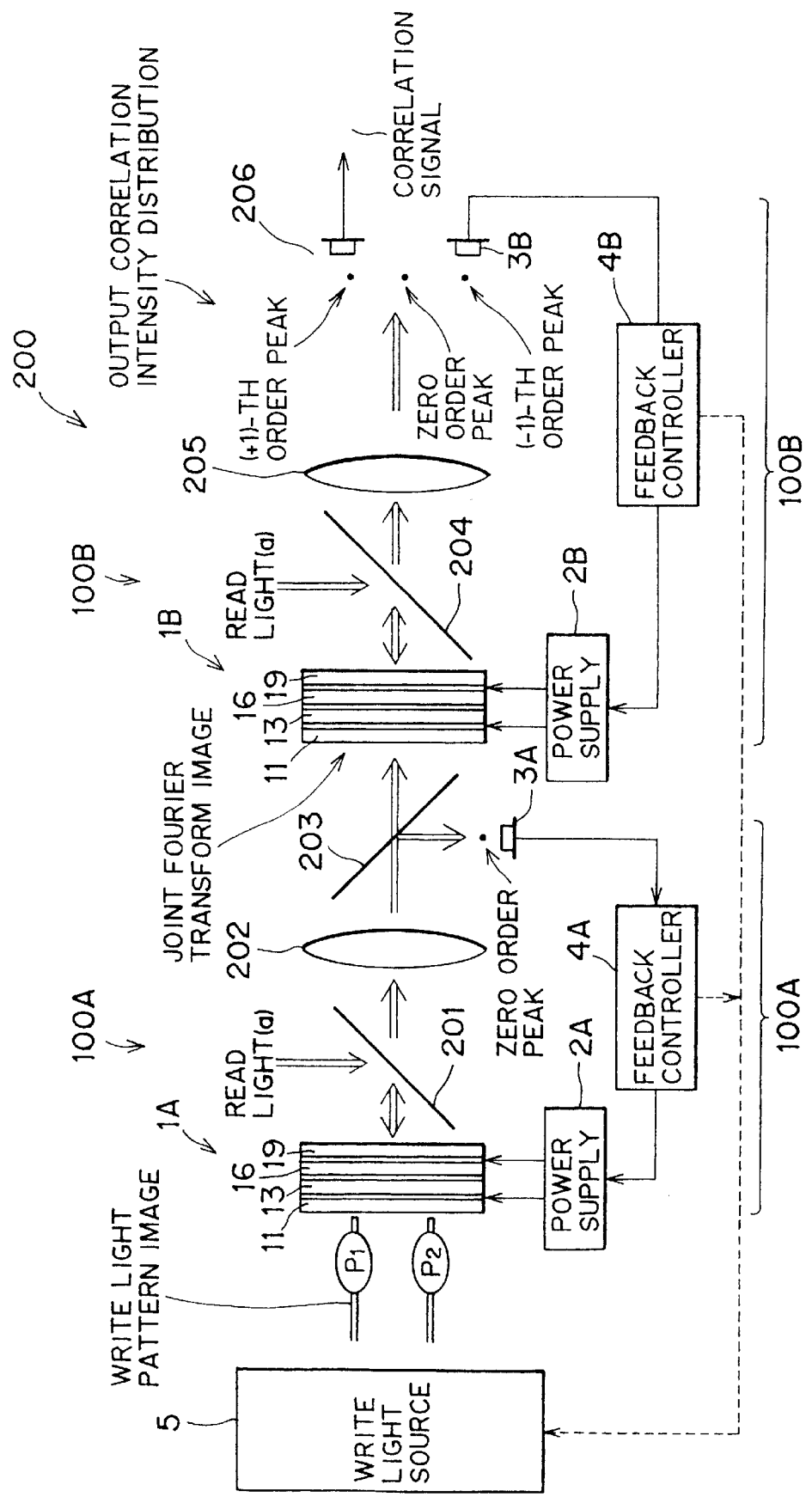
FIG. 21 shows an optical system of a joint transfer correlator employed with the light modulator of FIG. 18(a)

The photodiode chip 33 thus integrally combined with the SLM 1B serves as the diffraction peak detector 3A shown in FIG. 21.

Figure 26:
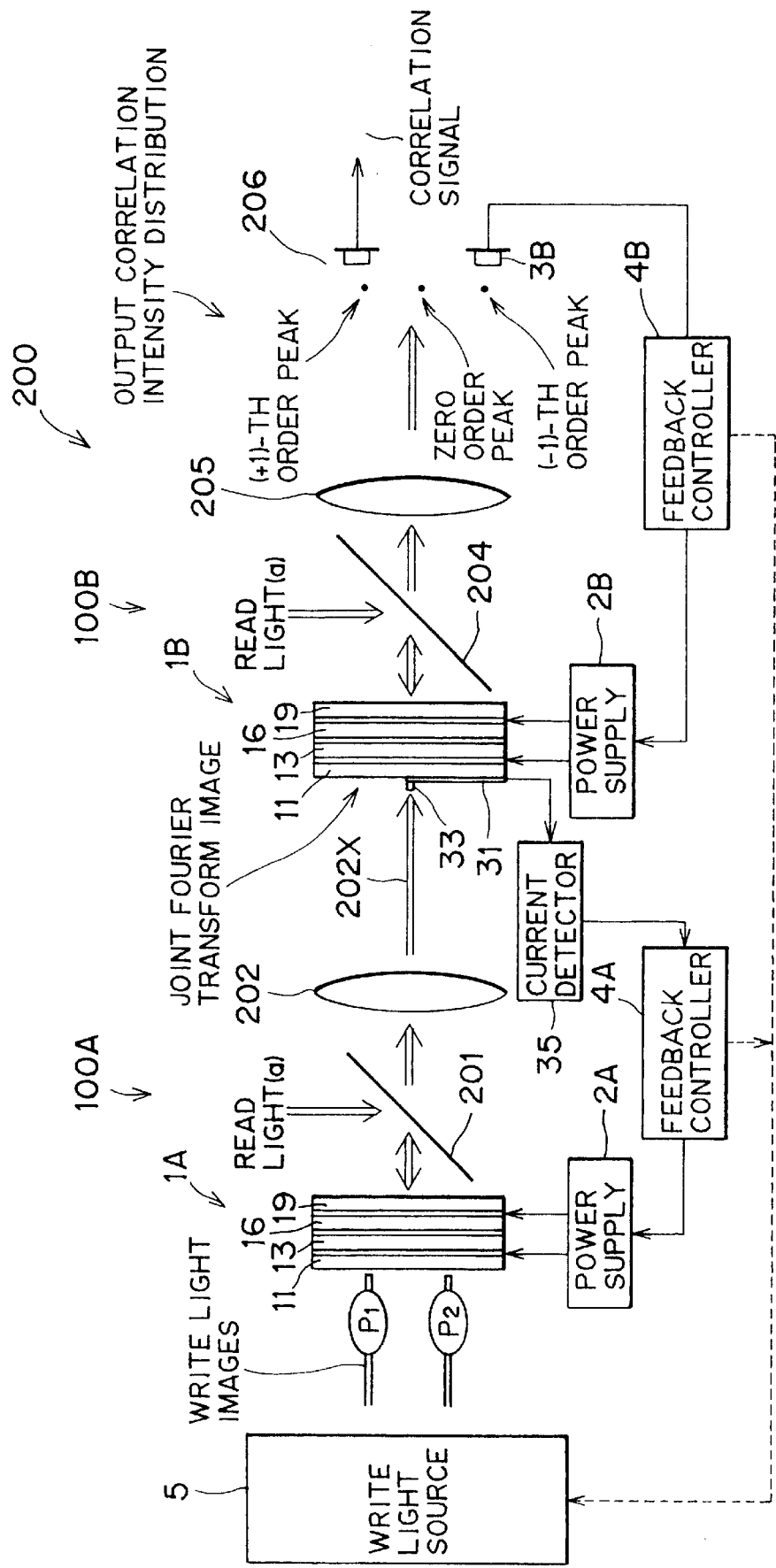
FIG. 26 shows an optical system of a joint transfer correlator of FIG. 21 employed with the second SLM of FIG. 23.

As shown in FIG. 26, the SLM 1B thus integrally combined with the photodiode chip 33 is located relative to the Fourier transform lens 202 so that the central portion of the surface of the glass substrate 11 is positioned substantially on the optical axis 202X of the lens 202. In other words, the SLM 1B is located so that the light receiving area 33S of the photodiode chip 33 is positioned substantially on the optical axis 202X of the lens 202. Since the zero order diffraction peak of the joint Fourier transfer image is formed around the optical axis 202X, the photodiode chip 33 receives the zero order diffraction peak and detects the intensity I' thereof. In the Joint Transform correlator of FIG. 26, the current detector 35 is connected to the feedback controller 4A. The current detector supplies the feedback controller 4A with a signal indicative of the intensity I' of the zero order diffraction peak, and the feedback controller 4A feedback controls the power supply 2A in accordance with the received signal.

In the Joint Transform correlator, since the photodiode chip is integrally formed with the SLM 1A, the half mirror 203 of FIG. 21 may be omitted. Accordingly, the entire optical system of the correlator 200 can be simplified.

The half mirror 203 provided in FIG. 21 splits off a half of the read light to be subjected to the feedback operation of the SLM 1A. The half mirror 203 passes the other remaining half of the read light to be subjected to the second stage of the Joint Transform Correlation processing. To the contrary, according to the example shown in FIG. 26, 100% of the zero order diffraction peak can be detected to be used for the feedback operation of the SLM 1A. Accordingly, more accurate feedback operation can be attained. In addition, 100% of a signal component of the Joint Fourier Transform image can be projected to the photoconductive layer 13 of the SLM 1B. Accordingly, more accurate Joint Transform Correlation processing can be attained.

Figure 27:
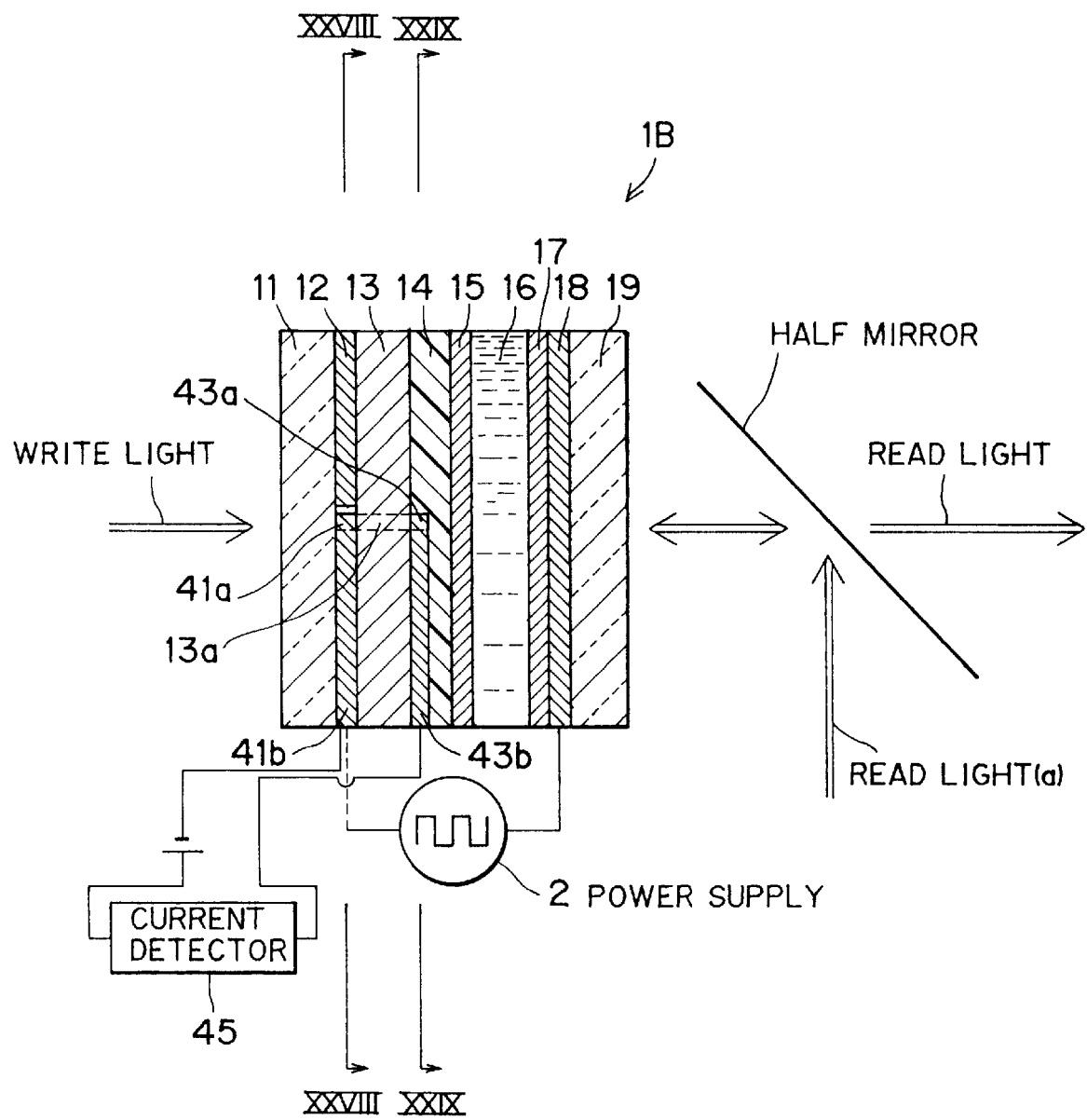
FIG. 27 is a sectional view schematically showing a structure of a second example of a second SLM of the joint transfer correlator of FIG. 21 which is integrally formed with a diffraction peak detector.
Figure 28A:
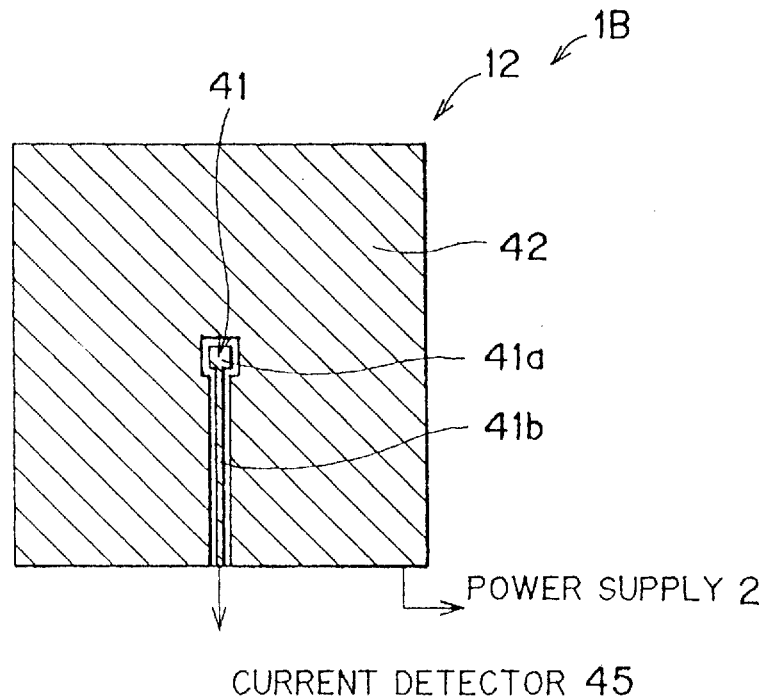
FIG. 28(a) is a cross-sectional view taken along a line XXVIII—XXVIII of FIG. 27.
Figure 28B:
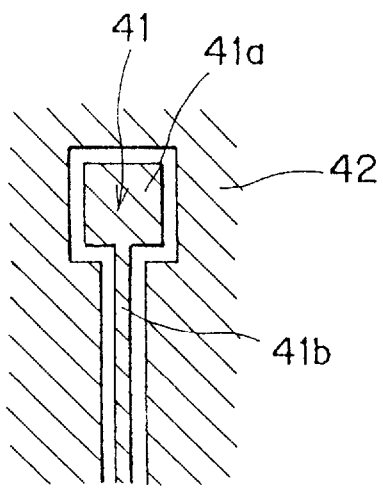
FIG. 28(b) is an enlarged cross-sectional view of an essential part of FIG. 28(a)

FIGS. 27 through 30 show a second example. As shown in FIGS. 27 and 28, the transparent conductive film 12 is partly etched to be divided into two areas 41 and 42 which are insulated from each other. The area 41 includes an electrode part 41a of substantially a square shape and an electrode part 41b which are connected to each other. The square shape of the area 41a has an area of about 1 cm by 1 cm. The electrode part 41a is located at substantially the central position of the conductive film 12.

Figure 29A:
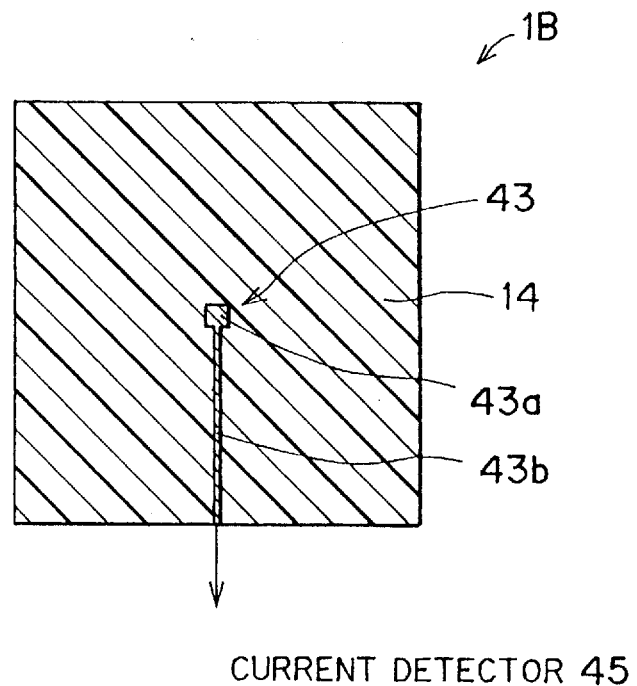
FIG. 29(a) is a cross-sectional view taken along a line XXIX—XXIX of FIG. 27.
Figure 29B:
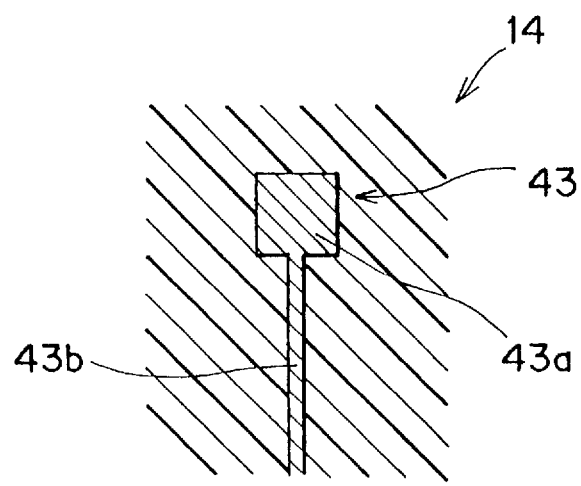
FIG. 29(b) is an enlarged cross-sectional view of an essential part of FIG. 29(a)

As shown in FIGS. 27 and 29, an electrode 43 is formed on a surface of the mirror layer 14 contacted with the photoconductive layer 13. The electrode 43 is formed of, for example, indium-tin-oxide (ITO) or aluminum (Al). The electrode 43 includes an electrode part 43a of substantially a square shape and an electrode part 43b which are connected to each other. The square shape of the area 43a has also an area of about 1 cm by 1 cm. The electrode part 43a is located also substantially on the central position of the surface of the mirror layer 14. Accordingly, the electrode part 43a confronts the electrode part 41a via a part 13a of the photoconductive layer 13 which is also located substantially on the central portion of the photoconductive layer.

A DC electric power supply is connected between the electrode parts 41b and 43b for applying therebetween a predetermined value of a dc electric voltage. Accordingly, the predetermined voltage is applied between the electrode parts 41a and 43a through the part 13a of the photoconductive layer 13. An electric current detector 45 is also connected between the electrodes 41b and 43b.

With the above-described structure, when light is incident on the part 13a through the square-shaped electrode part 41a, the resistance of the part 13a lowers according to the intensity of the incident light. As a result, electric current flows between the electrode parts 41a and 43a through the part 13a. The amount of the current corresponds to the resistance of the part 13a, that is, to the intensity of the incident light. The current detector 45 detects the amount of the current and outputs a signal indicative of the current.

Thus, the electrode part 41a, the part 13a of the photoconductive layer 13 and the electrode part 43a thus formed inside of the SLM 1 cooperate to serve as the diffraction peak detector 3A of FIG. 21.

Figure 30:
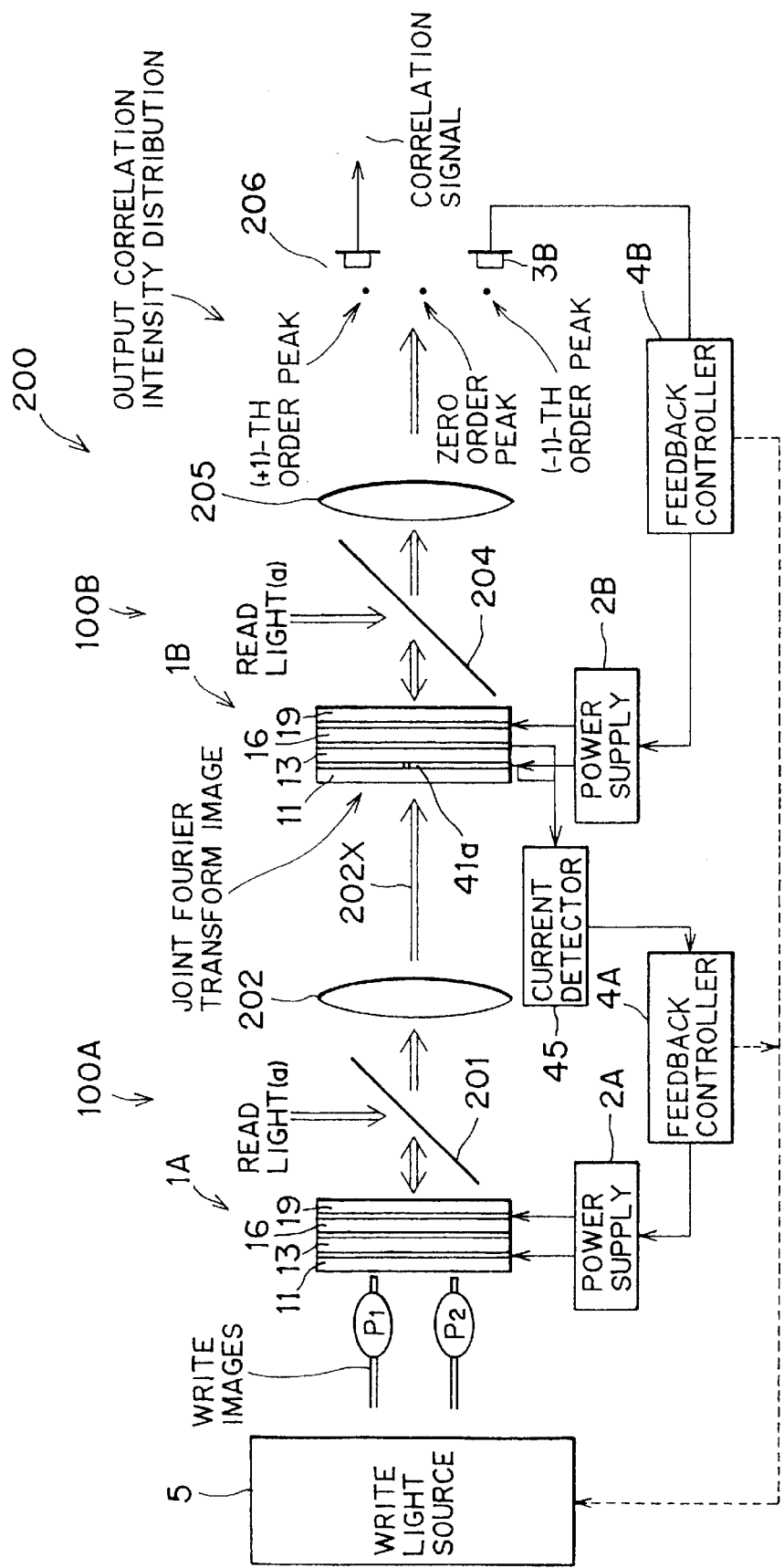
FIG. 30 shows an optical system of a joint transfer correlator of FIG. 21 employed with the second SLM of FIG. 27.

As shown in FIG. 30, the SLM 1B having the above-described structure is located relative to the Fourier transform lens 202 in such a manner that the central position of the conductive film 12a may be positioned approximately on the optical axis 202X of the lens 202. In other words, the SLM 1B is located relative to the lens 202 so that the electrode part 41a may be located approximately on the optical axis 202X. The zero order diffraction peak produced around the optical axis 202X is therefore incident to the electrode part 41a and is detected by the current detector 45. The current detector 45 is connected to the feedback controller 4A so that a signal indicative of the zero order diffraction peak intensity I' is supplied to the feedback controller 4A. The feedback controller 4A feedback controls the power supply 2A in accordance with the supplied signal. The correlator of FIG. 30 attains the same advantages as the correlator of FIG. 26.

Figure 31:
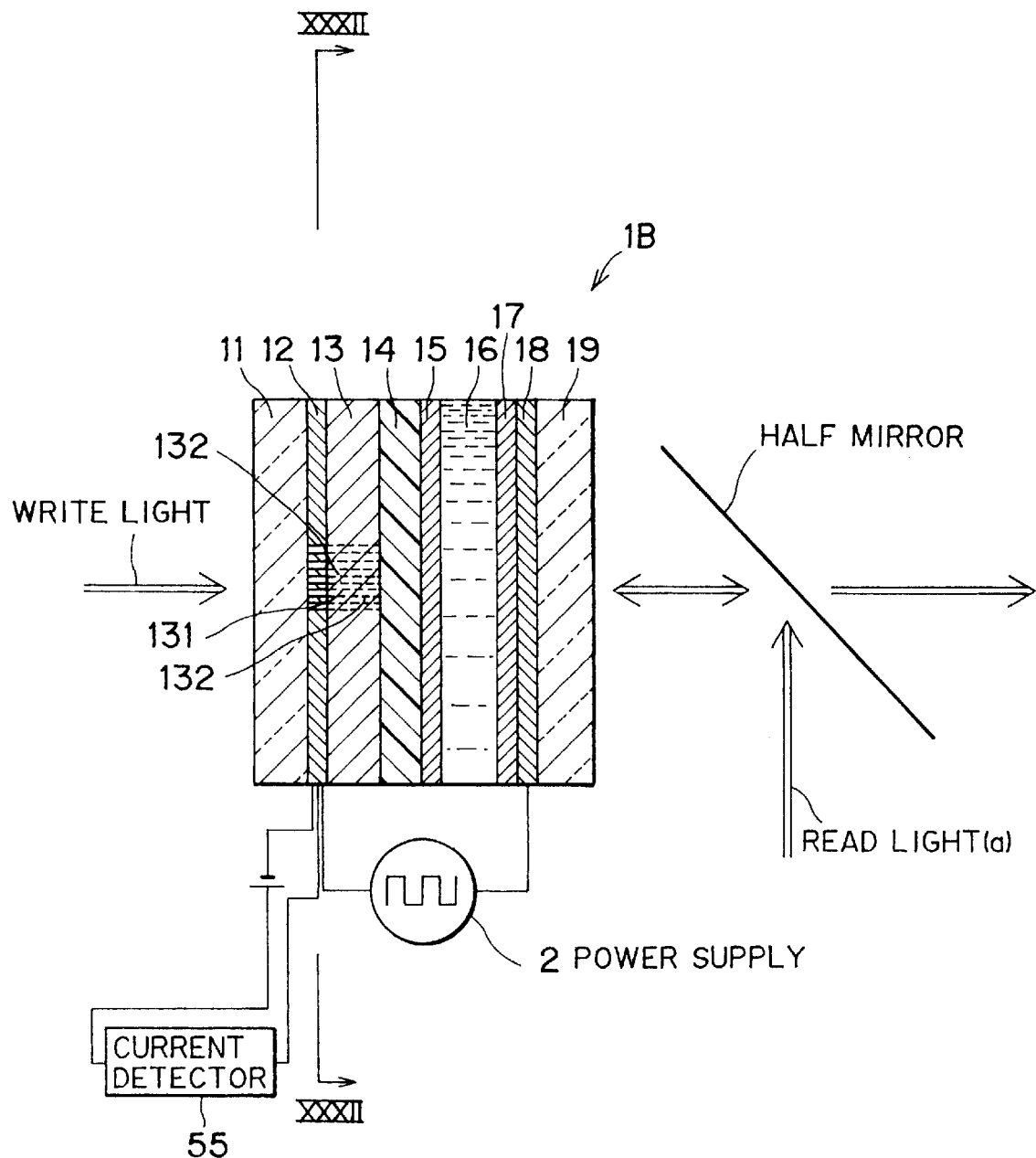
FIG. 31 is a sectional view schematically showing a structure of a third example of a second SLM of the joint transfer correlator of FIG. 21 which is integrally formed with a diffraction peak detector.
Figure 32A:
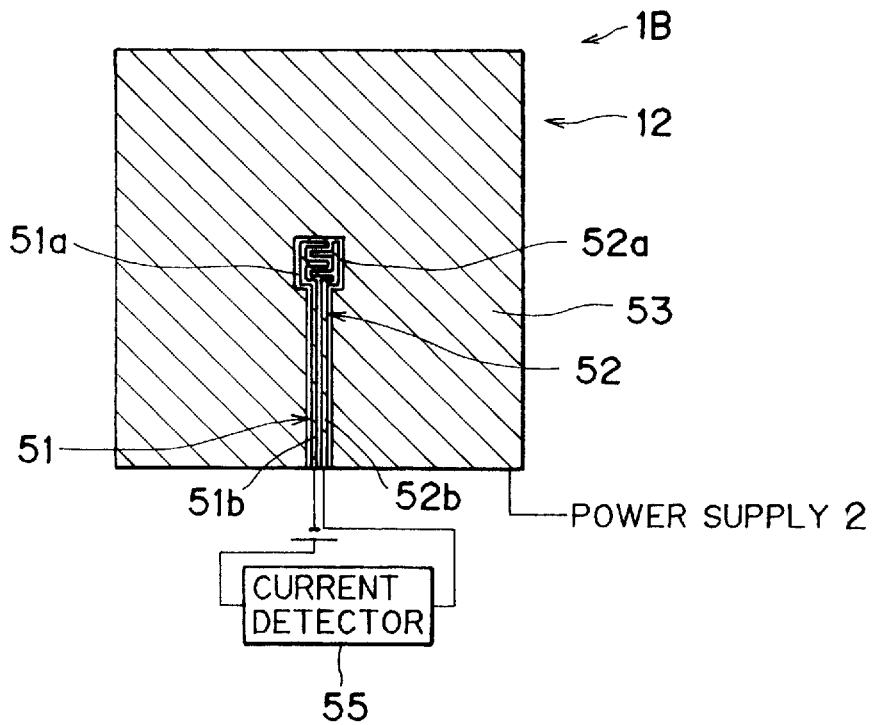
FIG. 32(a) is a cross-sectional view taken along a line XXXII—XXXII of FIG. 31.
Figure 32B:
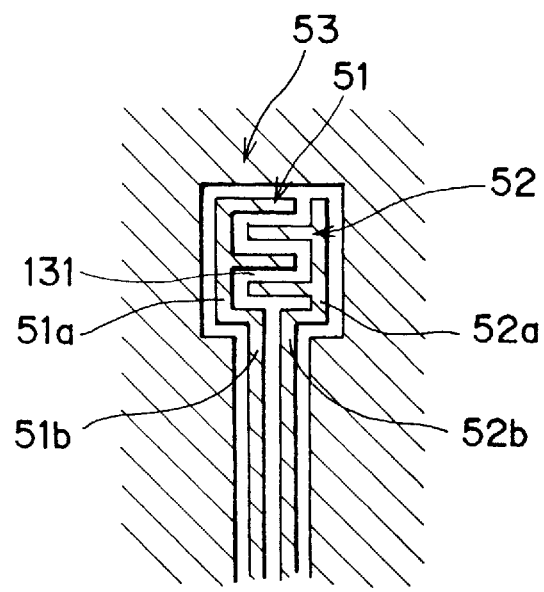
FIG. 32(b) is an enlarged cross-sectional view of an essential part of FIG. 32(a)
Figure 33:
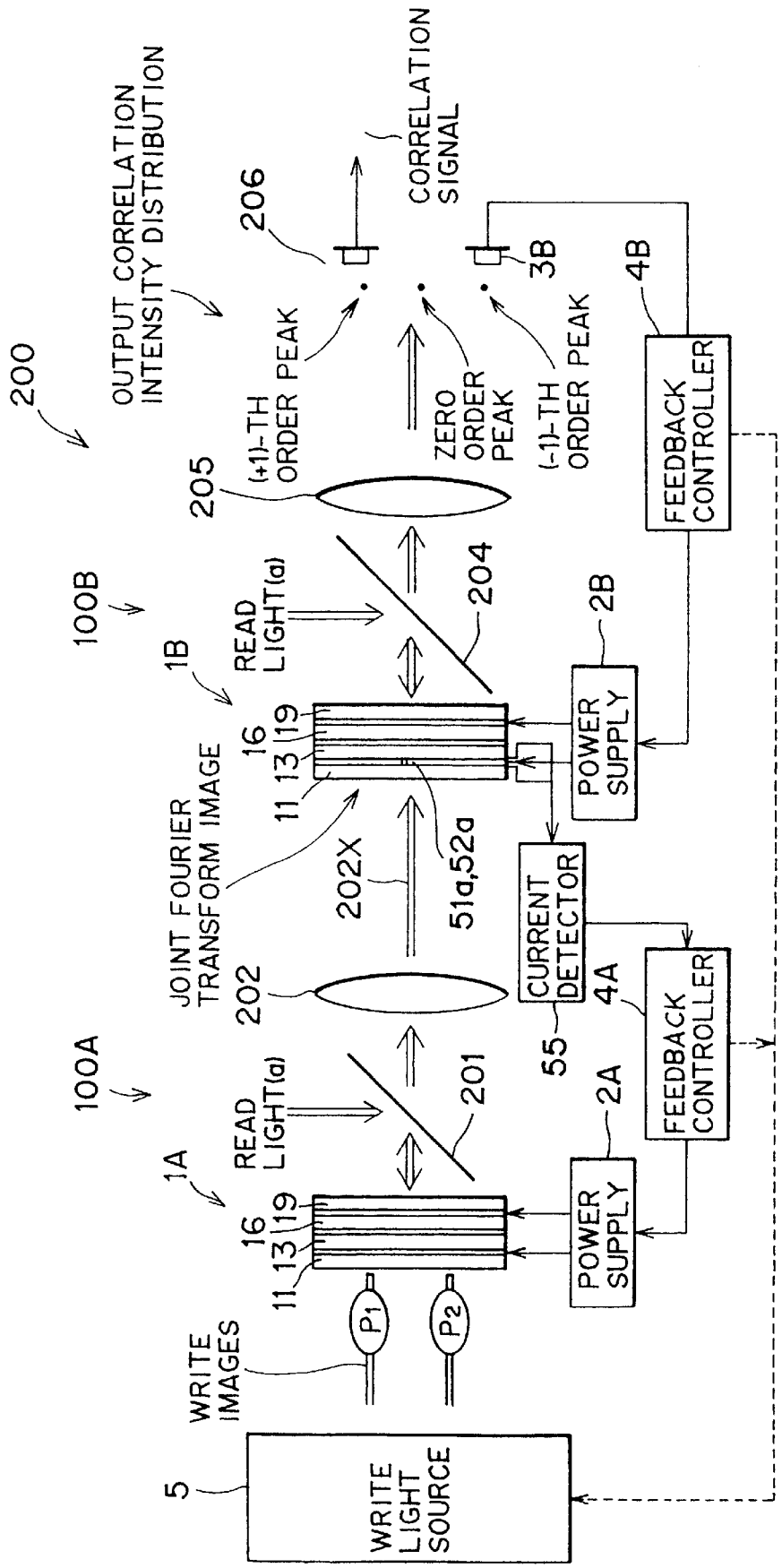
FIG. 33 shows an optical system of a joint transfer correlator of FIG. 21 employed with the third SLM of FIG. 31.

FIGS. 31 through 33 show a third example. According to the third example, similarly as in the second example, as shown in FIGS. 31 and 32, the conductive film 12 is partly etched to be divided into three electrode sections 51, 52 and 53 which are insulated from one another. The electrode section 51 includes a comb-shaped electrode part 51a and an electrode part 51b. The electrode section 52 includes another comb-shaped electrode part 52a and an electrode part 52b. The comb-shaped electrode parts 51a and 52a are defined substantially at the central portion of the conductive film 12. The comb-shaped electrode parts 51a and 52a are located on regions of the photoconductive layer 13 (which will be referred to as "electrode-located areas 132," hereinafter). The comb-shaped electrode parts 51a and 52a are located to expose a region of the photoconductive layer 13 positioned between the combs of the electrode parts 51a and 52a (The region will be referred to as an "electrode-electrode between area 131," hereinafter).

A DC electric power supply is connected between the electrode parts 51b and 52b so that a dc electric voltage of a predetermined value is applied between the electrode parts 51a and 52a. Accordingly, the predetermined value voltage is applied through the electrode-electrode between area 131 and the electrode-located area 132 of the photoconductive layer 13, since those areas are located between the electrode parts 51a and 52a. An electric current detector 55 is also connected between the electrode parts 51b and 52b for detecting electric current flowing therebetween.

With such a structure, when light is incident onto the electrode-located area 132 through the comb-shaped electrode parts 51a and 52a and directly onto the electrode-electrode between area 131, the resistance of those areas 131 and 132 lowers according to the intensity of the incident light. As a result, electric current flows through those areas 131 and 132 between the electrode parts 51a and 52a. The amount of the current corresponds to the intensity of the incident light. The current detector 55 detects the amount of the electric current and outputs a signal indicative of the incident light intensity.

Accordingly, the electrode part 51a, the areas 131 and 132 of the photoconductive layer 13 and the electrode part 52a thus formed inside of the SLM 1B cooperate to serve as the diffraction peak detector 3A of FIG. 21. It is noted that the present example uses electric current flowing in a the photoconductive layer 13 in a direction parallel to the surface of the photoconductive layer. Contrarily, the second example of FIGS. 27 through 29 uses electric current flowing in a photoconductive layer in a direction perpendicular to the surface of the photoconductive layer.

As shown in FIG. 33, the SLM 1B having the above-described structure is located relative to the Fourier Transform lens 202 in such a manner that the central portion of the conductive film 12 may be positioned approximately on the optical axis 202X, that is in such a manner that the comb-shaped electrode parts 51a and 52a may be positioned approximately on the optical axis 202X. Accordingly, the zero order diffraction peak formed around the optical axis 202X will be incident to the areas 131 and 132 of the photoconductive layer. The current detector 55 detects the intensity I' of the zero order diffraction peak and outputs a signal indicative of the intensity I'. The current detector 55 is connected to the feedback controller 4A so that the signal indicative of the intensity I' is supplied to the feedback controller. The feedback controller 4A feedback controls the power supply in accordance with the received signal. The correlator of FIG. 33 attains the same advantages as the correlator of FIG. 26.

As depicted by dotted line in FIGS. 26, 30 and 33, the feedback controller 4A may be connected to the light source 5 for feedback controlling the mean intensity W' of the write light.

The light modulator 100 of the present invention of FIG. 18(a) may also be applied to a hologram reconstructing apparatus for reconstructing a hologram pattern to produce a three-dimensional optical image.

Figure 34:
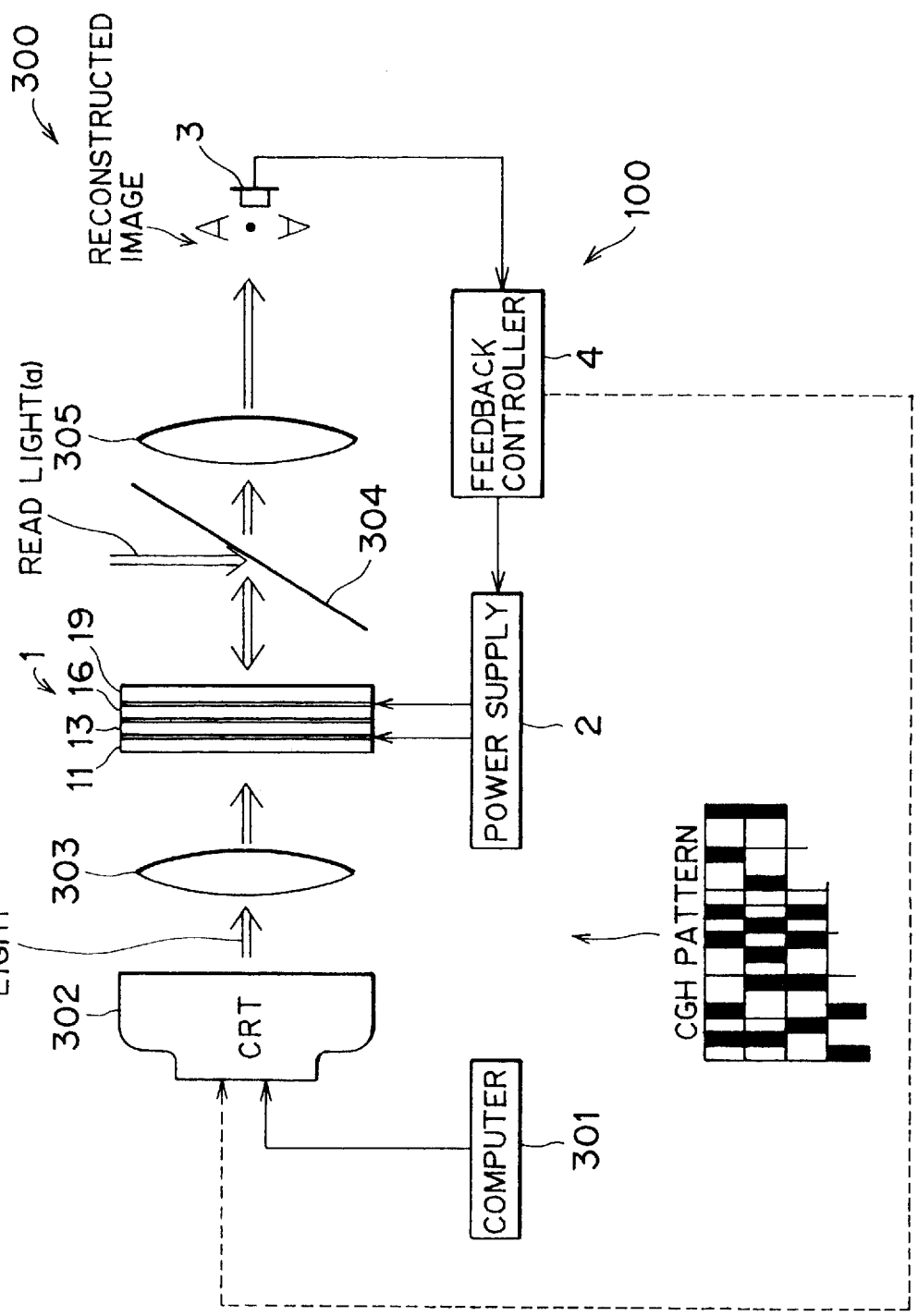
FIG. 34 schematically shows an optical system of a hologram reconstructing apparatus employed with the light modulator of FIG. 18(a)

FIG. 34 shows a hologram reconstructing apparatus 300 employed with the light modulator 100. The hologram reconstructing apparatus 300 reconstructs a computer generated hologram (CGH) pattern to form a three-dimensional optical image. In the apparatus 300, a computer 301 generates a CGH pattern, and a CRT 302 connected to the computer 300 displays the CGH pattern. A lens 303 is provided for imaging the CGH pattern displayed on the CRT 302 onto the photoconductive layer 13 of the SLM 1. Thus, the CGH pattern is recorded in the liquid crystal layer 16. In other words, a phase hologram corresponding to the CGH pattern is produced in the liquid crystal layer 16.

A half mirror 304 is provided to introduce parallel read light (a) to the liquid crystal layer 16 where the read light (a) is modulated in phase according to the phase hologram recorded therein. The read light thus modulated in the SLM 1 passes through the half mirror 304 and is Fourier transformed by a Fourier Transform lens 305. Accordingly, a zero order diffraction peak and a pair of three-dimensional optical images are produced on a focal plane of the Fourier Transform lens 305. Thus, the three-dimensional optical images are reconstructed based on the CGH pattern.

The diffraction peak detector 3 is located at such a position as is capable of detecting the zero order diffraction peak. The feedback controller 4 feedback controls the driving voltage applied to the SLM 1 so as to allow the SLM 1 to diffract the read light with approximately the maximum diffraction efficiency.

In the above-described hologram reconstructing apparatus 300, since the SLM 1 is controlled to attain the maximum diffraction efficiency, the CGH pattern is highly efficiently reconstructed into three-dimensional optical images.

It is noted that the spatial frequency of the CGH pattern written into the SLM 1 has a fixed value. Accordingly, the feedback operation completely following the test results of FIGS. 13 and 16 can control the SLM 1 to achieve the approximate maximum diffraction efficiency.

Though the above description is directed to the feedback control operation for the driving voltage applied to the SLM 1, the feedback controller 4 may be connected to the CRT 302 for feedback controlling the mean intensity of the CGH pattern.

As described above in great detail, the SLM of the present invention using the optical modulating material of a type for performing an electrically controlled birefringence can attain continuous phase-only modulation having a broad dynamic range from 0 to higher than $2\pi$ radians. Accordingly, the SLM of the present invention can be effectively used for image transmission operation, phase compensation operation of laser beam (wavefront control), phase filtering operation, etc.

The SLM of the present invention can further attain continuous intensity modulation.

The SLM of the present invention thus capable of attaining the broad dynamic range and stably attaining the grey level can be effectively used for many image processing devices such as a display.

While the invention has been described in detail with reference to a specific embodiment thereof, it would be apparent to those skilled in the art that various changes and modifications may be made therein without departing from the spirit of the invention.

Figure 35A:
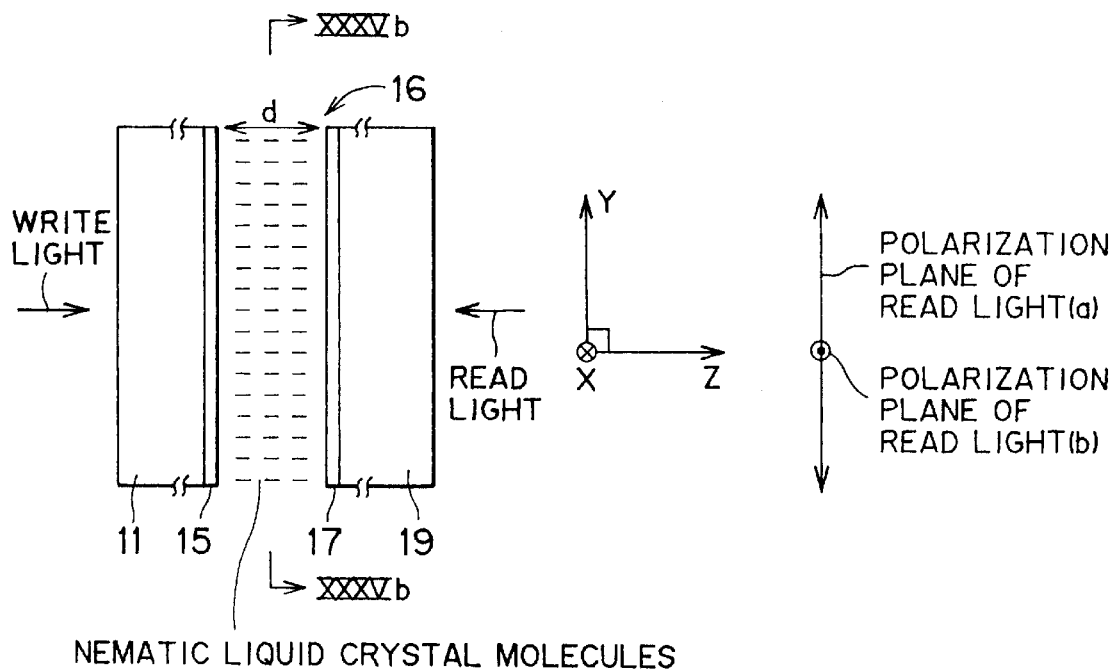
FIG. 35(a) schematically shows the relationship between the homeotropic arrangement of the nematic liquid crystal molecules in the liquid crystal layer of the SLM of the present invention and the polarization plane of the read light.
Figure 35B:
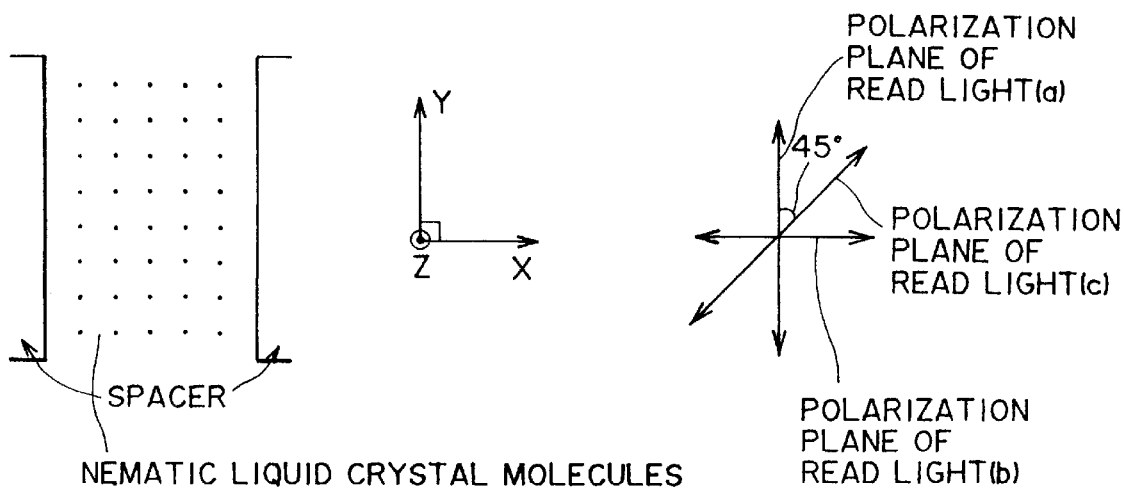
FIG. 35(b) is a section taken along a line XXXVb—XXXVb in FIG. 35(a)

For example, in the preferred embodiment, the liquid crystal layer 16 of the SLM is of a homogeneous arrangement type. However, as shown in FIGS. 35(a) and (b), the liquid crystal layer may be of a deformation of aligned phase (DAP) type in which the nematic liquid crystal molecules are arranged in a homeotropic arrangement. In the homeotropic arrangement, with no applied electric field, the liquid crystal molecules are arranged to extend in the same direction perpendicular to the surfaces of the glass plates 11 and 19. In this homeotropic arrangement, similarly as in the homogeneous arrangement, the liquid crystal molecules are arranged to extend along the single Y-Z plane and have no spiral structure whose axes extend along the Z direction. When electric field is occurred through the liquid crystal layer, the liquid crystal molecules rotate along the Y-Z plane, in the same manner as in the homogeneous arrangement.

Figure 36A:
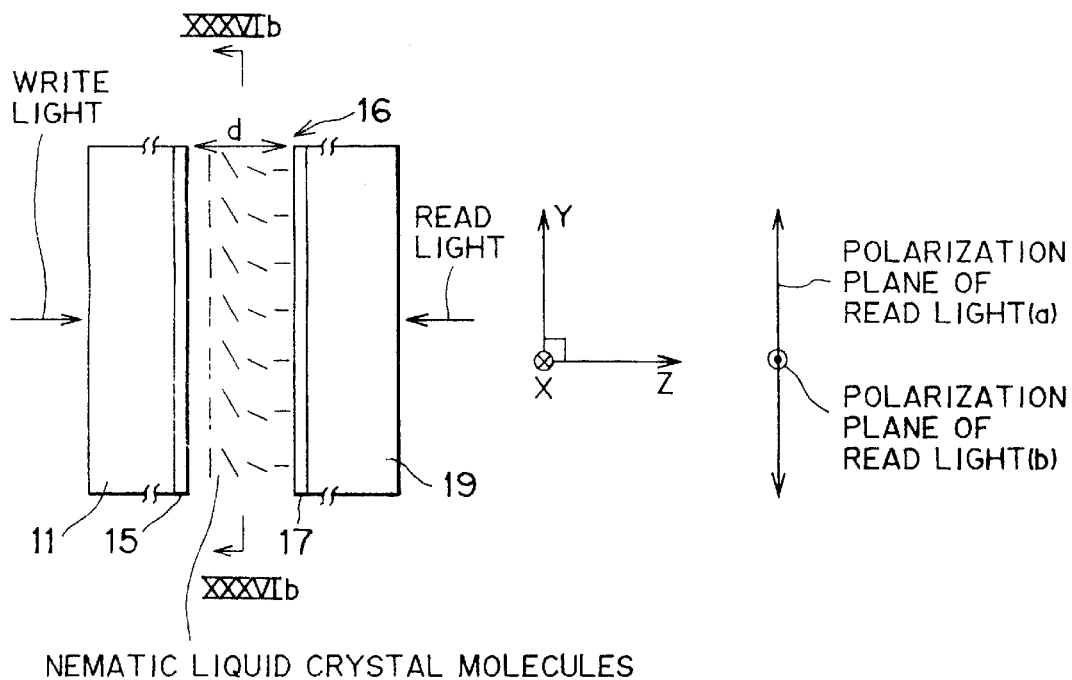
FIG. 36(a) schematically shows the relationship between the hybrid arrangement of the nematic liquid crystal molecules in the liquid crystal layer of the SLM of the present invention and the polarization plane of the read light.
Figure 36B:
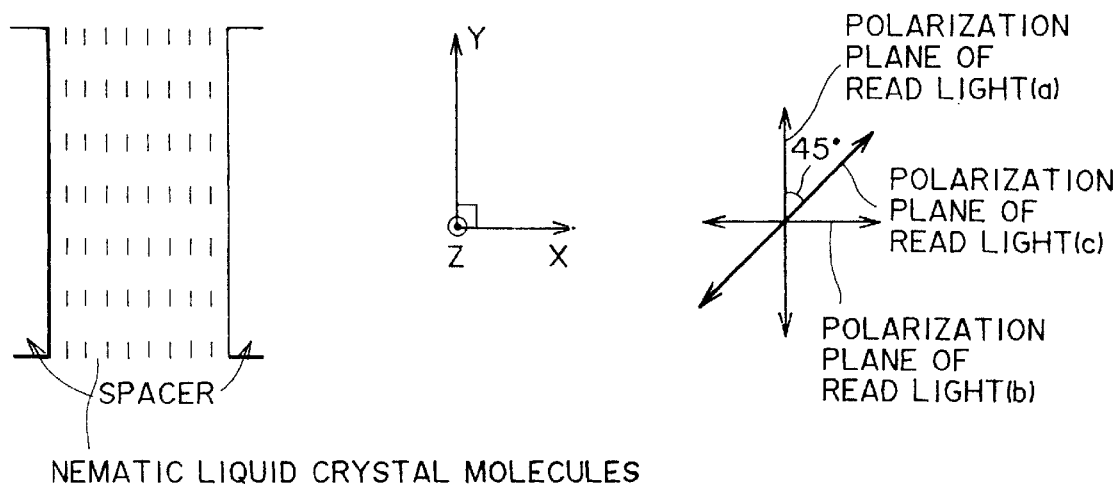
FIG. 36(b) is a section taken along a line XXXVIb—XXXVIb in FIG. 36(a).

In addition, as shown in FIG. 36(a) and (b), the liquid crystal layer may be of a hybrid aligned nematic type in which the liquid crystal molecules are arranged in a hybrid arrangement. In the hybrid arrangement, with no applied electric field, in the vicinity of one of the glass plates 11 and 19, the liquid crystal molecules extend parallel to the surfaces thereof. In the vicinity of the other one of the glass plates 11 and 19, the liquid crystal molecules extend perpendicularly to the surfaces thereof. It should be noted, that the liquid crystal molecules are arranged to extend along the Y-Z plane and have no spiral structure whose axes extend along the Z direction, similarly as in the homogeneous and homeotropic arrangements. When electric field is occurred through the liquid crystal layer, the liquid crystal molecules rotate along the Y-Z plane, in the same manner as in the homogeneous arrangement.

To summarize, in the liquid crystal layer of the present invention, the liquid crystal molecules should be arranged with no spiral structure whose axes extends along the Z direction but should be arranged to extend along the single Y-Z plane. The liquid crystal layer having the liquid crystal molecules arranged to extend along the single Y-Z plane operates in an electrically controlled birefringence mode to modulate read light only through change in birefringence.

In the above-described examples shown in FIGS. 14 through 34, the light-blocking layer 14' is omitted. However, the light-blocking layer 14' may be formed between the photoconductive layer 13 and the mirror layer 14. In the example of FIGS. 27 through 30, where the light-blocking layer 14' is provided between the layers 13 and 14, the electrode 43 should be formed on a surface of the light-blocking layer 14' contacted with the photoconductive layer 13.

We claim:

1. A spatial light modulator for receiving write light having a spatial distribution in its intensity and for receiving read light to spatially modulate the read light in accordance with the spatial distribution in the intensity of the write light, comprising:

a photoconductive layer formed of photoconductive material, said photoconductive layer receiving write light having a spatial distribution in its intensity and changing resistivity of the photoconductive material dependently on the spatial distribution in the intensity of the received write light;

a liquid crystal layer formed of liquid crystal molecules of nematic phase, said liquid crystal layer receiving read light and presenting birefringence with respect to the received read light;

electric voltage applying means for applying an electric voltage through said photoconductive layer and said liquid crystal layer to thereby produce an electric field in said liquid crystal layer, said photoconductive layer changing the electric field produced in said liquid crystal layer in accordance with the resistivity of the photoconductive material so as to electrically control the birefringence of the liquid crystal molecules, said liquid crystal layer modulating the received read light in accordance with the birefringence which is electrically controlled in accordance with the spatial distribution in the intensity of the write light received by said photoconductive layer;

detecting means for detecting the modulated read light and for outputting a signal indicative of the-modulated read light; and feedback control means for receiving the signal outputted from said detecting means and feedback controls at least one of a value of the voltage applied by said voltage applying means and a mean value of the spatially distributed intensity of the write light so that said liquid crystal layer may modulate the read light with a desired modulating state.

2. The spatial light modulator as claimed in claim 1, wherein said liquid crystal layer diffracts the read light, in accordance with the spatial distribution in the intensity of the write light, to thereby form a diffraction peak, and wherein said detecting means includes diffraction peak detecting means for detecting intensity of the diffraction peak and outputting a signal indicative of the diffraction peak intensity, said feedback control means receiving the signal outputted from said diffraction peak detecting means and feedback controlling at least one of the value of the voltage applied by said voltage applying means and the mean value of the spatially distributed intensity of the write light so that said liquid crystal layer may diffract the read light with substantially the maximum diffraction efficiency.

3. The spatial light modulator as claimed in claim 2, further comprising a pair of alignment layers provided to sandwich said liquid crystal layer therebetween for aligning liquid crystal molecules in said liquid crystal layer so that the liquid crystal molecules are arranged to extend along a plane parallel to a first plane, and wherein said photoconductive layer changes the electric field produced in said liquid crystal layer in accordance with the resistivity of the photoconductive material so as to allow the liquid crystal molecules to be moved along the plane parallel to the first plane to thereby electrically control the birefringence of the liquid crystal molecules.

4. The spatial light modulator as claimed in claim 3, wherein the liquid crystal molecules are arranged to form no spiral structure whose axis extends in a first direction which extends along the first plane.

5. The spatial light modulator as claimed in claim 4, wherein the liquid crystal molecules move along the plane parallel to the first plane in accordance with the spatial distribution in the intensity of the write light received by the photoconductive layer so as to change a first refractive index which the liquid crystal molecules present with respect to a component of the read light having its plane of vibration parallel to the first plane without changing a second refractive index which the liquid crystal molecules present with respect to the other component of the read light having its plane of vibration perpendicular to the first plane.

6. The spatial light modulator as claimed in claim 5, wherein the electric voltage applying means applies an electric voltage through said photoconductive layer and said liquid crystal layer to thereby produce in the liquid crystal layer an electric field extending in the first direction, said photoconductive layer changing the electric field produced in said liquid crystal layer in accordance with the resistivity of the photoconductive material so as to allow the liquid crystal molecules to be moved along the plane parallel to the first plane to thereby electrically control the birefringence of the liquid crystal molecules.

7. The spatial light modulator as claimed in claim 5, wherein each of the pair of alignment layers includes a parallel alignment layer for allowing the liquid crystal molecules in said liquid crystal layer to extend along the plane parallel to the first plane in a second direction which extends perpendicularly to the first direction to thereby align the liquid crystal molecules in a homogeneous alignment manner.

8. The spatial light modulator as claimed in claim 5, wherein each of the pair of alignment layers includes a perpendicular alignment layer for allowing the liquid crystal molecules in said liquid crystal layer to extend along the plane parallel to the first plane in the first direction to thereby align the liquid crystal molecules in a homeotropic alignment manner.

9. The spatial light modulator as claimed in claim 5, wherein one of the pair of alignment layers includes a perpendicular alignment layer for allowing the liquid crystal molecules located in said liquid crystal layer at the vicinity of the one of the pair of alignment layers to extend along the plane parallel to the first plane in the first direction and the other one of the pair of alignment layers includes a parallel alignment layer for allowing the liquid crystal molecules located in the liquid crystal layer at the vicinity of the other one of the pair of alignment layers to extend along the plane parallel to the first plane in a second direction which extends perpendicularly to the first direction, to thereby align the liquid crystal molecules in a hybrid alignment manner.

10. The spatial light modulator as claimed in claim 6, wherein said voltage applying means includes a pair of transparent electrodes provided to sandwich therebetween said photoconductive layer and said liquid crystal layer which is sandwiched between the pair of alignment layers.

11. The spatial light modulator as claimed in claim 10, wherein said voltage applying means further includes a power supply for applying alternating current electric voltage between said pair of transparent electrodes.

12. The spatial light modulator as claimed in claim 5, further comprising a reflection layer located between said photoconductive layer and said liquid crystal layer for reflecting the read light propagated in said liquid crystal layer to allow the read light to propagate again in said liquid crystal layer.

13. The spatial light modulator as claimed in claim 12, further comprising a light blocking layer located between said photoconductive layer and said reflection layer for preventing a part of the read light passing through said reflection layer from leaking into said photoconductive layer.

14. The spatial light modulator as claimed in claim 5, wherein said liquid crystal layer receives read light which is linearly polarized with its polarization plane parallel to the first plane and which is coherent light, to thereby modulate phase of the read light, without changing a polarization state of the read light, in accordance with the spatial distribution in the intensity of the write light received by said photoconductive layer.

15. The spatial light modulator as claimed in claim 14, further comprising a polarizer for converting read light into a linearly polarized read light which has a polarization plane parallel to the first plane and projecting the linearly-polarized light into said liquid crystal layer.

16. The spatial light modulator as claimed in claim 2, wherein the liquid crystal molecules are arranged to extend along a plane parallel to a first plane, and wherein said liquid crystal layer receives read light, which is linearly polarized with its polarization plane parallel to the first plane and which is coherent light, and modulates phase of the read light, without changing a polarization state of the read light, in accordance with the spatial distribution in the intensity of the write light, thereby producing a zero order diffraction peak and a first order diffraction peak, and wherein said diffraction peak detecting means detects intensity of at least one of the zero order diffraction peak and the first order diffraction peak and outputs a signal indicative of the detected diffraction peak intensity, said feedback control means receiving the signal output from said diffraction peak detecting means and feedback controlling at least one of the value of the voltage applied by said voltage applying means and the mean value of the spatially distributed intensity of the write light so as to control the modulation state of the read light into at least one of conditions wherein the intensity of the zero order diffraction peak is substantially minimized and wherein the intensity of the first order diffraction peak is substantially maximized.

17. A spatial light modulator for receiving write light having a spatial distribution in its intensity and for receiving read light to spatially modulate the read light in accordance with the spatial distribution in the intensity of the write light, comprising:

a photoconductive layer formed of photoconductive material, said photoconductive layer receiving write light having a spatial distribution in its intensity and changing resistivity of the photoconductive material dependently on the spatial distribution in the intensity of the received write light;

a liquid crystal layer formed of liquid crystal molecules of nematic phase, said liquid crystal layer receiving read light, which is linearly polarized with its polarization plane parallel to the first plane and which is coherent light, and presenting birefringence with respect to the received read light to thereby modulate phase of the read light, without changing a polarization state of the read light, in accordance with the spatial distribution in the intensity of the write light received by said photoconductive layer;

electric voltage applying means for applying an electric voltage through said photoconductive layer and said liquid crystal layer to thereby produce an electric field in said liquid crystal layer, said photoconductive layer changing the electric field produced in said liquid crystal layer in accordance with the resistivity of the photoconductive material so as to electrically control the birefringence of the liquid crystal molecules, said liquid crystal layer modulating the received read light in accordance with the birefringence which is electrically controlled in accordance with the spatial distribution in the intensity of the write light received by said photoconductive layer;

a pair of alignment layers provided to sandwich said liquid crystal layer therebetween for aligning liquid crystal molecules in said liquid crystal layer so that the liquid crystal molecules are arranged to extend along a plane parallel to a first plane;

said photoconductive layer changing the electric field produced in said liquid crystal layer in accordance with the resistivity of the photoconductive material so as to allow the liquid crystal molecules to be moved along the plane parallel to the first plane to thereby electrically control the birefringence of the liquid crystal molecules, the liquid crystal molecules being arranged to form no spiral structure whose axis extends in a first direction which extends along the first plane and the liquid crystal molecules move along the plane parallel to the first plane in accordance with the spatial distribution in the intensity of the write light received by the photoconductive layer so as to change a first refractive index which the liquid crystal molecules present with respect to a component of the read light having its plane of vibration parallel to the first plane without changing a second refractive index which the liquid crystal molecules present with respect to the other component of the read light having its plane of vibration perpendicular to the first plane; and said liquid crystal layer diffracting the linearly-polarized read light with its polarization plane parallel to the first plane, in accordance with the spatial distribution in the intensity of the write light, to thereby form a diffraction peak;

diffraction peak detecting means for detecting intensity of the diffraction peak and for outputting a signal indicative of the diffraction peak intensity; and feedback control means for receiving the signal outputted from said diffraction peak detecting means and for feedback controlling at least one of a value of the voltage applied by said voltage applying means and a mean value of the spatially distributed intensity of the write light so that said liquid crystal layer may diffract the read light with substantially the maximum diffraction efficiency.

18. The spatial light modulator as claimed in claim 17, wherein said liquid crystal layer diffracts the read light to form a zero order diffraction peak, said diffraction peak detecting means detecting intensity of the zero order diffraction peak and outputting a signal indicative of the zero order diffraction peak intensity, and wherein said feedback control means receives the signal outputted from said diffraction peak detecting means and feedback controls at least one of a value of the voltage applied by said voltage applying means and a mean value of the spatially distributed intensity of the write light so that the intensity of the zero order diffraction peak may be substantially minimized.

19. The spatial light modulator as claimed in claim 17, wherein said liquid crystal layer diffracts the read light to form a first order diffraction peak, said diffraction peak detecting means detecting intensity of the first order diffraction peak and outputting a signal indicative of the first order diffraction peak intensity, and wherein said feedback control means receives the signal outputted from said diffraction peak detecting means and feedback controls at least one of a value of the voltage applied by said voltage applying means and a mean value of the spatially distributed intensity of the write light so that the intensity of the first order diffraction peak may be substantially maximized.

20. A spatial light modulator for receiving write light having a spatial distribution in its intensity and for receiving read light to spatially modulate the read light in accordance with the spatial distribution in the intensity of the write light, comprising:

a photoconductive layer formed of photoconductive material, said photoconductive layer receiving write light having a spatial distribution in its intensity and changing resistivity of the photoconductive material dependently on the spatial distribution in the intensity of the received write light;

a liquid crystal layer formed of liquid crystal molecules of nematic phase, said liquid crystal layer receiving read light and presenting birefringence with respect to the received read light;

electric voltage applying means for applying an electric voltage through said photoconductive layer and said liquid crystal layer to thereby produce an electric field in said liquid crystal layer, said photoconductive layer changing the electric field produced in said liquid crystal layer in accordance with the resistivity of the photoconductive material so as to electrically control the birefringence of the liquid crystal molecules, said liquid crystal layer modulating the received read light in accordance with the birefringence which is electrically controlled in accordance with the spatial distribution in the intensity of the write light received by said photoconductive layer;

a pair of alignment layers provided to sandwich said liquid crystal layer therebetween for aligning liquid crystal molecules in said liquid crystal layer so that the liquid crystal molecules are arranged to extend along a plane parallel to a first plane; and write light intensity detecting means, arranged on a portion of said spatial light modulator receiving said write light, for detecting intensity of a part of the write light received by said photoconductive layer corresponding to said portion of said spatial light modulator, the write light intensity detecting means being integrally formed with said spatial light modulator;

said photoconductive layer changing the electric field produced in said liquid crystal layer in accordance with the resistivity of the photoconductive material so as to allow the liquid crystal molecules to be moved along the plate parallel to the first plane to thereby electrically control the birefringence of the liquid crystal molecules, the liquid crystal molecules being arranged to form no spiral structure whose axis extends in a first direction which extends along the first plane and the liquid crystal molecules move along the plane parallel to the first plane in accordance with the spatial distribution in the intensity of the write light received by the photoconductive layer so as to change a first refractive index which the liquid crystal molecules present with respect to a component of the read light having its plane of vibration parallel to the first plane without changing a second refractive index which the liquid crystal molecules present with respect to the other component of the read light having its plane of vibration perpendicular to the first plane.

21. The spatial light modulator as claimed in claim 20, wherein said write light intensity detecting means comprises a photodiode integrally arranged on said portion of said spatial light modulator.

22. The spatial light modulator as claimed in claim 21, further comprising:

electrodes formed on at least one side of said photoconductive layer in said portion of said spatial light modulator; wherein voltage is applied to said electrodes through said photoconductive layer; and a current detector, connected to said electrodes, for detecting the current flow between said electrodes.

23. A joint transform correlating apparatus for measuring correlation of a plurality of optical images, comprising:

a first phase-only spatial light modulator for receiving a joint optical image of a plurality of optical images and for receiving first read light to spatially modulate the first read light in accordance with the joint image;

a first fourier transform lens for receiving the first read light modulated in said first spatial light modulator and spatially fourier transforming the first read light to thereby allow the first read light to bear a joint fourier transform image of the plurality of optical images;

a second phase-only spatial light modulator for receiving the first read light bearing the joint fourier transform image and for receiving second read light to spatially modulate the read light in accordance with the joint fourier transform image;

a second fourier transform lens for receiving the second read light modulated in said second spatial light modulator and spatially fourier transforming the second read light to thereby allow the second read light to bear a pair of correlation peaks representative of correlation of the plurality of optical images; and correlation detecting means for detecting intensity of one of the pair of correlation peaks, wherein at least one of said first and second light modulators includes:

a photoconductive layer formed of photoconductive material for receiving an optical image and changing resistivity of the photoconductive material dependently on the optical image;

a liquid crystal layer formed of liquid crystal molecules of nematic phase for receiving read light and presenting birefringence with respect to the received first read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules to thereby modulate the read light in accordance with the electrically controlled birefringence.

24. A joint transform correlating apparatus as claimed in claim 23, wherein said first light modulator includes:

a photoconductive layer formed of photoconductive material, the photoconductive layer receiving the joint optical image and changing resistivity of the photoconductive material dependently on the joint optical image;

a liquid crystal layer formed of liquid crystal molecules of nematic phase, the liquid crystal layer receiving the first read light and presenting birefringence with respect to the received first read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules to thereby modulate the first read light in accordance with the electrically controlled birefringence.

25. A joint transform correlating apparatus as claimed in claim 23, wherein said second light modulator includes:

a photoconductive layer formed of photoconductive material, the photoconductive layer receiving the joint fourier transform image and changing resistivity of the photoconductive material dependently on the joint fourier transform image;

a liquid crystal layer formed of liquid crystal molecules of nematic phase, the liquid crystal layer receiving the first read light and presenting birefringence with respect to the received first read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules to thereby modulate the first read light in accordance with the electrically controlled birefringence.

26. A joint transform correlating apparatus for measuring correlation of a plurality of optical images, comprising:

a first spatial light modulator for receiving a joint optical image of a plurality of optical images and for receiving first read light to spatially modulate the first read light in accordance with the joint image;

a first fourier transform lens for receiving the first read light modulated in said first spatial light modulator and spatially fourier transforming the first read light to thereby allow the first read light to bear a joint fourier transform image of the plurality of optical images;

a second spatial light modulator for receiving the first read light bearing the joint fourier transform image and for receiving second read light to spatially modulate the read light in accordance with the joint fourier transform image;

a second fourier transform lens for receiving the second read light modulated in said second spatial light modulator and spatially fourier transforming the second read light to thereby allow the second read light to bear a pair of correlation peaks representative of correlation of the plurality of optical images;

correlation detecting means for detecting intensity of one of the pair of correlation peaks;

at least said first light modulator of said first and second light modulators including:

a photoconductive layer formed of photoconductive material for receiving an optical image and changing resistivity of the photoconductive material dependently on the optical image;

a liquid crystal layer formed of liquid crystal molecules of nematic phase for receiving read light and presenting birefringence with respect to the received first read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules to thereby modulate the read light in accordance with the electrically controlled birefringence;

such that in said first light modulator:

said photoconductive layer receives the Joint optical image and changing resistivity of the photoconductive material dependently on the joint optical image;

said liquid crystal layer receives the first read light and presents birefringence with respect to the received first read light; and said electric voltage applying means applies the electric voltage through the photoconductive layer and the liquid crystal layer to thereby produce the electric field in the liquid crystal layer so that the photoconductive layer changes the electric field produced in the liquid crystal layer in accordance with the resistivity of the photoconductive material so as to electrically control the birefringence of the liquid crystal molecules to thereby modulate the first read light in accordance with the electrically controlled birefringence;

first light intensity detecting means for detecting intensity of a zero order peak of the joint fourier transform image and for outputting a signal indicative of the intensity of the zero order peak; and feedback control means for receiving the signal outputted from said first light intensity detecting means and for controlling at least one of a value of the voltage applied from the electric voltage applying means and a mean value of the joint optical image so that the intensity of the zero order peak may be substantially minimized.

27. A joint transform correlating apparatus as claimed in claim 26, wherein said first light intensity detecting means is integrally formed with said second spatial light modulator.

28. A joint transform correlating apparatus for measuring correlation of a plurality of optical images, comprising:

a first spatial light modulator for receiving a joint optical image of a plurality of optical images and for receiving first read light to spatially modulate the first read light in accordance with the joint image;

a first fourier transform lens for receiving the first read light modulated in said first spatial light modulator and spatially fourier transforming the first read light to thereby allow the first read light to bear a joint fourier transform image of the plurality of optical images;

a second spatial light modulator for receiving the first read light bearing the joint fourier transform image and for receiving second read light to spatially modulate the read light in accordance with the joint fourier transform image;

a second fourier transform lens for receiving the second read light modulated in said second spatial light modulator and spatially fourier transforming the second read light to thereby allow the second read light to bear a pair of correlation peaks representative of correlation of the plurality of optical images;

correlation detecting means for detecting intensity of one of the pair of correlation peaks;

at least said second light modulator of said first and second light modulators including:

a photoconductive layer formed of photoconductive material for receiving an optical image and changing resistivity of the photoconductive material dependently on the optical image;

a liquid crystal layer formed of liquid crystal molecules of nematic phase for receiving read light and presenting birefringence with respect to the received first read light; and electric voltage applying means for applying an electric voltage through the photoconductive layer and the liquid crystal layer to thereby produce an electric field in the liquid crystal layer, the photoconductive layer changing the electric field produced in the liquid crystal layer in accordance with the resistivity of the photoconductive material so as to electrically control the birefringence of the liquid crystal molecules to thereby modulate the read light in accordance with the electrically controlled birefringence;

such that in said second light modulator:

said photoconductive layer receives the joint fourier transform image and changes resistivity of the photoconductive material dependently on the joint fourier transform image;

said liquid crystal layer receives the first read light and presents birefringence with respect to the received first read light; and said electric voltage applying means applies said electric voltage through the photoconductive layer and the liquid crystal layer to thereby produce said electric field in the liquid crystal layer so that the photoconductive layer changes the electric field produced in the liquid crystal layer in accordance with the resistivity of the photoconductive material so as to electrically control the birefringence of the liquid crystal molecules to thereby modulate the first read light in accordance with the electrically controlled birefringence second light intensity detecting means for detecting intensity of the one of the pair of correlation peaks and for outputting a signal indicative of the intensity of the one of the pair of correlation peaks; and feedback control means for receiving the signal outputted from said second light intensity-detecting means and for controlling at least one of a value of the voltage applied from the electric voltage applying means and a mean value of the joint optical image so that the intensity of the one of the pair of correlation peaks may be substantially maximized.

29. A spatial light modulator for receiving write light having a spatial distribution in its intensity and for receiving read light to spatially modulate the read light in accordance with the spatial distribution in the intensity of the write light, comprising:

a photoconductive layer formed of photoconductive material, said photoconductive layer receiving write light having a spatial distribution in its intensity and changing resistivity of the photoconductive material dependently on the spatial distribution in the intensity of the received write light;

a liquid crystal layer formed of liquid crystal molecules of nematic phase, said liquid crystal layer receiving read light and presenting birefringence with respect to the received read light;

electric voltage applying means for applying an electric voltage through said photoconductive layer and said liquid crystal layer to thereby produce an electric field in said liquid crystal layer, said photoconductive layer changing the electric field produced in said liquid crystal layer in accordance with the resistivity of the photoconductive material so as to electrically control the birefringence of the liquid crystal molecules, said liquid crystal layer modulating the received read light in accordance with the birefringence which is electrically controlled in accordance with the spatial distribution in the intensity of the write light received by said photoconductive layer; and write light intensity detecting means, arranged on a portion of said spatial light modulator receiving said write light, for detecting intensity of a part of the write light received by said photoconductive layer corresponding to said portion of said spatial light modulator, the write light intensity detecting means being integrally formed with said spatial light modulator.

30. The spatial light modulator as claimed in claim 29, wherein said write light intensity detecting means comprises a photodiode integrally arranged on said portion of said spatial light modulator.

31. The spatial light modulator as claimed in claim 30, further comprising:

electrodes formed on at least one side of said photoconductive layer in said portion of said spatial light modulator; wherein voltage is applied to said electrodes through said photoconductive layer; and a current detector, connected to said electrodes, for detecting the current flow between said electrodes.

* * * * *